United States Patent
Maddan

(10) Patent No.: US 10,273,163 B2
(45) Date of Patent: *Apr. 30, 2019

(54) NANOPLATELET METAL OXIDES

(71) Applicant: Aqua Resources Corporation, Shalimar, FL (US)

(72) Inventor: Orville Lee Maddan, Fort Walton Beach, FL (US)

(73) Assignee: Aqua Resources Corporation, Fort Walton Beach, FL (US)

(*) Notice: Subject to any disclaimer, the term of this patent is extended or adjusted under 35 U.S.C. 154(b) by 242 days.

This patent is subject to a terminal disclaimer.

(21) Appl. No.: 15/434,008

(22) Filed: Feb. 15, 2017

(65) Prior Publication Data

US 2017/0158524 A1 Jun. 8, 2017

Related U.S. Application Data

(60) Continuation of application No. 14/455,788, filed on Aug. 8, 2014, now Pat. No. 9,604,854, which is a
(Continued)

(51) Int. Cl.
*C01G 41/02* (2006.01)
*C01G 37/02* (2006.01)
(Continued)

(52) U.S. Cl.
CPC ............ *C01G 41/02* (2013.01); *A62D 3/36* (2013.01); *A62D 3/38* (2013.01); *B82Y 30/00* (2013.01); *B82Y 40/00* (2013.01); *C01B 13/36* (2013.01); *C01F 5/08* (2013.01); *C01F 5/14* (2013.01); *C01F 5/22* (2013.01); *C01F 7/02* (2013.01); *C01F 7/144* (2013.01); *C01F 11/02* (2013.01); *C01F 11/04* (2013.01); *C01F 17/0043* (2013.01); *C01G 1/02* (2013.01);
(Continued)

(58) Field of Classification Search
None
See application file for complete search history.

(56) References Cited

U.S. PATENT DOCUMENTS 3,718,559 A 2/1973 Wallace
3,765,866 A 10/1973 Nayar et al.
(Continued)

FOREIGN PATENT DOCUMENTS

CN 1513761 A 7/2004
CN 1519262 A 8/2004
(Continued)

OTHER PUBLICATIONS

Atwater, Harry A., "The Promise of Plasmonics: A technology that squeezes electromagnetic waves into minuscule structures may yield a new generation of superfast computer chips and ultrasensitive molecular detectors", www.scientificamerican.com, acquired on Aug. 2, 2007.
(Continued)

*Primary Examiner* — Ronak C Patel
(74) *Attorney, Agent, or Firm* — Knobbe Martens Olson & Bear, LLP

(57) ABSTRACT

Nanoplatelet forms of metal hydroxide and metal oxide are provided, as well as methods for preparing same. The nanoplatelets are suitable for use as fire retardants and as agents for chemical or biological decontamination.

12 Claims, 38 Drawing Sheets

Related U.S. Application Data division of application No. 13/012,097, filed on Jan. 24, 2011, now Pat. No. 8,822,030, which is a continuation-in-part of application No. 11/836,746, filed on Aug. 9, 2007, now Pat. No. 7,892,447.

(60) Provisional application No. 60/908,144, filed on Mar. 26, 2007, provisional application No. 60/837,791, filed on Aug. 11, 2006.

(51) Int. Cl.

| | |
|---|---|
| *C01G 33/00* | (2006.01) |
| *C01G 35/00* | (2006.01) |
| *C09C 1/34* | (2006.01) |
| *C09C 1/00* | (2006.01) |
| *C09K 21/02* | (2006.01) |
| *D21H 17/67* | (2006.01) |
| *D21H 21/10* | (2006.01) |
| *C08K 3/22* | (2006.01) |
| *D01F 6/92* | (2006.01) |
| *A62D 3/38* | (2007.01) |
| *C25B 1/46* | (2006.01) |
| *C25B 9/08* | (2006.01) |
| *C01F 17/00* | (2006.01) |
| *A62D 3/36* | (2007.01) |
| *B82Y 30/00* | (2011.01) |
| *B82Y 40/00* | (2011.01) |
| *C01B 13/36* | (2006.01) |
| *C01F 5/08* | (2006.01) |
| *C01F 5/14* | (2006.01) |
| *C01F 5/22* | (2006.01) |
| *C01F 7/02* | (2006.01) |
| *C01F 7/14* | (2006.01) |
| *C01F 11/02* | (2006.01) |
| *C01F 11/04* | (2006.01) |
| *C01G 1/02* | (2006.01) |
| *C01G 3/00* | (2006.01) |
| *C01G 3/02* | (2006.01) |
| *C01G 5/00* | (2006.01) |
| *C01G 9/00* | (2006.01) |
| *C01G 9/02* | (2006.01) |
| *C01G 23/00* | (2006.01) |
| *C01G 25/00* | (2006.01) |
| *C01G 31/00* | (2006.01) |
| *C01G 31/02* | (2006.01) |
| *C01G 45/00* | (2006.01) |
| *C01G 45/02* | (2006.01) |
| *C01G 49/00* | (2006.01) |
| *C01G 49/02* | (2006.01) |
| *C01G 51/04* | (2006.01) |
| *C01G 53/00* | (2006.01) |
| *C01G 53/04* | (2006.01) |
| *C25B 1/00* | (2006.01) |
| *C25B 1/20* | (2006.01) |
| *H01B 7/295* | (2006.01) |
| *A62D 101/02* | (2007.01) |
| *G02F 1/00* | (2006.01) |

(52) U.S. Cl.
CPC ............... *C01G 3/00* (2013.01); *C01G 3/02* (2013.01); *C01G 5/00* (2013.01); *C01G 9/00* (2013.01); *C01G 9/02* (2013.01); *C01G 23/00* (2013.01); *C01G 25/00* (2013.01); *C01G 31/00* (2013.01); *C01G 31/02* (2013.01); *C01G 33/00* (2013.01); *C01G 35/00* (2013.01); *C01G 37/02* (2013.01); *C01G 45/00* (2013.01); *C01G 45/02* (2013.01); *C01G 49/00* (2013.01); *C01G 49/02* (2013.01); *C01G 51/04* (2013.01); *C01G 53/00* (2013.01); *C01G 53/04* (2013.01); *C08K 3/22* (2013.01); *C09C 1/00* (2013.01); *C09C 1/0018* (2013.01); *C09C 1/346* (2013.01); *C09K 21/02* (2013.01); *C25B 1/00* (2013.01); *C25B 1/20* (2013.01); *C25B 1/46* (2013.01); *C25B 9/08* (2013.01); *D01F 6/92* (2013.01); *D21H 17/675* (2013.01); *D21H 21/10* (2013.01); *H01B 7/295* (2013.01); *A62D 2101/02* (2013.01); *C01P 2002/72* (2013.01); *C01P 2002/85* (2013.01); *C01P 2004/04* (2013.01); *C01P 2004/136* (2013.01); *C01P 2004/20* (2013.01); *C01P 2004/24* (2013.01); *C01P 2004/32* (2013.01); *C01P 2004/52* (2013.01); *C01P 2004/54* (2013.01); *C01P 2004/60* (2013.01); *C01P 2004/61* (2013.01); *C01P 2004/62* (2013.01); *C01P 2004/64* (2013.01); *C01P 2006/12* (2013.01); *C01P 2006/42* (2013.01); *C01P 2006/90* (2013.01); *C08K 2003/2224* (2013.01); *C08K 2201/006* (2013.01); *C08K 2201/011* (2013.01); *G02F 1/0009* (2013.01); *G02F 2203/10* (2013.01); *Y10S 977/773* (2013.01); *Y10T 428/2982* (2015.01)

(56) References Cited

U.S. PATENT DOCUMENTS

| | | |
|---|---|---|
| 3,959,095 A | 5/1976 | Marks et al. |
| 4,202,871 A | 5/1980 | Matsumoto et al. |
| 4,203,822 A | 5/1980 | Schenker et al. |
| 4,240,883 A | 12/1980 | Iijima et al. |
| 4,909,912 A | 3/1990 | Oda et al. |
| 4,948,489 A | 8/1990 | Greenberg |
| 4,990,268 A | 2/1991 | Burba et al. |
| 5,057,299 A | 10/1991 | Lown et al. |
| 5,084,209 A | 1/1992 | Burba et al. |
| 5,264,097 A | 11/1993 | Vaughan |
| 5,281,494 A | 1/1994 | Ettel et al. |
| 5,470,910 A | 11/1995 | Spanhel et al. |
| 5,496,454 A | 3/1996 | Ishibashi et al. |
| 5,660,709 A | 8/1997 | Bauer et al. |
| 5,718,885 A | 2/1998 | Gingold et al. |
| 5,785,833 A | 6/1998 | Vaughan |
| 5,871,650 A | 2/1999 | Lai et al. |
| 6,210,800 B1 | 4/2001 | Nesper et al. |
| 6,235,185 B1 | 5/2001 | Tanaka et al. |
| 6,267,854 B1 | 7/2001 | Maddan |
| 6,375,825 B1 | 4/2002 | Mauldin et al. |
| 6,395,084 B1 | 5/2002 | Priest et al. |
| 6,472,571 B1 | 11/2002 | Karau et al. |
| 6,494,932 B1 | 12/2002 | Abercrombie |
| 6,537,517 B1 | 3/2003 | Kasuga et al. |
| 6,656,339 B2 | 12/2003 | Talin et al. |
| 6,720,240 B2 | 4/2004 | Gole et al. |
| 6,843,902 B1 | 1/2005 | Penner et al. |
| 7,048,843 B2 | 5/2006 | Olbrich et al. |
| 7,147,834 B2 | 12/2006 | Wong et al. |
| 7,172,747 B2 | 2/2007 | Shimizu et al. |
| 7,238,331 B2 | 7/2007 | Zhou et al. |
| 2003/0082095 A1 | 5/2003 | DiMascio |
| 2004/0108220 A1 | 6/2004 | Stephan et al. |
| 2004/0197255 A1 | 11/2004 | Nayfeh et al. |
| 2005/0227075 A1 | 10/2005 | Bringley |
| 2006/0116282 A1 | 6/2006 | Honda et al. |
| 2006/0135669 A1 | 6/2006 | Ryang |
| 2006/0159603 A1 | 7/2006 | Vanheusden et al. |
| 2006/0193766 A1 | 8/2006 | Hasegawa et al. |
| 2006/0212975 A1 | 9/2006 | Choi et al. |
| 2006/0216602 A1 | 9/2006 | Larouche et al. |

(56) References Cited

U.S. PATENT DOCUMENTS

| | | |
|---|---|---|
| 2006/0249384 A1 | 11/2006 | Kim et al. |
| 2007/0014771 A1 | 1/2007 | Deevi et al. |
| 2007/0022839 A1 | 2/2007 | Chi |
| 2007/0042377 A1 | 2/2007 | Gao et al. |
| 2007/0087470 A1 | 4/2007 | Sunkara et al. |
| 2007/0098806 A1 | 5/2007 | Ismail et al. |
| 2007/0100086 A1 | 5/2007 | Hong et al. |
| 2007/0113779 A1 | 5/2007 | Wong et al. |
| 2007/0154385 A1 | 7/2007 | Min et al. |
| 2010/0019201 A1 | 1/2010 | Puppe et al. |

FOREIGN PATENT DOCUMENTS

| | | |
|---|---|---|
| JP | 63195288 | 8/1988 |
| JP | 8041668 | 2/1996 |
| JP | 2002029742 A | 1/2002 |

OTHER PUBLICATIONS

Boo, et al., "Fracture behaviour of nanoplatelet reinforced polymer nanocomposites", Polymer Technology Centre, Department of Mechanical Engineering, Texas A&M University.

Deepa, et al., "Influence of annealing on electrochromic performance of template assisted, electrochemically grown, nanostructured assembly of tungsten oxide", Acta Materialia 2006, 54, 4583-4595.

Ding, et al. "Template-induced morphological perservation and self-assembly of nonporous MgO nanostructures during the decomposition of nanoscale Mg(OH)2 precursors, Mater. Lett. 2006, 1233-1237."

Ding, et al.."Nanoscale magnesium hydroxide and magnesium oxide powders: control over size, shape, and structure via hydrothermal synthesis", Chem. Mater. 2001, 13, 435-440.

Fiechter, et al., "Surface Modified Ruthenium Nanoparticles: Structural Investigation and Surface Analysis of a Novel Catalyst for Oxygen Reduction", J. Phys. Chem., (2007) 111:477-487.

Hou, et al., "High-Yeild Preparation of Uniform Cobalt Hydroxide and Oxide Nanoplatelets and Their Characterization", J. Phys. Chem., (2005) 109:19094-19098.

Lee, et al., "Methanol and proton transport control by using layered double hydroxide nanoplatelets for direct methanol fuel cell", Electrochemistry Communications, (2005) 7:113-118.

Li, et al., "Magnetic and microwave properties of cobalt nanoplatelets", Materials Science and Engineering, (2007) 138:199-204.

Li, et al., "Nanofibers and nanoplatelets of $MoO_3$ via an electrospinning technique", J. of Physics and Chemistry of Solids, (2006) 67:1869-1872.

Li, et al., "Structure and magnetic properties of cobalt nanoplatelets", Materials Letters, (2004) 58-2506-2509.

Li, et al., "The microstructure and magnetic properties of Ni nanoplatelets", Nanotechnology, (2004) 15:982-986.

Liu, et al., "Facile and Large-Scale Production of ZnO/Zn—Al Layered Double Hydroxide Hierarchical Heterostructures", J. Phys. Chem., (2006) 110:21865-21872.

Lv, et al., "Controlled synthesis of magnesium hydroxide nanoparticles with different morphological structures and related properties in flame retardant ethylene—vinyl acetate blends", Nanotechnology, (2004) 15:1576-1581.

Pinna, et al. "A novel nonaqueous route to $V_2O_3$ and $Nb_2O_5$ nanocrystals", Colloids and Surfaces A: Physicochem. Eng. Aspects 2004, 250, 211-213.

Polleux, et al. "Growth and Assembly of Crystalline Tungsten Oxide NanostructuresAssisted by Bioligation", J. Am. Chem. Soc. 2005,127,15595-15601.

Simpson, et al, "The Treatment of Industrial Effluents Containing Sodium Hydroxide to Enable the Reuse of Chemicals and Water", Desalination, (1987) 67:409-429.

Sun, et al., "From Layered Double Hydroxide to Spinel Nanostructures: Facile Synthesis and Characterization of Nanoplatelets and Nanorods", J. Phys. Chem., (2006) 110:13375-13380.

Tai, et al., "Template Synthesis and Electrochemical Characterization of Nickel-Based Tubule Electrode Arrays", Chem. Mater., (2004) 16:338-342.

Wang, et al. "Synthesis of Molybdenum Oxide Nanoplatelets during Crystallizationof the Precursor Gel from Its Hybrid Nanocomposites", Chem. Mater. 2007, 19, 979-981.

Yang, et al., "Development and alkaline direct methanol fuel cells based on crosslinked PVA polymer membranes", J. Power Sources, (2006) 162:21-29.

Zarate, et al., "Novel route to synthesize CuO nanoplatelets", J. of Solid State Chemistry, (2007) 180:1464-1469.

Zhou, et al., "Preparation and characterization of nanoplatelets of nickel hydroxide and nickel oxide", Materials Chemistry and Physics, (2006) 98:267-272.

NANOPLATELET METAL OXIDES

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 14/455,788 filed Aug. 8, 2014, now U.S. Pat. No. 9,604,854, which is a divisional of U.S. application Ser. No. 13/012,097 filed Jan. 24, 2011, now U.S. Pat. No. 8,822,030, which is a continuation-in-part of U.S. application Ser. No. 11/836,746 filed Aug. 9, 2007, now U.S. Pat. No. 7,892,447, which claims the benefit of U.S. Provisional Application No. 60/908,144 filed Mar. 26, 2007 and U.S. Provisional Application No. 60/837,791 filed Aug. 11, 2006. Each of the aforementioned applications is incorporated by reference herein in its entirety, and each is hereby expressly made a part of this specification.

FIELD OF THE INVENTION

Nanoplatelet forms of metal hydroxide and metal oxide are provided, as well as methods for preparing same. The nanoplatelets are suitable for use in paper retention, drainage, and opacity, as fire retardants in plastics, rubbers, coatings and textiles and as agents for chemical and biological preventive and decontamination, in electronics and plasmonics.

BACKGROUND OF THE INVENTION

Metal hydroxides are useful in a variety of applications. For example, magnesium hydroxide ($Mg(OH)_2$), is employed as flame retardant in various polymer compositions. Magnesium hydroxide has advantages over certain other flame retardants in that it is both acid-free and halogen-free. Magnesium hydroxide decomposes endothermically when heated to yield magnesium oxide (MgO) and water. The water acts to smother the flame by diluting and/or excluding oxygen and flammable gases, and a heat insulating material can form on the surface of certain polymeric materials containing magnesium hydroxide when in contact with the flame, reducing the availability of potentially flammable decomposition products to the gas phase where combustion occurs.

Magnesium oxide is useful as a fireproofing component in construction materials, but has various other uses as well, including high-temperature refractories, electrical insulation, food packaging, cosmetics, fertilizers, and pharmaceuticals.

SUMMARY OF THE INVENTION

A method of producing metal hydroxides and metal oxides of superior properties is desirable. The materials and methods disclosed herein can be employed to prepare such metal hydroxides and metal oxides in nanoplatelet, nanotube, and other forms. Oxides and hydroxides that can be prepared according to the preferred embodiments include MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, [$Ce(NO_3)_3$—$Cu(NO_3)_2$] $TiO_2$, $Mg(OH)_2$, $Ca(OH)_2$, $Al(OH)_3$, $Sr(OH)_2$, $Ba(OH)_2$, $Fe(OH)_3$, $Cu(OH)_3$, $Ni(OH)_2$, $Co(OH)_2$, $Zn(OH)_2$, AgOH, mixed metal oxides, mixed metal hydroxides, and mixtures of metal oxides and hydroxides. The hydroxides and oxides are preferably in platelet form (e.g., nanoplatelet form), although other configurations can also be prepared (e.g., tubes such as nanotubes).

In a first aspect, metal hydroxide nanoplatelets are provided, having an average platelet diameter of from about 30 nm to about 3500 nm and an average thickness of from about 1 nm to about 400 nm.

In an embodiment of the first aspect, the metal hydroxide nanoplatelets have an average platelet diameter of from about 40 nm to about 120 nm and an average thickness of from about 1 nm to about 4 nm.

In an embodiment of the first aspect, the metal hydroxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the first aspect, the metal hydroxide nanoplatelets have an average aspect ratio of from about 15 to about 70, an average BET specific surface area of from about 100 $m^2/g$ to about 150 $m^2/g$, and an average zeta potential of from about −4 mV to about −5 mV.

In an embodiment of the first aspect, the metal hydroxide nanoplatelets are selected from the group consisting of $Mg(OH)_2$, $Ca(OH)_2$, $Al(OH)_3$, $Sr(OH)_2$, $Ba(OH)_2$, $Fe(OH)_3$, $Cu(OH)_2$, $Ni(OH)_2$, $Co(OH)_2$, $Zn(OH)_2$, AgOH, and mixtures thereof.

In an embodiment of the first aspect, the metal hydroxide nanoplatelets further comprise at least one metal oxide. In some embodiments, the metal oxide is selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, [$Ce(NO_3)_3$—$Cu(NO_3)_2$], and mixtures thereof.

In an embodiment of the first aspect, the metal hydroxide nanoplatelets are in a form of rolled nanotubes.

In a second aspect, metal oxide nanoplatelets are provided, having an average platelet diameter of from about 30 nm to about 3500 nm and an average thickness of from about 1 nm to about 400 nm.

In an embodiment of the second aspect, the metal oxide nanoplatelets have an average platelet diameter of from about 40 nm to about 120 nm and an average thickness of from about 1 nm to about 4 nm.

In an embodiment of the second aspect, the metal oxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the second aspect, the metal oxide nanoplatelets are selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, [$Ce(NO_3)_3$—$Cu(NO_3)_2$]$TiO_2$, and mixtures thereof.

In a third aspect, a method of producing metal hydroxide nanoplatelets is provided, the method comprising the steps of providing an electrolyzer comprising an anode compartment, a cathode compartment, and a center compartment situated between the anode compartment and the cathode compartment, and separated from the anode compartment and the cathode compartment by ion selective membranes; adding a solution of electrolyte at a pH of about 8 to the anode compartment; adding a solution of up to about 50 wt. % sodium hydroxide at a pH of 8 or higher to the cathode compartment; adding a solution of a second electrolyte to the center compartment, wherein the solution has from about 30,000 ppm chloride ion to about 200,000 ppm chloride ion; operating the cathode compartment at an amperage of 3.75 amps per square inch or less, whereby hydroxide ion is generated in the cathode compartment and migrates through its ion selective membrane into the center compartment, and whereby sodium ion is generated in the anode compartment and migrates through its ion selective membrane into the center compartment; and thereafter adding to the center compartment a solution of soluble metal ion and a third electrolyte, the solution having from about 300 ppm to 100,000 ppm metal ions and from about 5000 ppm to about 200,000 ppm anions, whereby the soluble metal ion reacts with hydroxide ion to yield metal hydroxide nanoplatelets, wherein a residence time in the center compartment of the metal hydroxide nanoplatelets is from about 0.1 minutes to about 10 minutes.

In an embodiment of the third aspect, an additional soluble metal ion is added to the center compartment, wherein the additional soluble metal ion is selected from the group consisting of magnesium ion, strontium ion, barium ion, calcium ion, titanium ion, zirconium ion, iron ion, vanadium ion, manganese ion, nickel ion, copper ion, aluminum ion, cobalt ion, silicon ion, zinc ion, silver ion, cerium ion, and mixtures thereof.

In an embodiment of the third aspect, the solution comprises water.

In an embodiment of the third aspect, the solution of soluble metal ion and an electrolyte is adjusted to a pH of 4.5 or less, whereby carbonates are removed from the solution.

In an embodiment of the third aspect, the solution of soluble metal ion and an electrolyte is added to the center compartment at a temperature of from about 60° F. to about 190° F.

In an embodiment of the third aspect, the method further comprises the step of removing residual water from the metal hydroxide nanoplatelets, whereby dried metal hydroxide nanoplatelets are obtained.

In an embodiment of the third aspect, the method further comprises the step of applying heat to one side of the dried metal hydroxide nanoplatelets, whereby metal hydroxide is converted to metal oxide through a portion of a thickness of the nanoplatelets, causing them to roll into nanotubes, whereby metal (hydr)oxide nanotubes are obtained.

In an embodiment of the third aspect, the method further comprises the step of applying heat to the dried metal hydroxide nanoplatelets, whereby metal hydroxide is converted to metal oxide through the thickness of the nanoplatelets, whereby metal oxide nanoplatelets are obtained.

In an embodiment of the third aspect, the metal hydroxide nanoplatelets have an average platelet diameter of from about 30 nm to about 3500 nm and an average thickness of from about 1 nm to about 400 nm.

In an embodiment of the third aspect, the metal hydroxide nanoplatelets have an average platelet diameter of from about 40 nm to about 120 nm and an average thickness of from about 1 nm to about 4 nm.

In an embodiment of the third aspect, the first, second, and third electrolyte is sodium chloride.

In a fourth aspect, magnesium hydroxide nanoplatelets are provided, having an average platelet diameter of from about 30 nm to about 3500 nm and an average thickness of from about 1 nm to about 400 nm.

In an embodiment of the fourth aspect, the magnesium hydroxide nanoplatelets have an average platelet diameter of from about 40 nm to about 120 nm and an average thickness of from about 1 nm to about 4 nm.

In an embodiment of the fourth aspect, the magnesium hydroxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the fourth aspect, the magnesium hydroxide nanoplatelets have an average aspect ratio of from about 15 to about 70, an average BET specific surface area of from about 100 $m^2/g$ to about 150 $m^2/g$, and an average zeta potential of from about −4 mV to about −5 mV.

In an embodiment of the fourth aspect, the magnesium hydroxide nanoplatelets, further comprise a second metal hydroxide selected from the group consisting of $Ca(OH)_2$, $Al(OH)_3$, $Sr(OH)_2$, $Ba(OH)_2$, $Fe(OH)_3$, $Cu(OH)_2$, $Ni(OH)_2$, $Co(OH)_2$, $Zn(OH)_2$, AgOH, and mixtures thereof.

In an embodiment of the fourth aspect, the magnesium hydroxide nanoplatelets further comprise at least one metal oxide. In some embodiments, the metal oxide is selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, $[Ce(NO_3)_3$—$Cu(NO_3)_2]$, and mixtures thereof.

In an embodiment of the fourth aspect, the magnesium hydroxide nanoplatelets are in a form of rolled nanotubes.

In a fifth aspect, magnesium oxide nanoplatelets are provided, having an average platelet diameter of from about 30 nm to about 3500 nm and an average thickness of from about 1 nm to about 400 nm.

In an embodiment of the fifth aspect, the magnesium oxide nanoplatelets have an average platelet diameter of from about 40 nm to about 120 nm and an average thickness of from about 1 nm to about 4 nm.

In an embodiment of the fifth aspect, the magnesium oxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the fifth aspect, the magnesium oxide nanoplatelets further comprise an additional metal oxide selected from the group consisting of SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, $[Ce(NO_3)_3$—$Cu(NO_3)_2]$ $TiO_2$, and mixtures thereof.

In a sixth aspect, a method of producing magnesium hydroxide nanoplatelets is provided, the method comprising the steps of providing an electrolyzer comprising an anode compartment, a cathode compartment, and a center compartment situated between the anode compartment and the cathode compartment, and separated from the anode compartment and the cathode compartment by ion selective membranes; adding a solution of electrolyte at a pH of about 8 to the anode compartment; adding a solution of up to about 50 wt. % sodium hydroxide at a pH of 8 or higher to the cathode compartment; adding a solution of a second electrolyte to the center compartment, wherein the solution has from about 30,000 ppm chloride ion to about 200,000 ppm chloride ion; operating the cathode compartment at an amperage of 3.75 amps per square inch or less, whereby hydroxide ion is generated in the cathode compartment and migrates through its ion selective membrane into the center compartment, and whereby sodium ion is generated in the anode compartment and migrates through its ion selective membrane into the center compartment; and thereafter adding to the center compartment a solution of soluble magnesium ion and a third electrolyte, the solution having from about 300 ppm to 100,000 ppm magnesium ions and from about 5000 ppm to about 200,000 ppm anions, whereby the soluble magnesium ion reacts with hydroxide ion to yield magnesium hydroxide nanoplatelets, wherein a residence time in the center compartment of the magnesium hydroxide nanoplatelets is from about 0.1 minutes to about 10 minutes.

In an embodiment of the sixth aspect, an additional soluble metal ion is added to the center compartment, wherein the additional soluble metal ion is selected from the group consisting of strontium ion, barium ion, calcium ion, titanium ion, zirconium ion, iron ion, vanadium ion, manganese ion, nickel ion, copper ion, aluminum ion, cobalt ion, silicon ion, zinc ion, silver ion, cerium ion, and mixtures thereof.

In an embodiment of the sixth aspect, the solution comprises water.

In an embodiment of the sixth aspect, the solution of soluble magnesium ion and an electrolyte is adjusted to a pH of 4.5 or less, whereby carbonates are removed from the solution.

In an embodiment of the sixth aspect, the solution of soluble magnesium ion and an electrolyte is added to the center compartment at a temperature of from about 60° F. to about 190° F.

In an embodiment of the sixth aspect, the method further comprises the step of removing residual water from the magnesium hydroxide nanoplatelets, whereby dried magnesium hydroxide nanoplatelets are obtained.

In an embodiment of the sixth aspect, the method further comprises the step of applying heat to one side of the dried magnesium hydroxide nanoplatelets, whereby magnesium hydroxide is converted to magnesium oxide through a portion of a thickness of the nanoplatelets, causing them to roll into nanotubes, whereby magnesium (hydr)oxide nanotubes are obtained.

In an embodiment of the sixth aspect, the method further comprises the step of applying heat to the dried magnesium hydroxide nanoplatelets, whereby magnesium hydroxide is converted to magnesium oxide through the thickness of the nanoplatelets, whereby magnesium oxide nanoplatelets are obtained.

In an embodiment of the sixth aspect, the magnesium hydroxide nanoplatelets have an average platelet diameter of from about 30 nm to about 3500 nm and an average thickness of from about 1 nm to about 400 nm.

In an embodiment of the sixth aspect, the magnesium hydroxide nanoplatelets have an average platelet diameter of from about 40 nm to about 120 nm and an average thickness of from about 1 nm to about 4 nm.

In an embodiment of the sixth aspect, the first, second, and third electrolyte is sodium chloride.

In a seventh aspect, nickel hydroxide nanoplatelets are provided, having an average platelet diameter of from about 30 nm to about 3500 nm and an average thickness of from about 1 nm to about 400 nm.

In an embodiment of the seventh aspect, the nickel hydroxide nanoplatelets have an average platelet diameter of from about 40 nm to about 120 nm and an average thickness of from about 1 nm to about 4 nm.

In an embodiment of the seventh aspect, the nickel hydroxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the seventh aspect, the nickel hydroxide nanoplatelets have an average aspect ratio of from about 15 to about 70, an average BET specific surface area of from about 100 $m^2/g$ to about 150 $m^2/g$, and an average zeta potential of from about −4 mV to about −5 mV.

In an embodiment of the seventh aspect, the nickel hydroxide nanoplatelets further comprise a second metal hydroxide selected from the group consisting of $Mg(OH)_2$, $Ca(OH)_2$, $Al(OH)_3$, $Sr(OH)_2$, $Ba(OH)_2$, $Fe(OH)_3$, $Cu(OH)_2$, $Co(OH)_2$, $Zn(OH)_2$, AgOH, and mixtures thereof.

In an embodiment of the seventh aspect, the nickel hydroxide nanoplatelets further comprise at least one metal oxide. In some embodiments, the metal oxide is selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, CuO, $Ni_2O_3$, $Al_2O_3$, $SiO_2$, ZnO, $Ag_2O$, $[Ce(NO_3)_3$—$Cu(NO_3)_2]$, and mixtures thereof.

In an embodiment of the seventh aspect, the nickel hydroxide nanoplatelets are in a form of rolled nanotubes.

In an eighth aspect, nickel oxide nanoplatelets are provided, having an average platelet diameter of from about 30 nm to about 3500 nm and an average thickness of from about 1 nm to about 400 nm.

In an embodiment of the eighth aspect, the nickel oxide nanoplatelets have an average platelet diameter of from about 40 nm to about 120 nm and an average thickness of from about 1 nm to about 4 nm.

In an embodiment of the eighth aspect, the nickel oxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the eighth aspect, the nickel oxide nanoplatelets further comprise an additional metal oxide selected from the group consisting of MgO, SrO, BaO, CaO, $TiO_2$, $ZrO_2$, FeO, $V_2O_3$, $V_2O_5$, $Mn_2O_3$, $Fe_2O_3$, CuO, $Al_2O_3$, $SiO_2$, ZnO, $Ag_2O$, $[Ce(NO_3)_3$—$Cu(NO_3)_2]TiO_2$, and mixtures thereof.

In a ninth aspect, a method of producing nickel hydroxide nanoplatelets is provided, the method comprising the steps of providing an electrolyzer comprising an anode compartment, a cathode compartment, and a center compartment situated between the anode compartment and the cathode compartment, and separated from the anode compartment and the cathode compartment by ion selective membranes; adding a solution of electrolyte at a pH of about 8 to the anode compartment; adding a solution of up to about 50 wt. % sodium hydroxide at a pH of 8 or higher to the cathode compartment; adding a solution of a second electrolyte to the center compartment, wherein the solution has from about 30,000 ppm chloride ion to about 200,000 ppm chloride ion; operating the cathode compartment at an amperage of 3.75 amps per square inch or less, whereby hydroxide ion is generated in the cathode compartment and migrates through its ion selective membrane into the center compartment, and whereby sodium ion is generated in the anode compartment and migrates through its ion selective membrane into the center compartment; and thereafter adding to the center compartment a solution of soluble nickel ion and a third electrolyte, the solution having from about 300 ppm to 100,000 ppm nickel ions and from about 5000 ppm to about 200,000 ppm anions, whereby the soluble nickel ion reacts with hydroxide ion to yield nickel hydroxide nanoplatelets, wherein a residence time in the center compartment of the nickel hydroxide nanoplatelets is from about 0.1 minutes to about 10 minutes.

In an embodiment of the ninth aspect, an additional soluble metal ion is added to the center compartment, wherein the additional soluble metal ion is selected from the group consisting of magnesium ion, strontium ion, barium ion, calcium ion, titanium ion, zirconium ion, iron ion, vanadium ion, manganese ion, copper ion, aluminum ion, cobalt ion, silicon ion, zinc ion, silver ion, cerium ion, and mixtures thereof.

In an embodiment of the ninth aspect, the solution comprises water.

In an embodiment of the ninth aspect, the solution of soluble nickel ion and an electrolyte is adjusted to a pH of 4.5 or less, whereby carbonates are removed from the solution.

In an embodiment of the ninth aspect, the solution of soluble nickel ion and an electrolyte is added to the center compartment at a temperature of from about 60° F. to about 190° F.

In an embodiment of the ninth aspect, the method further comprises the step of removing residual water from the nickel hydroxide nanoplatelets, whereby dried nickel hydroxide nanoplatelets are obtained.

In an embodiment of the ninth aspect, the method further comprises the step of applying heat to one side of the dried nickel hydroxide nanoplatelets, whereby nickel hydroxide is converted to nickel oxide through a portion of a thickness of the nanoplatelets, causing them to roll into nanotubes, whereby nickel (hydr)oxide nanotubes are obtained.

In an embodiment of the ninth aspect, the method further comprises the step of applying heat to the dried nickel hydroxide nanoplatelets, whereby nickel hydroxide is converted to nickel oxide through the thickness of the nanoplatelets, whereby nickel oxide nanoplatelets are obtained.

In an embodiment of the ninth aspect, the nickel hydroxide nanoplatelets have an average platelet diameter of from about 30 nm to about 3500 nm and an average thickness of from about 1 nm to about 400 nm.

In an embodiment of the ninth aspect, the nickel hydroxide nanoplatelets have an average platelet diameter of from about 40 nm to about 120 nm and an average thickness of from about 1 nm to about 4 nm.

In an embodiment of the ninth aspect, the first electrolyte, second electrolyte, and third electrolyte is sodium chloride.

In a tenth aspect, copper hydroxide nanoplatelets are provided, having an average platelet diameter of from about 30 nm to about 3500 nm and an average thickness of from about 1 nm to about 400 nm.

In an embodiment of the tenth aspect, the copper hydroxide nanoplatelets have an average platelet diameter of from about 40 nm to about 120 nm and an average thickness of from about 1 nm to about 4 nm.

In an embodiment of the tenth aspect, the copper hydroxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the tenth aspect, the copper hydroxide nanoplatelets have an average aspect ratio of from about 15 to about 70, an average BET specific surface area of from about 100 $m^2/g$ to about 150 $m^2/g$, and an average zeta potential of from about −4 mV to about −5 mV.

In an embodiment of the tenth aspect, the copper hydroxide nanoplatelets further comprise a second metal hydroxide selected from the group consisting of $Mg(OH)_2$, $Ca(OH)_2$, $Al(OH)_3$, $Sr(OH)_2$, $Ba(OH)_2$, $Fe(OH)_3$, $Ni(OH)_2$, $Co(OH)_2$, $Zn(OH)_2$, AgOH, and mixtures thereof.

In an embodiment of the tenth aspect, the copper hydroxide nanoplatelets further comprise at least one metal oxide. In some embodiments, the metal oxide is selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, $Al_2O_3$, $SiO_2$, ZnO, $Ag_2O$, $[Ce(NO_3)_3$—$Cu(NO_3)_2]$, and mixtures thereof.

In an embodiment of the tenth aspect, the copper hydroxide nanoplatelets are in a form of rolled nanotubes.

In an eleventh aspect, copper oxide nanoplatelets are provided, having an average platelet diameter of from about 30 nm to about 3500 nm and an average thickness of from about 1 nm to about 400 nm.

In an embodiment of the eleventh aspect, the copper oxide nanoplatelets have an average platelet diameter of from about 40 nm to about 120 nm and an average thickness of from about 1 nm to about 4 nm.

In an embodiment of the eleventh aspect, the copper oxide nanoplatelets have an average aspect ratio of from about 15 to about 70, an average BET specific surface area of from about 100 $m^2/g$ to about 150 $m^2/g$, and an average zeta potential of from about +60 mV to about −60 mV.

In an embodiment of the eleventh aspect, the copper oxide nanoplatelets further comprise an additional metal oxide selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, CuO, $Ni_2O_3$, $Al_2O_3$, $SiO_2$, ZnO, $Ag_2O$, $[Ce(NO_3)_3$—$Cu(NO_3)_2]$ $TiO_2$, and mixtures thereof.

In a twelfth aspect, a method of producing copper hydroxide nanoplatelets is provided, the method comprising the steps of providing an electrolyzer comprising an anode compartment, a cathode compartment, and a center compartment situated between the anode compartment and the cathode compartment, and separated from the anode compartment and the cathode compartment by ion selective membranes; adding a solution of electrolyte at a pH of about 8 to the anode compartment; adding a solution of up to about 50 wt. % sodium hydroxide at a pH of 8 or higher to the cathode compartment; adding a solution of a second electrolyte to the center compartment, wherein the solution has from about 30,000 ppm chloride ion to about 200,000 ppm chloride ion; operating the cathode compartment at an amperage of 3.75 amps per square inch or less, whereby hydroxide ion is generated in the cathode compartment and migrates through its ion selective membrane into the center compartment, and whereby sodium ion is generated in the anode compartment and migrates through its ion selective membrane into the center compartment; and thereafter adding to the center compartment a solution of soluble copper ion and a third electrolyte, the solution having from about 300 ppm to 100,000 ppm copper ions and from about 5000 ppm to about 200,000 ppm anions, whereby the soluble copper ion reacts with hydroxide ion to yield copper hydroxide nanoplatelets, wherein a residence time in the center compartment of the copper hydroxide nanoplatelets is from about 0.1 minutes to about 10 minutes.

In an embodiment of the twelfth aspect, an additional soluble metal ion is added to the center compartment, wherein the additional soluble metal ion is selected from the group consisting of magnesium ion, strontium ion, barium ion, calcium ion, titanium ion, zirconium ion, iron ion, vanadium ion, manganese ion, nickel ion, aluminum ion, cobalt ion, silicon ion, zinc ion, silver ion, cerium ion, and mixtures thereof.

In an embodiment of the twelfth aspect, the solution comprises water.

In an embodiment of the twelfth aspect, the solution of soluble copper ion and an electrolyte is adjusted to a pH of 4.5 or less, whereby carbonates are removed from the solution.

In an embodiment of the twelfth aspect, the solution of soluble copper ion and an electrolyte is added to the center compartment at a temperature of from about 60° F. to about 190° F.

In an embodiment of the twelfth aspect, the method further comprises the step of removing residual water from the copper hydroxide nanoplatelets, whereby dried copper hydroxide nanoplatelets are obtained.

In an embodiment of the twelfth aspect, the method further comprises the step of applying heat to one side of the dried copper hydroxide nanoplatelets, whereby copper hydroxide is converted to copper oxide through a portion of a thickness of the nanoplatelets, causing them to roll into nanotubes, whereby copper (hydr)oxide nanotubes are obtained.

In an embodiment of the twelfth aspect, the method further comprises the step of applying heat to the dried copper hydroxide nanoplatelets, whereby copper hydroxide is converted to copper oxide through the thickness of the nanoplatelets, whereby copper oxide nanoplatelets are obtained.

In an embodiment of the twelfth aspect, the copper hydroxide nanoplatelets have an average platelet diameter of from about 30 nm to about 3500 nm and an average thickness of from about 1 nm to about 400 nm.

In an embodiment of the twelfth aspect, the copper hydroxide nanoplatelets have an average platelet diameter of from about 40 nm to about 120 nm and an average thickness of from about 1 nm to about 4 nm.

In an embodiment of the twelfth aspect, the first electrolyte, second electrolyte, and third electrolyte is sodium chloride.

DETAILED DESCRIPTION OF THE PREFERRED EMBODIMENT

Figure 1:
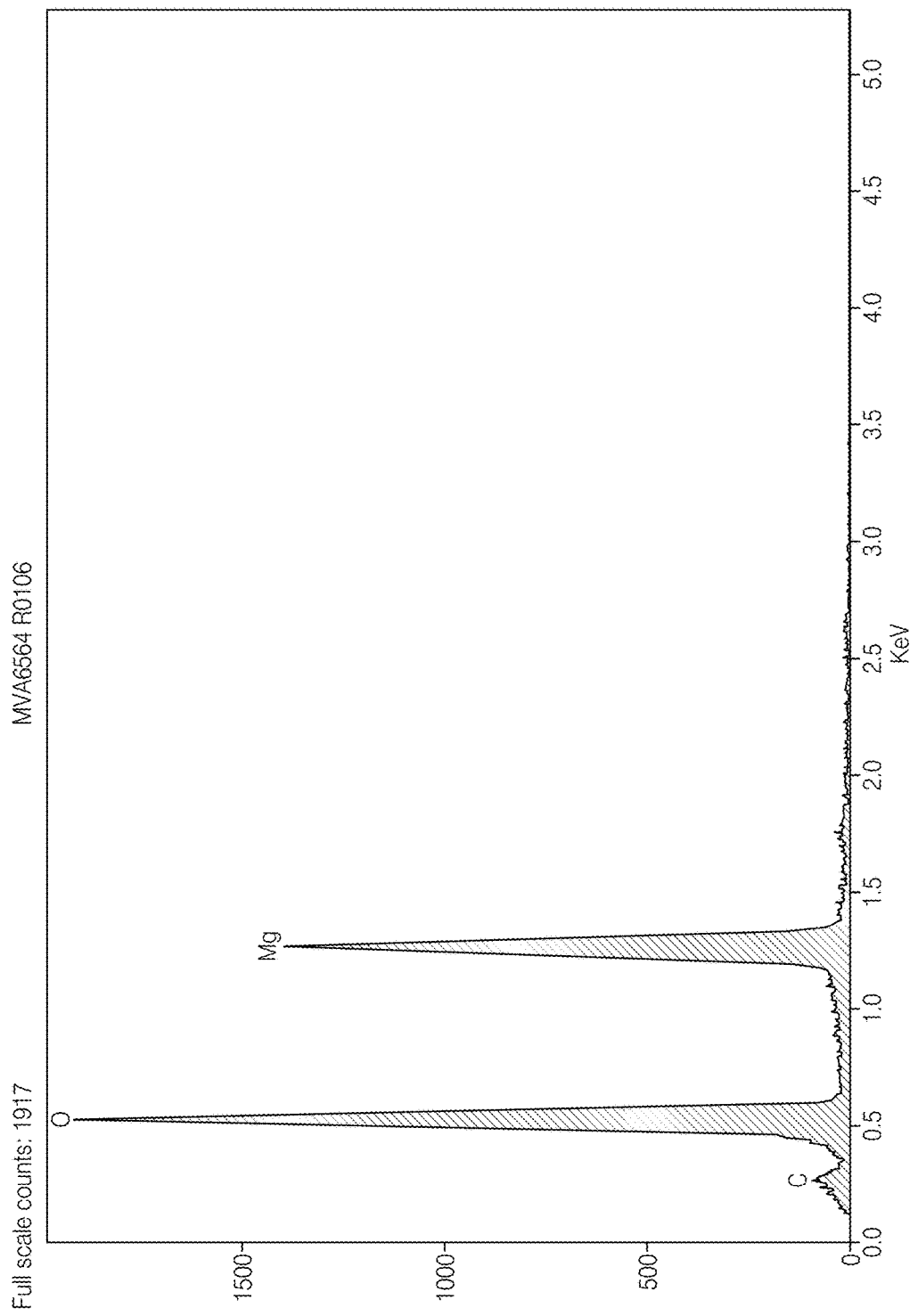
FIG. 1 is an energy dispersive x-ray spectrum obtained from $Mg(OH)_2$ nanoparticles within a slurry.

Methods and methodologies used to produce nanoplatelets and other forms of metal hydroxides are provided. The base materials used to make the process feedstock include, for example, a metal chloride (e.g., magnesium chloride ($MgCl_2$)) and sodium chloride (NaCl). Suitable base materials include commercially available bulk forms of sodium chloride and metal chlorides. A suitable form of magnesium chloride is marketed as FreezGard® magnesium chloride available from North American Salt Company of Overland Park, Kans. While magnesium chloride is particularly preferred, other sources of soluble magnesium ion can also be employed, for example other magnesium halides such as magnesium bromide and magnesium iodide, magnesium nitrate, and magnesium sulfide. Likewise, other metal ions (in the form of metal chlorides or other soluble metal ions), including, but not limited to, beryllium (Be), magnesium (Mg), calcium (Ca), strontium (Sr), barium (Ba), radium (Ra), scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lutetium (Lu), hafnium (Hf), tantalum (Ta), tungsten (W), rhenium (Re), osmium (Os), iridium (Ir), platinum (Pt), gold (Au), mercury (Hg), lawrencium (Lr), rutherfordium (Rf), dubnium (Db), seaborgium (Sg), bohrium (Bh), hassium (Hs), meitnerium (Mt), darmstadtium (Ds), roentgenium (Rg), unubium (Uub), aluminum (Al), gallium (Ga), indium (In), tin (Sn), thallium (Tl), lead (Pb), bismuth (Bi), lithium (Li), boron (B), sodium (Na), potassium (K), arsenic (As), germanium (Ge), antimony (Sb), lanthanum (La), praseodymium (Pr), neodymium (Nd), promethium (Pm), samarium (Sm), europium (Eu), gadolinium (Gd), terbium (Tb), dysprosium (Dy), holmium (Ho), eribum (Er), thulium (Tm), ytterbium (Yb), thorium (Th), and uranium (U) can be employed to produce nanoplatelets, nanotubes, and/or other particulate forms of various metal oxides and metal hydroxides. As used herein, the term "metal (hydr)oxide" is employed to refer to a metal hydroxide, a metal oxide, or mixtures thereof. Metal oxides and hydroxides that can be prepared according to the preferred embodiments include, but are not limited to, MgO, SrO, BaO, CaO, $TiO_2$, $ZrO_2$, FeO, $V_2O_3$, $V_2O_5$, $Mn_2O_3$, $Fe_2O_3$, NiO, $Ni_2O_3$, CuO, $Al_2O_3$, $SiO_2$, ZnO, $Ag_2O$, $[Ce(NO_3)_3$—$Cu(NO_3)_2]$ $TiO_2$, $Mg(OH)_2$, $Ca(OH)_2$, $Al(OH)_3$, $Sr(OH)_2$, $Ba(OH)_2$, $Fe(OH)_3$, $Cu(OH)_3$, $Ni(OH)_2$, $Co(OH)_2$, $Zn(OH)_2$, AgOH, mixed oxides and hydroxides of the foregoing metals, mixed metal oxides and/or hydroxides, and other combinations thereof.

The sodium chloride brings the electrolyte content of the water up so as to reduce its electrical resistance, thereby reducing electrical costs for the production of the metal hydroxide nanoplatelets or other metal oxide or hydroxide forms. While it is generally preferred to employ sodium chloride, other suitable electrolytes can also be employed, alone or in combination. Common electrolytes include ions such as sodium ($Na^+$), lithium ($Li^+$), potassium ($K^+$), calcium ($Ca^{2+}$), magnesium ($Mg^{2+}$), chloride ($Cl^-$), fluoride ($F^-$), bromide ($Br^-$), and the like.

The metal chloride and sodium chloride are mixed in a feedstock tank, with reverse osmosis (RO) water as a solvent to yield an ionic and gelatinous fluid. RO water is typically prepared by taking regular tap water, running it through a water softener, and then running the softened water through a reverse osmosis system. The purity of the RO water is similar to that of de-ionized (DI) water, but is considerably cheaper to produce. While RO water is generally preferred as a solvent due to its reduced costs, DI water, or water of similar purity can be employed as well. In certain embodiments, water of lesser purity (e.g., tap water) can be employed in the preparation of the metal (hydr)oxides of preferred embodiments.

The quantity of metal chloride and sodium chloride dissolved in the water is selected, along with other process conditions, so as to yield metal hydroxide particles of desired properties (e.g., particle size and/or morphology). In preferred embodiments, metal chloride is added to the RO water so as to yield a brine containing from about 300 ppm (or less) to about 100,000 ppm (or more) of metal ions, preferably about 1,500 ppm of metal ions. Sodium chloride is added to the RO water so as to yield a brine containing from about 5,000 ppm to about 200,000 ppm $Cl^-$, preferably about 43,000 ppm $Cl^-$.

About 8 fluid ounces (237 mg) of concentrated muriatic acid (hydrochloric acid) is added to 400 gallons (1,514 liters) of RO water that has been blended with metal chloride and sodium chloride to achieve a pH of approximately 4.5. At that pH level, any carbonates that are present in the salts are dissolved into the water. While a pH of 4.5 is particularly preferred, any suitable pH that will dissolve carbonate can also be employed. The dissolved carbonates are then removed by conversion into $CO_2$ gas which is degassed from the system, thereby minimizing carbonates solids forming in the precipitation operation. While muriatic acid is preferred for use in adjusting pH, other suitable acids can also be employed (e.g., hydrobromic acid, sulfuric acid, and the like). Depending upon the carbonate content (or lack thereof) of the feedstock materials, it can not be necessary to adjust the pH. Alternatively, in certain embodiments, the presence of carbonates solids in the precipitation operation is tolerable, and thus no special procedures for removing them are performed.

After the system is degassed of carbon dioxide ($CO_2$), the metal ion-containing feedstock is circulated through a heating system. It is preferred to operate the system at a temperature of from about 40° F. to about 200° F. (about 4° C. to about 93° C.), preferably from about 50° F. to about 190° F. (about 10° C. to about 88° C.), more preferably from about 60° F. to about 160° F. (about 16° C. to about 71° C.), even more preferably about 110° F. (about 43° C.). In some embodiments, the system can be operated at any suitable temperature from about the freezing point of the feedstock to about the boiling point of the feedstock. The feedstock is then sent to an electrolyzer divided into three compartments: an anode compartment; a cathode compartment; and a center fluid separator compartment between the anode and cathode compartments that separates fluids of the anodic compartment from the fluids of the cathodic compartment. While this particular electrolyzer configuration is generally preferred, other suitable configurations can also be employed. Other suitable electrolyzer configurations are employed in U.S. Pat. Nos. 7,048,843, 6,235,185, 6,375,825, 5,660,709, 5,496,454, 5,785,833, the disclosures of which are herein incorporated by reference in their entirety. Still other suitable electrolyzer configurations are outlined in U.S. Patent Publication Nos. 2003/0082095, 2004/0197255, 2007/0113779, and 2004/0108220, the disclosures of which are herein incorporated by reference in their entirety. The methods disclosed in these references can differ from those of the preferred embodiments, for example, with respect to parameters and the location of reaction. These differences result in nanoparticles that differ in size and morphology from the nanoplatelets produced according to the methods of preferred embodiments. Within the anode compartment is an anode electrode that is constructed out of titanium and coated with iridium oxide, and is in the form of a mesh with ¼-inch holes throughout (manufactured by Uhdenora S.p.A. of Milan, Italy; UHDE BM-2.7, anode compartment half shell including the anode electrode). While such electrodes are generally preferred, other electrodes and electrode configurations can also be employed (e.g., other metals such as platinum group metals (platinum or ruthenium, or oxides thereof), or plate or bar shaped electrodes instead of mesh). The compartment can operate from 0.1 to 3.75 amps per square inch. However, in certain embodiments it can be acceptable or even desirable to operate at lower or higher amperages. The electrical circuit for the anode compartment chamber can operate or be operated in either a series or parallel configuration, as is commonly employed in the chlor-alkali industry. NaCl in the anode compartment is split into chlorine gas and sodium ion ($Na^+$). The sodium ion travels through an ion selective membrane (manufactured by The Dow Chemical Company of Midland, Mich.) into the center compartment. Any suitable membrane can be employed that is permeable to sodium ions but resists the flow of water there through. Examples of ion selective membranes include glass membranes (e.g., silicates of chalcogenides), crystalline membranes (e.g., fluoride selective electrodes based on $LaF_3$ crystals), and ion exchange resin membranes (anion exchange, cation exchange, and mixed ion exchange membranes such as those prepared from polyvinyl, polystyrene, polyethylene, polyesters, epoxies, and silicones).

The cathode electrode, which is in the cathode chamber, is preferably constructed out of a nickel alloy in a perforated form to create many flux lines there through (manufactured by Uhdenora S.p.A. of Milan, Italy; UHDE BM-2.7, cathode half shell including electrode). Alternatively, the cathode electrode can be constructed of #316 stainless steel. While these electrode configurations and materials are particularly preferred, other electrode configurations and materials can also be suitable for use (e.g., electrode materials and configurations as described above with reference to the anode electrode), with process conditions adjusted accordingly. The cathode compartment preferably operates with a sodium hydroxide solution up to about 50% by weight or can operate with a NaCl solution or other electrolyte solution. The cathode compartment can also operate at 3.75 amps per square inch or less. The electrical circuit for the cathode compartment chamber can operate or be operated in either a series or parallel configuration. Water is split in the cathode chamber to yield hydrogen gas and hydroxyl ions. An ion selective membrane rests on the cathode electrode and faces the center fluid separator compartment, allowing hydroxyl ions to pass there through.

The fluid within the anodic compartment is preferably at a pH of about 1, and the fluid within the cathode compartment is preferably at a pH above 8.5. Electricity can flow freely through the center fluid separator compartment, but hydrophobic ion selective membranes restrict the movement of water into it, thereby allowing the cathode compartment and anode compartment to contain their own separate fluids. The center compartment includes an inlet and an outlet and is situated between the two ion selective membranes (manufactured by The Dow Chemical Company of Midland, Mich.). The center chamber operates with a positive pressure to keep each of the membranes in place. Suitable membranes include electrodeionization membranes such as those sold under the trademark OMEXELL™ by The Dow Chemical Company.

The ion selective membranes selectively allow ions to pass into the center fluid separator compartment where metal hydroxide precipitation takes place, and from which metal hydroxide nanoplatelets are harvested. This process occurs as follows. A sodium ion passes through the anode ion selective membrane into the center compartment, and a hydroxyl ion passes through the cathode ion selective membrane into the center compartment. Metal ions from the metal chloride in the center compartment react with hydroxyl ions to form solid metal hydroxide leaving a free chlorine ion. The sodium ion from the anode compartment reacts with the free chlorine ion from the metal chloride in the center compartment to form sodium chloride.

Prior to initiating metal hydroxide precipitation in the electrolyzer, RO water is heated in a tank to a temperature of about 120° F. Sodium chloride is added to the RO water until a $Cl^-$ concentration of about 30,000 parts per million to about 200,000 parts per million is reached, yielding a very conductive solution. In a preferred embodiment, sodium chloride is added to the RO water until a $Cl^-$ concentration of about 75,000 parts per million is reached. The RO water with added sodium chloride at the elevated temperature is pumped into the center chamber to fill it completely. The cathode and anode compartments are then filled with their respective fluids. Next, the current in the electrolyzer is brought up to the desired level, preferably levels as described above. Current in the electrolyzer can be brought to a current of from about 4.00 Amps per square inch to about 0.10 Amps per square inch. In certain embodiment, it may be desirable to achieve a current higher than 4.00 Amps per square inch or lower than 0.10 Amps per square inch. In a preferred embodiment, the current is brought to about 0.75 Amps per square inch. The current generates hydroxyl ($OH^-$) ions in the cathode chamber by splitting water, thereby driving the pH up.

When a desired pH, such as a pH of about 11, is reached throughout the fluid, the metal-containing feedstock is added to the center fluid separator compartment. When the metal-containing feedstock is added to the high pH RO water with added sodium chloride, the metal ions are attracted to the electrode flux grid line, where they react with hydroxyls to yield metal hydroxide. After nucleation, metal hydroxide adds to the nucleus in a flat plane along the flux lines, such that in the remaining crystal growth, metal hydroxides attach around the border of the nucleation crystal in conformity with the flux lines, yielding crystalline nanoplatelets in the center compartment. By adjusting selected variables, the particle size and morphology of the metal hydroxide can be controlled. The residence time of feedstock flow through the center compartment can be adjusted to set the particle size (with faster flow rates resulting in smaller particle size). Feedstock residence times of from about 0.1 minute or less to about 10 minutes or more are generally preferred. The quality of flux line by the energy passing between the opposing compartments and temperature can be adjusted to control the speed of the reaction. By adjusting these parameters, metal hydroxide platelets of uniform size can be produced. Tight size distributions can be obtained for particles having an average platelet size of 3.5 microns in the X/Y dimension and 100 nm in the Z dimension down to particles having an average platelet size of 30 nm in the X/Y dimension and 2.5 nm in the Z dimension. Generally, the faster the nanoplatelets are harvested, as long as a pH above the precipitation point is maintained for the metal being produced, the smaller the resulting nanoplatelets. The preferred dimensions will depend upon the application and the system will be adjusted accordingly.

Sodium chloride (NaCl) is converted to chlorine ($Cl_2$ gas) in the anode compartment, and the resulting sodium ion migrates to the cathode compartment. As discussed above, in the cathode compartment water is split to release hydrogen gas ($H_2$ gas), leaving a hydroxyl ion which combines with a metal ion from the metal chloride to form metal hydroxide. Chloride ion combines with the sodium ion in the cathode compartment to form sodium chloride.

The electrolyzer incorporates a pipe that allows elemental hydrogen gas generated during water splitting to leave the cathode compartment. Another pipe in the anode compartment allows elemental chlorine gas produced to leave. In the production of magnesium hydroxide, approximately 6.34 cubic feet of hydrogen gas weighing 0.07 pounds is generated for every pound of magnesium hydroxide that is produced, and approximately 6 cubic feet of chlorine gas weighing 1.2 pounds is generated for every pound of magnesium hydroxide produced. The hydrogen and/or chlorine gas can be disposed of, or captured for use as feedstocks in other processes. In preferred embodiments, the chlorine gas can be employed to produce sodium hydrochloric bleach at a 15% density. While a pipe is a particularly preferred component for venting gas, other components can also be employed (e.g., a passageway, a gas permeable sheet, or the like).

The nanoplatelet-containing fluid is removed to a catch basin, and then to a centrifuge where metal hydroxide is separated from the supernatant containing ions in water. The supernatant is recycled back into the feedstock system so as to recover metal ions, sodium ions, and chlorine ions. After the centrifuge discharges the metal hydroxide solids in the form of a gel, the solids are washed. Preferably, approximately 5 gallons of gel, corresponding to about 5 pounds of metal hydroxide dry-weight, are washed with approximately 50 gallons of water. The washed metal hydroxide is cycled back through the centrifuge and the recovered gel is washed again. Preferably, four washes are conducted to yield metal hydroxide of approximately 99+ % purity. Table 1 presents purity data for three magnesium hydroxide nanoplatelet samples subjected to the preferred washing cycle. The first wash is 10:1 (e.g., 5 gallons gel to 50 gallons water), the second wash is 100:1, the third wash is 1,000:1, and the fourth wash is 10,000:1 in the specified dilution ratios. Depending upon the desired purity of the resulting metal hydroxide nanoplatelets, fewer (e.g., only one, two or three washes) steps can be conducted, or additional (e.g., five or more washes, or other separation processes) steps can be conducted.

TABLE 1A

Purity Data for Magnesium Hydroxide Sample 1
Sample 1

| Test | Result (Wt. %) | Detection Limit | Method |
|---|---|---|---|
| Calcium | 0.0078 | 0.0001 | ICP |
| Chloride, Total | 0.1298 | 0.0001 | SOP-CL |
| Iron | 0.0612 | 0.0001 | ICP |
| Magnesium Hydroxide | 99.46 | 0.0001 | ICP |
| Moisture | 92.91 | 0.0001 | OVEN |
| Silica ($SiO_2$) | 0.192 | 0.0001 | ICP |
| Sodium | 0.014 | 0.0001 | ICP |
| Sulfate ($SO_4$) | <0.0001 | 0.0001 | 375.4 |

TABLE 1B

Purity Data for Magnesium Hydroxide Sample 2
Sample 2

| Test | Result (Wt. %) | Detection Limit | Method |
|---|---|---|---|
| Calcium | 0.286 | 0.0001 | ICP |
| Chloride, Total | 0.1706 | 0.0001 | SOP-CL |
| Iron | 0.0451 | 0.0001 | ICP |
| Magnesium Hydroxide | 99.02 | 0.0001 | ICP |
| Moisture | 36.05 | 0.0001 | OVEN |
| Silica ($SiO_2$) | 0.162 | 0.0001 | ICP |
| Sodium | 0.0084 | 0.0001 | ICP |
| Sulfate ($SO_4$) | <0.0001 | 0.0001 | 375.4 |

TABLE 1C

Purity Data for Magnesium Hydroxide Sample 3
Sample 3

| Test | Result (Wt. %) | Detection Limit | Method |
|---|---|---|---|
| Calcium | 0.0099 | 0.0001 | ICP |
| Chloride, Total | 0.1136 | 0.0001 | SOP-CL |
| Iron | 0.0673 | 0.0001 | ICP |
| Magnesium Hydroxide | 99.46 | 0.0001 | ICP |
| Moisture | 2.72 | 0.0001 | OVEN |
| Silica ($SiO_2$) | 0.178 | 0.0001 | ICP |
| Sodium | 0.0329 | 0.0001 | ICP |
| Sulfate ($SO_4$) | <0.0001 | 0.0001 | 375.4 |

Depending upon the end use, the washed metal hydroxide nanoplatelets can be used in gel form (the product from the centrifuge), or can be subject to drying. In preferred embodiments, the metal hydroxide can be dried using spray drying equipment using a rotary atomizer or other nozzle configuration. Nozzle inlet temperatures of 280° C. and outlet temperatures of 120° C. for spray drying metal hydroxide can be employed; however, any suitable temperature or method for removing liquid from the metal hydroxide can be employed.

When the magnesium hydroxide particles in gel form are subjected to drying in a dryer, a particle form referred to as the "Desert Rose configuration" can be obtained. Magnesium hydroxide in the Desert Rose configuration is particularly well suited for use in the polymer and coatings industry.

Under the torque of compounding, the lightly-bound together petals of the Desert Rose disassemble to separate nanoplatelets, which are particularly useful, for example as a flame retardant. Alternatively, magnesium hydroxide in the gel state or slurry form can be used in the paper industry.

Magnesium Hydroxide nanoplatelets in slurry form were prepared by the method described above. Particularly, the center compartment of the electrolyzer was filled with RO water containing NaCl at a concentration of 75,000 ppm. The cathode and anode compartments were subsequently filled with RO water containing NaCl at a concentration of 75,000 ppm. The pressure in the center compartment was maintained at a higher level than that of the anode and cathode compartments to keep the selective ion membrane in place. The current in the machine was brought up to 7 volts at 0.75 Amps/Square Inch. The temperature of the contents within the three compartments was maintained at about 110° F. (about 43° C.) at a pH of about 11. Feedstock was formulated with a final concentration of $Cl^-$ ions at 30,000 ppm and $Mg^{2+}$ ions at 1500 ppm. The feedstock was fed through the center compartment at a rate of one gallon per minute, resulting in a residence time of 10 minutes. Material was collected in the catch basin and centrifuged. Slurry collected after centrifugation was tested to determine the characteristics of the particles within the slurry. The chemical composition of the slurry was determined by energy dispersive x-ray spectrometric analysis of a dried sample in a JEOL JSM 6500 field emission scanning electron microscope using a Noran Vantage energy dispersive x-ray spectrometer. transmission electron micrographs were obtained using either a Philips 420 or a Philips CM120 transmission electron microscope equipped with an SIA digital imaging system. Samples were also examined by atomic force microscopy (AFM). BET specific surface areas of the samples as well as the zeta potential were also calculated. A summary of the results of the characterization is given in Table 2.

TABLE 2

Summary of Characterization Efforts

| | | |
|---|---|---|
| Crystal Structure: | | Brucite: $Mg(OH)_2$ |
| Platelet Diameter: | (FESEM) | 72 +/− 21 nm |
| | (TEM) | 72 +/− 28 nm |
| | (AFM) | 80.9 +/− 29.5 nm |
| Platelet Thickness: | (FESEM) | not available |
| | (TEM) | 2.5 +/− 0.8 nm |
| | (AFM) | 2.3 +/− 1.1 nm |
| Aspect Ratio: | (FESEM) | not available |
| | (TEM) | 30 +/− 17 |
| | (AFM) | 43 +/− 25 |
| Equivalent Spherical Diameter: | (FESEM) | not available |
| | (TEM) | 26 +/− 8 nm |
| | (AFM) | 27 +/− 7 nm |
| BET Specific Surface Area: | | 129 $m^2/g$ |
| Zeta Potential: | | −4.2 mV |

Figure 2:
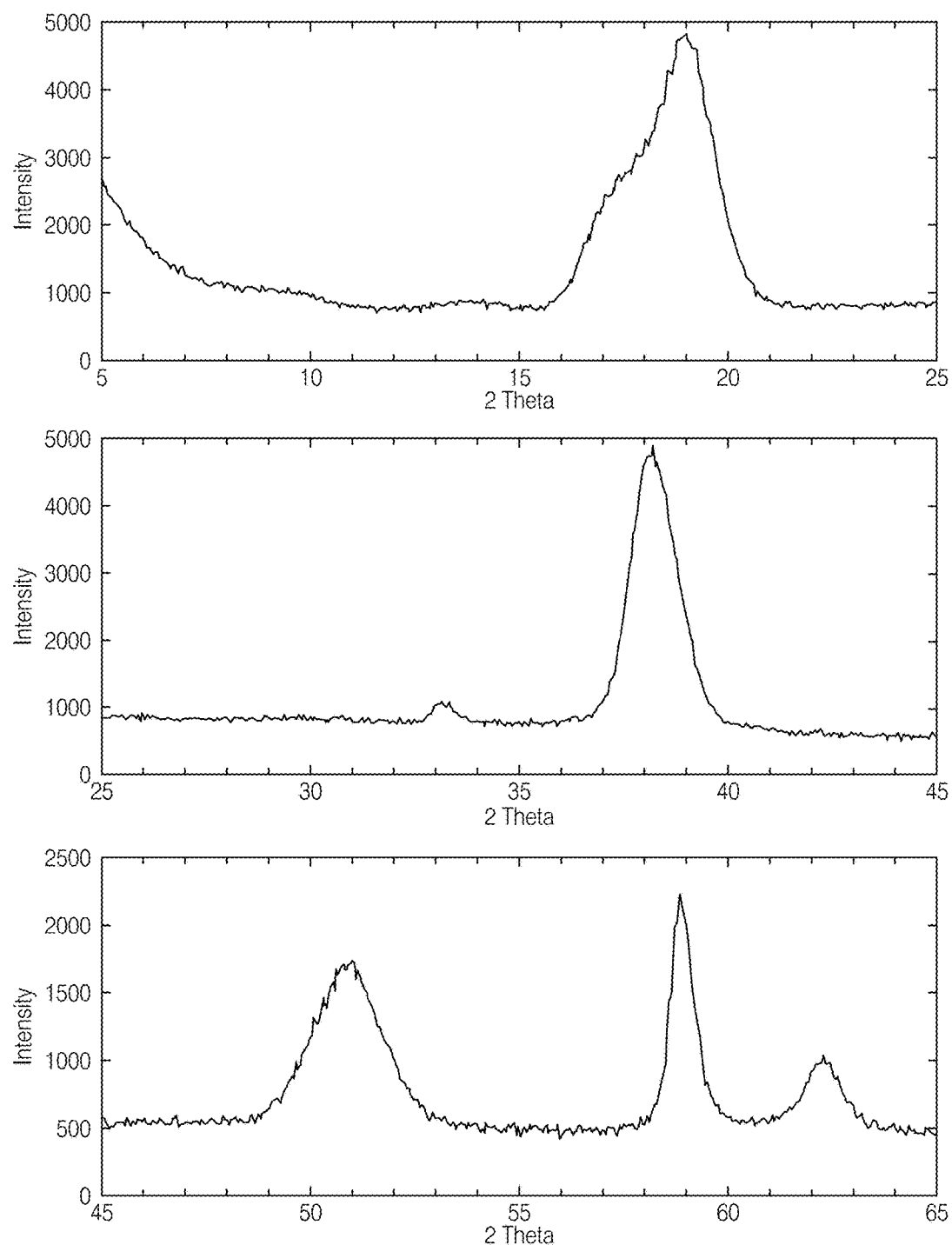
FIG. 2 is a diffraction pattern obtained for $Mg(OH)_2$ slurry particles.

FIG. 1 is an energy dispersive x-ray spectrum obtained from particles of the slurry The spectrum confirmed that the particles were composed of magnesium and oxygen, which is consistent with $Mg(OH)_2$, as the method is not sensitive to hydrogen. The Energy-Dispersive X-ray Spectroscopy (EDS) spectrum was consistent with that expected for magnesium hydroxide. X-ray Diffraction analysis indicated the particles had a crystal structure characterized as brucite ($Mg(OH)_2$). Table 3 shows the position of the peaks in the pattern compared to known peaks for brucite. FIG. 2 is the diffraction pattern obtained for the brucite particles. The relatively broad peaks in FIG. 2 are due to the very small particle size of the slurry particles.

TABLE 3

X-ray Diffraction Results
(Cu Ka, 40 kV, 20 mA, 0.05° steps, 4 sec. count time)

| Observed 2-theta | d-spacing | d-spacing (Brucite) |
|---|---|---|
| 19.00 | 4.67 å | 4.77 å |
| 33.15 | 2.70 | 2.72 |
| 38.20 | 2.36 | 2.37 |
| 50.85 | 1.80 | 1.79 |
| 58.95 | 1.57 | 1.57 |
| 62.30 | 1.49 | 1.49 |

Figure 3:
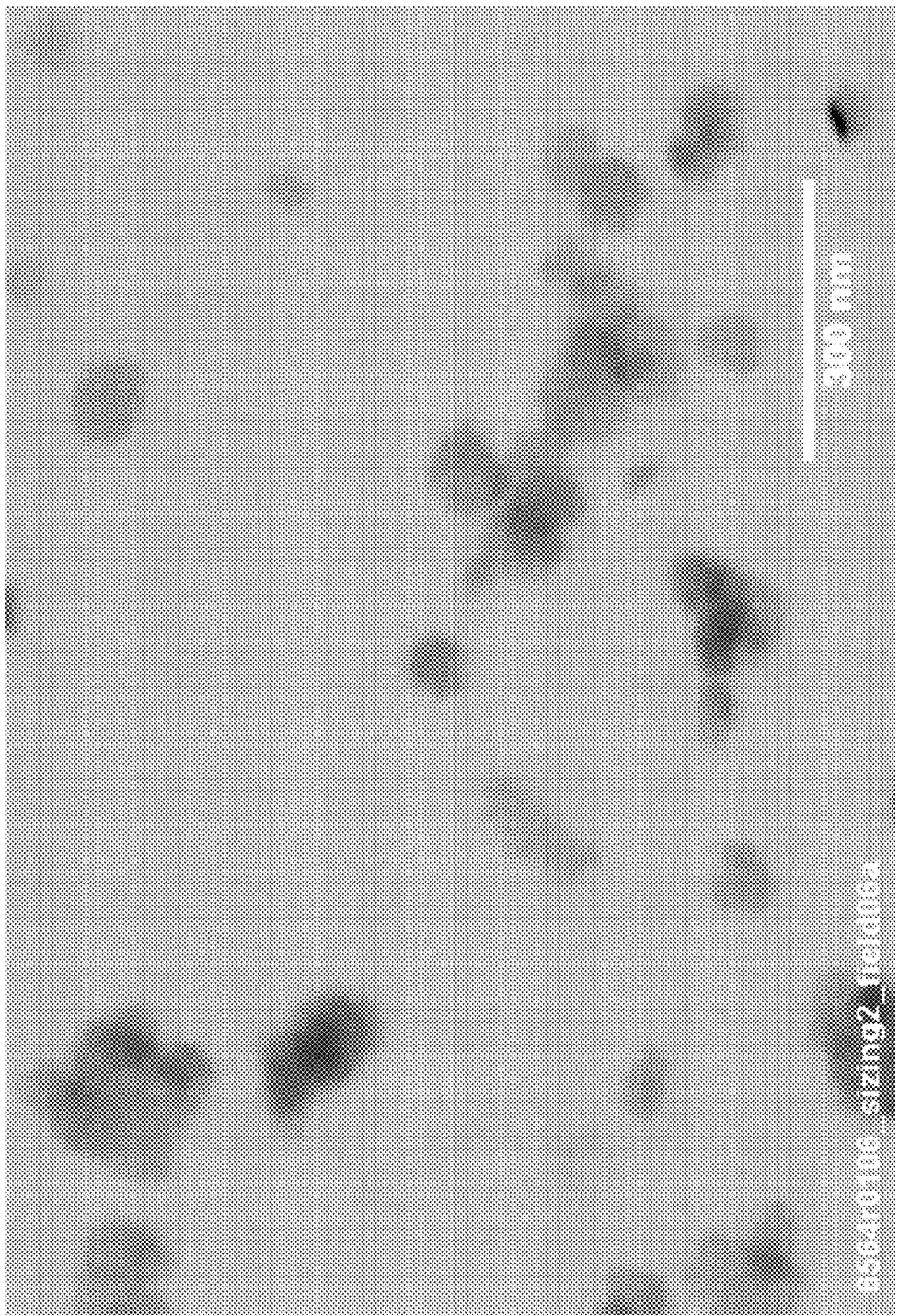
FIG. 3 is a scanning transmission electron micrograph image of $Mg(OH)_2$ slurry particles.

To determine particle size and morphology, particles in the slurry were dispersed in isopropanol, ultrasonicated, and transferred to the analytical substrate in an atomizing spray. Dispersed samples were prepared on a thin carbon film supported by a standard copper TEM grid. For Field Emission Scanning Electron Microscopy (FESEM) examination, the TEM grid bearing dispersed particles was placed in a JEOL scanning transmission electron microscopy (STEM) sample holder and the sample holder placed in the FESEM. FIG. 3 shows a typical STEM image of dispersed particles.

STEM images of several fields of view were obtained using a Noran Vantage digital imaging system, and the diameters of individual particles were sized using the image processing and particle sizing functions of ImageJ, an image measurement software package distributed and maintained by the National Institutes of Health. The results of measurement of the diameter of 156 platelets by FESEM are summarized in Table 4.

TABLE 4

FESEM Particle Diameter Measurement Results

| Particle Number | Major Axis (nm) | Minor Axis (nm) | Average Diameter (nm) |
|---|---|---|---|
| 1 | 62 | 46 | 54 |
| 2 | 57 | 46 | 51 |
| 3 | 74 | 55 | 65 |
| 4 | 110 | 106 | 108 |
| 5 | 96 | 76 | 86 |
| 6 | 121 | 70 | 96 |
| 7 | 42 | 36 | 39 |
| 8 | 68 | 57 | 63 |
| 9 | 61 | 49 | 55 |
| 10 | 97 | 70 | 83 |
| 11 | 68 | 54 | 61 |
| 12 | 77 | 70 | 74 |
| 13 | 74 | 65 | 70 |
| 14 | 108 | 89 | 99 |
| 15 | 47 | 38 | 42 |
| 17 | 84 | 75 | 79 |
| 18 | 119 | 68 | 94 |
| 19 | 65 | 52 | 58 |
| 20 | 93 | 77 | 85 |
| 21 | 81 | 64 | 72 |
| 22 | 94 | 84 | 89 |
| 23 | 40 | 26 | 33 |
| 24 | 35 | 29 | 32 |
| 25 | 65 | 57 | 61 |
| 26 | 138 | 101 | 120 |
| 27 | 91 | 74 | 83 |
| 28 | 106 | 47 | 77 |
| 29 | 98 | 87 | 92 |
| 30 | 60 | 48 | 54 |
| 31 | 100 | 57 | 79 |
| 32 | 101 | 75 | 88 |
| 33 | 47 | 29 | 38 |
| 34 | 83 | 41 | 62 |
| 35 | 107 | 97 | 102 |
| 36 | 109 | 83 | 96 |
| 37 | 101 | 78 | 90 |
| 38 | 162 | 129 | 146 |
| 39 | 93 | 69 | 81 |
| 40 | 152 | 127 | 139 |
| 41 | 45 | 39 | 42 |
| 43 | 85 | 75 | 80 |
| 44 | 56 | 54 | 55 |
| 45 | 100 | 85 | 93 |
| 46 | 115 | 95 | 105 |
| 47 | 69 | 67 | 68 |
| 48 | 118 | 108 | 113 |
| 49 | 61 | 53 | 57 |
| 50 | 102 | 92 | 97 |
| 51 | 81 | 61 | 71 |
| 52 | 59 | 40 | 50 |
| 53 | 78 | 65 | 71 |
| 54 | 128 | 69 | 98 |
| 55 | 122 | 109 | 115 |
| 57 | 97 | 73 | 85 |
| 58 | 56 | 35 | 45 |
| 59 | 68 | 49 | 58 |
| 60 | 45 | 39 | 42 |
| 61 | 85 | 60 | 73 |
| 62 | 56 | 45 | 51 |
| 63 | 90 | 65 | 78 |
| 64 | 44 | 36 | 40 |
| 65 | 84 | 65 | 74 |
| 66 | 108 | 77 | 93 |
| 67 | 73 | 69 | 71 |
| 68 | 87 | 41 | 64 |
| 69 | 93 | 68 | 81 |
| 70 | 87 | 69 | 78 |
| 71 | 90 | 61 | 76 |
| 72 | 111 | 86 | 98 |
| 73 | 107 | 83 | 95 |
| 74 | 86 | 72 | 79 |
| 75 | 86 | 71 | 79 |
| 76 | 45 | 38 | 41 |
| 77 | 70 | 61 | 66 |
| 78 | 94 | 68 | 81 |
| 79 | 117 | 95 | 106 |
| 80 | 62 | 46 | 54 |
| 81 | 108 | 80 | 94 |
| 83 | 59 | 56 | 58 |
| 84 | 51 | 48 | 50 |
| 85 | 66 | 49 | 57 |
| 86 | 71 | 68 | 69 |
| 87 | 64 | 42 | 53 |
| 88 | 76 | 32 | 54 |
| 89 | 55 | 46 | 50 |
| 90 | 73 | 67 | 70 |
| 91 | 45 | 40 | 42 |
| 92 | 100 | 86 | 93 |
| 93 | 71 | 56 | 64 |
| 94 | 70 | 55 | 62 |
| 95 | 102 | 54 | 78 |
| 96 | 56 | 41 | 48 |
| 97 | 106 | 59 | 83 |
| 98 | 50 | 35 | 42 |
| 99 | 107 | 70 | 88 |
| 100 | 66 | 57 | 62 |
| 101 | 68 | 60 | 64 |
| 102 | 73 | 54 | 64 |
| 103 | 84 | 81 | 82 |
| 104 | 76 | 62 | 69 |
| 105 | 98 | 53 | 76 |
| 106 | 51 | 38 | 44 |
| 107 | 43 | 42 | 43 |
| 108 | 81 | 37 | 59 |
| 109 | 76 | 62 | 69 |
| 110 | 103 | 63 | 83 |
| 111 | 80 | 54 | 67 |
| 112 | 51 | 39 | 45 |
| 113 | 110 | 68 | 89 |
| 114 | 79 | 62 | 70 |
| 115 | 68 | 51 | 59 |
| 116 | 125 | 98 | 112 |
| 117 | 65 | 63 | 64 |
| 118 | 67 | 56 | 61 |
| 119 | 108 | 96 | 102 |
| 120 | 60 | 48 | 54 |
| 121 | 85 | 79 | 82 |
| 122 | 164 | 76 | 120 |
| 123 | 87 | 60 | 73 |
| 124 | 56 | 37 | 47 |
| 125 | 83 | 67 | 75 |
| 126 | 86 | 77 | 82 |
| 127 | 59 | 44 | 52 |
| 128 | 75 | 57 | 66 |
| 129 | 64 | 58 | 61 |
| 130 | 51 | 45 | 48 |
| 131 | 83 | 44 | 64 |
| 132 | 56 | 45 | 50 |
| 133 | 68 | 38 | 53 |
| 134 | 100 | 68 | 84 |
| 135 | 50 | 34 | 42 |
| 136 | 107 | 58 | 83 |
| 137 | 84 | 62 | 73 |
| 138 | 92 | 78 | 85 |

TABLE 4-continued

FESEM Particle Diameter Measurement Results

| Particle Number | Major Axis (nm) | Minor Axis (nm) | Average Diameter (nm) |
|---|---|---|---|
| 139 | 57 | 52 | 55 |
| 140 | 68 | 56 | 62 |
| 141 | 84 | 54 | 69 |
| 143 | 85 | 72 | 79 |
| 144 | 104 | 81 | 93 |
| 145 | 137 | 85 | 111 |
| 146 | 59 | 36 | 47 |
| 147 | 51 | 48 | 50 |
| 148 | 57 | 38 | 48 |
| 149 | 63 | 41 | 52 |
| 150 | 74 | 59 | 67 |
| 151 | 74 | 61 | 68 |
| 152 | 82 | 76 | 79 |
| 153 | 83 | 53 | 68 |
| 155 | 75 | 66 | 70 |
| 156 | 58 | 42 | 50 |
| 157 | 83 | 70 | 77 |
| 158 | 102 | 72 | 87 |
| 159 | 90 | 69 | 80 |
| 160 | 109 | 84 | 97 |
| average st dev | | | 71.8 |
| | | | 21.1 |

Field Emission Scanning Electron Microscopy (FESEM) showed particles in the form of thin platelets in a narrow size distribution (approximately 50 to 100 nm in the longest dimension). Of the platelets measured: 3.3% of platelets were from about 30 nm to about 40 nm in diameter; 14.9% of platelets were from about 41 nm to about 50 nm in diameter; 13% of platelets were from about 51 nm to about 60 nm in diameter; 20.1% of platelets were from about 61 nm to about 70 nm in diameter; 16.2% of platelets were from about 71 nm to about 80 nm in diameter; 14.3%% of platelets were from about 81 nm to about 90 nm in diameter; 9.7% of platelets were from about 91 nm to about 100 nm in diameter; 3.3% of platelets were from about 101 nm to about 110 nm in diameter; 3.9% of platelets were from about 111 nm to about 120 nm in diameter; 0.7% of platelets were from about 131 nm to about 140 nm in diameter; 0.7% of platelets were from about 141 nm to about 150 nm in diameter. The Energy-Dispersive X-ray Spectroscopy (EDS) spectrum was consistent with that expected for magnesium hydroxide.

Figure 4:
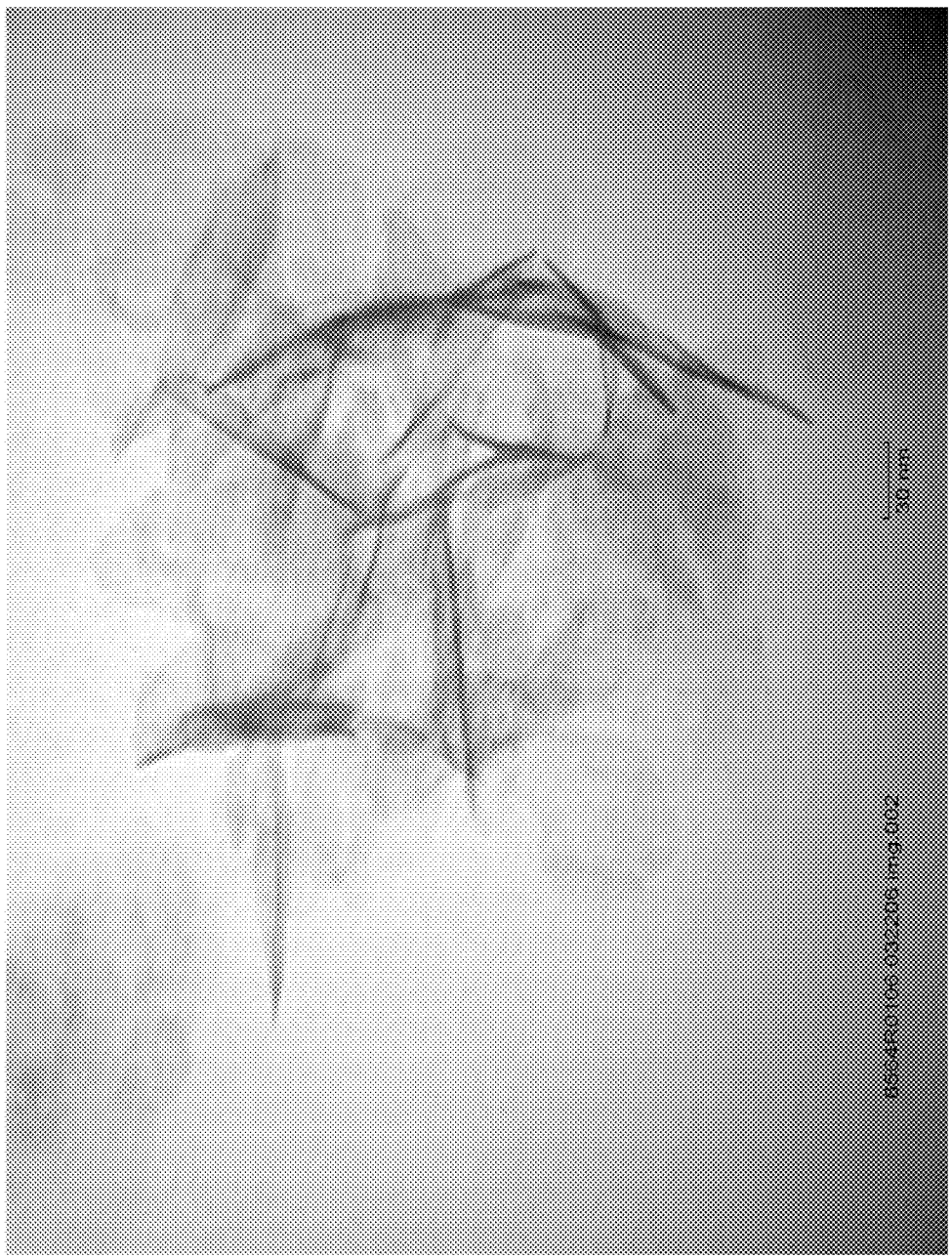
FIG. 4 is a transmission electron micrograph of $Mg(OH)_2$ slurry particles.

Particle dispersions were prepared in a similar manner for TEM analysis. Clusters of platelets were analyzed, with some platelets oriented perpendicular to the viewing axis, allowing measurement of platelet diameter as well as platelet thickness (FIG. 4). Table 5 contains the results of particle diameter, thickness, and aspect ratios as measured by TEM.

TABLE 5

Particle Diameters, Thicknesses, Aspect Ratios and Equivalent Spherical Diameters from TEM Images

| Particle | Diam. (nm) | Thick. (nm) | Aspect Ratio | ESD (nm) |
|---|---|---|---|---|
| 1 | 43.7 | 1.4 | 31.0 | 15.9 |
| 2 | 87.3 | 2.9 | 30.1 | 32.1 |
| 3 | 53.7 | 2.9 | 18.4 | 23.3 |
| 4 | 55.6 | 2.2 | 25.5 | 21.6 |
| 5 | 49.2 | 2.7 | 18.2 | 21.4 |
| 6 | 36.4 | 2.4 | 15.2 | 16.8 |
| 7 | 44.9 | 2.0 | 23.0 | 18.1 |
| 8 | 77.3 | 1.7 | 44.3 | 25.0 |
| 9 | 40.0 | 2.9 | 13.8 | 19.1 |
| 10 | 52.0 | 1.4 | 36.8 | 17.9 |
| 11 | 70.5 | 2.4 | 29.6 | 26.1 |
| 12 | 58.5 | 2.0 | 29.3 | 21.7 |
| 13 | 115.7 | 2.7 | 42.3 | 38.0 |
| 14 | 74.8 | 1.7 | 42.9 | 24.5 |
| 15 | 50.2 | 2.9 | 17.2 | 22.2 |
| 16 | 60.3 | 2.8 | 21.9 | 24.7 |
| 17 | 52.5 | 2.4 | 21.7 | 21.6 |
| 18 | 74.1 | 2.5 | 29.7 | 27.4 |
| 19 | 71.6 | 3.8 | 19.1 | 30.7 |
| 20 | 36.6 | 2.6 | 14.2 | 17.3 |
| 21 | 38.3 | 2.2 | 17.7 | 16.8 |
| 22 | 69.5 | 2.7 | 25.4 | 27.1 |
| 23 | 62.2 | 3.1 | 20.1 | 26.2 |
| 24 | 61.7 | 2.5 | 24.8 | 24.2 |
| 25 | 51.6 | 2.3 | 22.6 | 20.9 |
| 26 | 108.9 | 2.5 | 44.1 | 35.3 |
| 27 | 51.3 | 2.2 | 23.7 | 20.5 |
| 28 | 42.6 | 1.6 | 26.3 | 16.4 |
| 29 | 111.5 | 3.0 | 37.3 | 38.2 |
| 30 | 59.8 | 2.0 | 30.6 | 21.9 |
| 31 | 29.9 | 2.3 | 13.1 | 14.5 |
| 32 | 58.7 | 3.5 | 17.0 | 26.2 |
| 33 | 50.6 | 3.1 | 16.4 | 22.8 |
| 34 | 78.4 | 2.2 | 35.8 | 27.2 |
| 35 | 121.3 | 2.7 | 44.9 | 39.1 |
| 36 | 55.3 | 3.4 | 16.5 | 24.9 |
| 37 | 143.1 | 3.4 | 41.8 | 47.2 |
| 38 | 56.9 | 1.6 | 35.1 | 19.9 |
| 39 | 50.5 | 2.2 | 23.3 | 20.2 |
| 40 | 45.7 | 1.2 | 37.8 | 15.6 |
| 41 | 114.6 | 3.7 | 31.1 | 41.7 |
| 42 | 90.5 | 3.1 | 29.2 | 33.6 |
| 43 | 84.1 | 1.5 | 54.3 | 25.4 |
| 44 | 97.7 | 2.1 | 47.6 | 30.9 |
| 45 | 118.2 | 2.1 | 57.2 | 35.1 |
| 46 | 49.3 | 1.5 | 33.9 | 17.4 |
| 47 | 31.8 | 2.0 | 16.3 | 14.3 |
| 48 | 48.6 | 2.4 | 20.0 | 20.5 |
| 49 | 50.5 | 1.2 | 41.7 | 16.7 |
| 50 | 41.1 | 2.8 | 14.9 | 19.1 |
| 51 | 117.8 | 2.1 | 56.6 | 35.1 |
| 52 | 45.3 | 1.5 | 31.2 | 16.5 |
| 53 | 55.9 | 2.3 | 24.4 | 22.1 |
| 54 | 40.9 | 1.7 | 23.4 | 16.4 |
| 55 | 92.9 | 2.6 | 35.6 | 32.3 |
| 56 | 96.4 | 1.0 | 96.6 | 24.0 |
| 57 | 43.9 | 2.9 | 15.1 | 20.3 |
| 58 | 73.0 | 1.5 | 47.2 | 23.1 |
| 59 | 79.2 | 3.4 | 23.2 | 31.8 |
| 61 | 115.1 | 3.1 | 37.2 | 39.5 |
| 62 | 45.1 | 4.6 | 9.8 | 24.1 |
| 63 | 101.7 | 2.8 | 36.0 | 35.2 |
| 64 | 77.5 | 2.4 | 32.0 | 27.9 |
| 65 | 77.1 | 1.7 | 44.2 | 25.0 |
| 66 | 100.5 | 2.0 | 50.4 | 31.2 |
| 67 | 60.1 | 1.9 | 31.0 | 21.9 |
| 68 | 38.2 | 2.9 | 13.1 | 18.5 |
| 69 | 113.5 | 2.4 | 46.9 | 36.0 |
| 70 | 75.3 | 1.5 | 51.8 | 23.1 |
| 71 | 75.9 | 3.4 | 22.4 | 30.8 |
| 72 | 65.8 | 3.4 | 19.2 | 28.1 |
| 73 | 47.5 | 1.7 | 27.2 | 18.1 |
| 74 | 102.9 | 2.2 | 47.5 | 32.5 |
| 75 | 57.8 | 1.9 | 29.9 | 21.3 |
| 76 | 48.6 | 2.4 | 20.1 | 20.5 |
| 77 | 132.7 | 2.4 | 54.9 | 40.0 |
| 78 | 156.0 | 1.1 | 144.1 | 34.0 |
| 79 | 111.2 | 3.5 | 31.9 | 40.2 |
| 80 | 62.5 | 3.5 | 17.7 | 27.4 |
| 81 | 33.3 | 2.8 | 11.8 | 16.8 |
| 82 | 61.7 | 3.2 | 19.0 | 26.5 |
| 83 | 55.2 | 2.8 | 19.6 | 23.4 |
| 84 | 71.0 | 2.8 | 25.2 | 27.7 |

TABLE 5-continued

Particle Diameters, Thicknesses, Aspect Ratios and
Equivalent Spherical Diameters from TEM Images

| Particle | Diam. (nm) | Thick. (nm) | Aspect Ratio | ESD (nm) |
|---|---|---|---|---|
| 85 | 72.9 | 4.9 | 14.8 | 34.0 |
| 86 | 165.2 | 3.4 | 48.3 | 51.9 |
| 87 | 92.7 | 2.9 | 31.9 | 33.5 |
| 88 | 52.6 | 3.2 | 16.2 | 23.8 |
| 89 | 46.2 | 2.7 | 16.9 | 20.6 |
| 90 | 92.6 | 2.8 | 32.8 | 33.1 |
| 91 | 89.3 | 2.9 | 30.3 | 32.8 |
| 92 | 71.7 | 3.4 | 21.2 | 29.7 |
| 93 | 66.4 | 1.4 | 48.5 | 20.8 |
| 94 | 106.8 | 2.6 | 41.0 | 35.5 |
| 95 | 91.0 | 1.7 | 52.1 | 27.9 |
| 96 | 84.7 | 3.4 | 25.0 | 33.2 |
| 97 | 110.6 | 3.4 | 32.3 | 39.7 |
| 98 | 94.4 | 3.4 | 27.6 | 35.8 |
| 99 | 68.1 | 1.4 | 49.8 | 21.2 |
| 100 | 61.7 | 2.4 | 25.5 | 24.0 |
| 101 | 105.5 | 2.8 | 37.4 | 36.1 |
| 102 | 75.8 | 4.4 | 17.4 | 33.5 |
| 103 | 58.9 | 2.6 | 22.6 | 23.8 |
| 104 | 36.4 | 1.5 | 23.8 | 14.5 |
| 105 | 46.3 | 3.1 | 15.1 | 21.4 |
| 106 | 65.4 | 2.4 | 27.0 | 24.9 |
| 107 | 67.1 | 2.6 | 25.8 | 26.0 |
| 108 | 42.8 | 1.5 | 28.0 | 16.1 |
| 109 | 39.7 | 2.8 | 14.1 | 18.8 |
| 110 | 57.6 | 2.9 | 19.9 | 24.4 |
| 111 | 89.4 | 3.1 | 29.2 | 33.2 |
| 112 | 115.2 | 4.6 | 25.1 | 45.0 |
| 113 | 51.4 | 2.2 | 23.8 | 20.5 |
| 114 | 39.4 | 2.0 | 19.7 | 16.7 |
| 115 | 53.6 | 2.5 | 21.7 | 22.0 |
| 116 | 93.7 | 3.4 | 27.7 | 35.5 |
| Average | 71.4 | 2.5 | 30.5 | 26.3 |
| Std Dev | 28.2 | 0.8 | 16.9 | 7.9 |

*ESD = Equivalent Spherical Diameter

Transmission Electron Microscopy (TEM) showed particles in the form of thin platelets in a narrow size distribution (with approximately 85% of the particles within 30 to 100 nm in the longest dimension). Of the platelets measured, 0.9% of platelets were from about 21 nm to about 30 nm in diameter; 8.6% of platelets were from about 31 nm to about 40 nm in diameter; 15.5% of platelets were from about 41 nm to about 50 nm in diameter; 21.6% of platelets were from about 51 nm to about 60 nm in diameter; 9.5% of platelets were from about 61 nm to about 70 nm in diameter; 13.8% of platelets were from about 71 nm to about 80 nm in diameter; 4.3% of platelets were from about 81 nm to about 90 nm in diameter; 7.8% of platelets were from about 91 nm to about 100 nm in diameter; 5.2% of platelets were from about 101 nm to about 110 nm in diameter; 8.6% of platelets were from about 111 nm to about 120 nm in diameter; 0.9% of platelets were from about 131 nm to about 140 nm in diameter; 0.9% of platelets were from about 141 nm to about 150 nm in diameter; 0.9% of platelets were from about 151 nm to about 160 nm in diameter; and 0.9% of platelets were from about 161 nm to about 170 nm in diameter.

The TEM images also showed particles with a narrow distribution of thicknesses (the particles were within 1 nm to 5 nm in thickness). Of the platelets measured: 12.9% of platelets were from about 1.1 nm to about 1.5 nm in thickness; 13.8% of platelets were from about 1.6 nm to about 2.0 nm in thickness; 24.1% of platelets were from about 2.1 nm to about 2.5 nm in thickness; 25% of platelets were from about 2.6 nm to about 3.0 nm in thickness; 19% of platelets were from about 3.1 nm to about 3.5 nm in thickness; 1.7% of platelets were from about 3.6 nm to about 4.0 nm in thickness; 0.9% of platelets were from about 4.1 nm to about 4.5 nm in thickness; and 2.6% of platelets were from about 4.6 nm to about 5.0 nm in thickness.

Additionally, the TEM images showed particles with a narrow distribution of equivalent spherical diameters (ESDs) (with approximately 85% of the particles with ESDs of about 15 nm to about 35 nm). Of the platelets measured: 2.6% had an ESD from about 11 nm to about 15 nm; 19.8% had an ESD from about 16 nm to about 20 nm; 33.6% had an ESD from about 21 nm to about 25 nm; 12.1% had an ESD from about 26 nm to about 30 nm; 18.1% had an ESD from about 31 nm to about 35 nm; 10.3% had an ESD from about 36 nm to about 40 nm; 1.7% had an ESD from about 41 nm to about 45 nm; 0.9% had an ESD from about 46 nm to about 50 nm; and 0.9% had an ESD from about 51 nm to about 55 nm.

Figure 5:
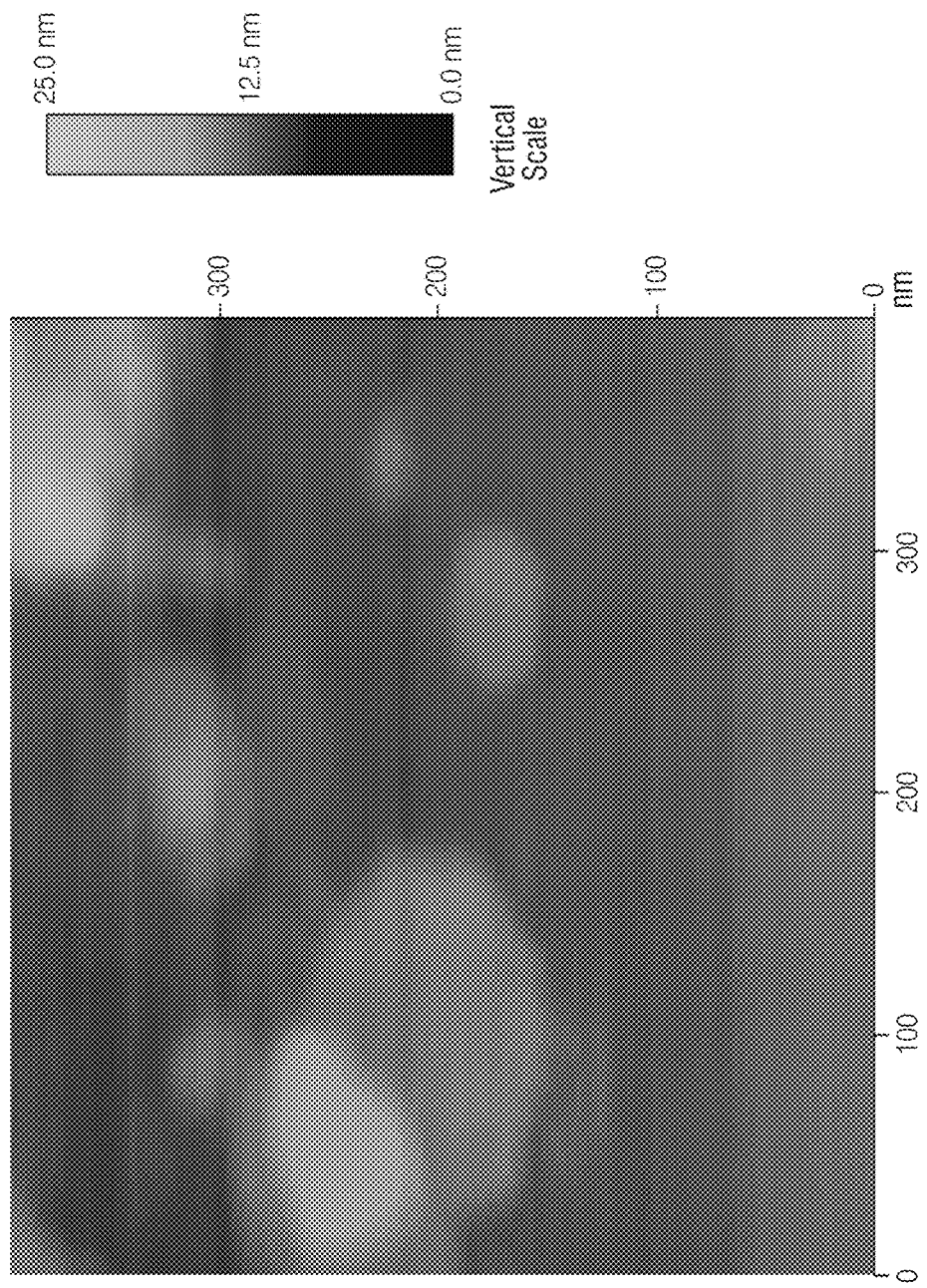
FIG. 5 is an atomic force micrograph of a $Mg(OH)_2$ dispersion.

Similar particle dispersions as prepared for FESEM and TEM were prepared on mica substrates for atomic force microscopy (AFM). FIG. 5 is an AFM image of a typical dispersion. Average particle diameters, thicknesses, and aspect ratios calculated by AFM are presented in Table 6.

TABLE 6

Particle Diameters, Thicknesses, Aspect Ratios and Equivalent
Spherical Diameters from Atomic Force Microscopy (AFM)

| Particle | Diam. (nm) | Thick. (nm) | Aspect Ratio | ESD (nm) |
|---|---|---|---|---|
| 1 | 45.7 | 3.1 | 14.6 | 21.4 |
| 2 | 32.9 | 2.8 | 11.7 | 16.6 |
| 3 | 34.3 | 2.0 | 17..2 | 15.2 |
| 4 | 37.1 | 2.2 | 17.3 | 16.4 |
| 5 | 31.8 | 2.0 | 15.9 | 14.5 |
| 6 | 36.6 | 5.6 | 6.5 | 22.4 |
| 7 | 39.3 | 2.0 | 19.6 | 16.7 |
| 8 | 41.7 | 2.3 | 18.1 | 18.2 |
| 9 | 37.0 | 2.3 | 16.5 | 16.7 |
| 10 | 42.4 | 2.1 | 20.2 | 17.8 |
| 11 | 38.5 | 1.9 | 20.3 | 16.2 |
| 12 | 39.6 | 2.5 | 16.1 | 17.9 |
| 13 | 40.2 | 2.9 | 14.1 | 19.0 |
| 14 | 42.4 | 4.7 | 9.0 | 23.3 |
| 15 | 50.8 | 2.4 | 21.2 | 21.0 |
| 16 | 43.3 | 2.7 | 16.0 | 19.7 |
| 17 | 42.3 | 2.4 | 18.0 | 18.5 |
| 18 | 50.7 | 2.6 | 19.5 | 21.6 |
| 19 | 46.2 | 3.0 | 15.4 | 21.2 |
| 20 | 53.1 | 2.9 | 18.3 | 23.1 |
| 21 | 50.2 | 5.4 | 9.3 | 27.3 |
| 22 | 55.2 | 3.1 | 17.8 | 24.2 |
| 23 | 47.4 | 2.5 | 18.9 | 20.3 |
| 24 | 54.0 | 0.6 | 89.9 | 13.8 |
| 25 | 53.4 | 2.8 | 18.9 | 22.9 |
| 26 | 54.4 | 4.6 | 11.8 | 27.3 |
| 27 | 50.5 | 2.5 | 20.2 | 21.2 |
| 28 | 57.4 | 2.5 | 23.0 | 23.1 |
| 29 | 54.0 | 2.6 | 20.8 | 22.5 |
| 30 | 61.3 | 2.5 | 25.0 | 24.0 |
| 31 | 54.5 | 2.3 | 24.0 | 21.6 |
| 32 | 57.5 | 1.1 | 52.3 | 17.6 |
| 33 | 46.8 | 2.4 | 19.2 | 20.0 |
| 34 | 64.0 | 1.5 | 42.7 | 21.0 |
| 35 | 59.8 | 1.9 | 31.5 | 21.7 |
| 36 | 60.4 | 1.7 | 36.6 | 20.8 |
| 37 | 54.7 | 5.1 | 10.7 | 28.4 |
| 38 | 59.6 | 2.3 | 25.9 | 23.0 |
| 39 | 60.1 | 3.6 | 16.7 | 26.9 |
| 40 | 53.8 | 2.4 | 22.4 | 21.8 |
| 41 | 63.0 | 1.7 | 37.1 | 21.6 |
| 42 | 57.1 | 1.9 | 30.1 | 21.0 |
| 43 | 59.8 | 2.3 | 26.0 | 23.1 |
| 44 | 68.0 | 2.4 | 28.3 | 25.5 |
| 45 | 67.4 | 2.2 | 30.8 | 24.6 |

TABLE 6-continued

Particle Diameters, Thicknesses, Aspect Ratios and Equivalent Spherical Diameters from Atomic Force Microscopy (AFM)

| Particle | Diam. (nm) | Thick. (nm) | Aspect Ratio | ESD (nm) |
|---|---|---|---|---|
| 46 | 65.9 | 2.1 | 32.2 | 23.7 |
| 47 | 69.1 | 3.8 | 18.3 | 30.0 |
| 48 | 64.1 | 0.8 | 84.3 | 16.7 |
| 49 | 60.3 | 2.6 | 23.2 | 24.2 |
| 50 | 70.8 | 1.7 | 41.6 | 23.4 |
| 51 | 72.1 | 2.7 | 26.7 | 27.6 |
| 52 | 70.3 | 2.0 | 35.9 | 24.4 |
| 53 | 73.8 | 2.1 | 35.2 | 25.8 |
| 54 | 64.5 | 0.7 | 99.2 | 15.9 |
| 55 | 64.0 | 4.8 | 13.3 | 30.9 |
| 56 | 70.3 | 2.6 | 27.6 | 26.6 |
| 57 | 68.4 | 1.5 | 45.6 | 21.9 |
| 58 | 69.8 | 2.7 | 25.9 | 27.0 |
| 59 | 68.4 | 1.2 | 57.0 | 20.3 |
| 60 | 60.5 | 6.5 | 9.3 | 32.9 |
| 61 | 73.7 | 1.0 | 73.7 | 20.1 |
| 62 | 70.8 | 2.7 | 26.2 | 27.3 |
| 63 | 64.4 | 1.5 | 43.5 | 21.0 |
| 64 | 60.3 | 3.6 | 16.7 | 27.0 |
| 65 | 75.2 | 1.5 | 51.9 | 23.1 |
| 66 | 68.1 | 2.8 | 24.3 | 26.9 |
| 67 | 63.4 | 3.6 | 17.6 | 27.9 |
| 68 | 68.2 | 3.3 | 20.7 | 28.4 |
| 69 | 78.5 | 3.1 | 25.3 | 30.6 |
| 70 | 61.0 | 2.0 | 31.3 | 22.2 |
| 71 | 68.8 | 1.1 | 62.6 | 19.8 |
| 72 | 72.1 | 2.4 | 30.0 | 26.5 |
| 73 | 74.7 | 1.7 | 45.3 | 24.0 |
| 74 | 69.3 | 3.2 | 21.6 | 28.5 |
| 75 | 80.1 | 2.3 | 34.8 | 28.1 |
| 76 | 76.3 | 1.9 | 40.1 | 25.5 |
| 77 | 66.1 | 2.1 | 31.5 | 24.0 |
| 78 | 83.0 | 1.0 | 83.0 | 21.8 |
| 79 | 76.7 | 2.0 | 39.3 | 25.8 |
| 80 | 71.8 | 2.2 | 32.6 | 25.7 |
| 81 | 76.5 | 1.4 | 56.6 | 22.8 |
| 82 | 73.2 | 2.5 | 29.5 | 27.1 |
| 83 | 82.1 | 2.3 | 35.7 | 28.6 |
| 84 | 85.4 | 1.4 | 63.3 | 24.5 |
| 85 | 77.1 | 1.1 | 70.1 | 21.4 |
| 86 | 74.7 | 2.2 | 34.0 | 26.4 |
| 87 | 85.8 | 2.5 | 35.0 | 30.0 |
| 88 | 69.1 | 6.4 | 10.8 | 35.8 |
| 89 | 81.5 | 1.9 | 43.1 | 26.6 |
| 90 | 84.5 | 1.4 | 60.3 | 24.7 |
| 91 | 88.2 | 2.3 | 39.2 | 29.7 |
| 92 | 79.0 | 1.4 | 56.4 | 23.6 |
| 93 | 87.9 | 2.5 | 35.7 | 30.5 |
| 94 | 78.1 | 2.2 | 36.3 | 27.0 |
| 95 | 81.9 | 2.8 | 29.8 | 30.2 |
| 96 | 86.8 | 6.5 | 13.4 | 41.9 |
| 97 | 83.0 | 2.6 | 31.9 | 30.0 |
| 98 | 92.8 | 2.2 | 42.2 | 30.5 |
| 99 | 88.7 | 2.1 | 42.2 | 29.2 |
| 100 | 64.2 | 3.2 | 20.1 | 27.1 |
| 101 | 77.3 | 2.1 | 36.7 | 26.7 |
| 102 | 77.6 | 1.2 | 64.7 | 22.1 |
| 103 | 89.7 | 1.4 | 64.0 | 25.7 |
| 104 | 87.5 | 1.4 | 62.5 | 25.2 |
| 105 | 94.7 | 2.5 | 37.9 | 32.3 |
| 106 | 85.0 | 1.3 | 68.0 | 23.8 |
| 107 | 79.1 | 1.2 | 68.8 | 22.1 |
| 108 | 90.8 | 1.4 | 64.9 | 25.9 |
| 109 | 85.4 | 1.4 | 63.3 | 24.5 |
| 110 | 67.4 | 0.7 | 96.3 | 16.8 |
| 111 | 86.6 | 1.7 | 50.9 | 26.7 |
| 112 | 84.2 | 2.3 | 36.6 | 29.0 |
| 113 | 78.4 | 2.1 | 37.3 | 26.9 |
| 114 | 100.8 | 2.3 | 44.6 | 32.5 |
| 115 | 86.9 | 2.7 | 32.2 | 31.3 |
| 116 | 96.2 | 1.5 | 66.3 | 27.2 |
| 117 | 93.1 | 2.1 | 44.4 | 30.1 |
| 118 | 89.8 | 2.4 | 37.4 | 30.7 |
| 119 | 93.3 | 2.1 | 44.4 | 30.1 |
| 120 | 98.4 | 3.4 | 28.9 | 36.7 |
| 121 | 99.9 | 2.7 | 37.0 | 34.3 |
| 122 | 84.0 | 2.2 | 38.2 | 28.6 |
| 123 | 92.6 | 1.1 | 84.2 | 24.2 |
| 124 | 95.8 | 1.4 | 68.4 | 26.8 |
| 125 | 107.9 | 3.0 | 36.0 | 37.4 |
| 126 | 94.7 | 2.7 | 35.1 | 33.1 |
| 127 | 94.4 | 1.6 | 59.0 | 27.8 |
| 128 | 88.4 | 2.6 | 34.0 | 31.2 |
| 129 | 89.4 | 0.9 | 99.3 | 22.1 |
| 130 | 101.1 | 1.5 | 67.4 | 28.4 |
| 131 | 80.4 | 2.0 | 40.2 | 26.9 |
| 132 | 107.1 | 1.4 | 76.5 | 28.9 |
| 133 | 102.5 | 3.9 | 26.3 | 39.5 |
| 134 | 101.6 | 1.7 | 59.7 | 29.7 |
| 135 | 93.0 | 2.1 | 44.3 | 30.1 |
| 136 | 114.8 | 1.5 | 76.6 | 31.0 |
| 137 | 115.7 | 1.3 | 89.0 | 29.7 |
| 138 | 92.8 | 1.7 | 54.6 | 28.0 |
| 139 | 85.9 | 2.1 | 40.9 | 28.5 |
| 140 | 112.3 | 1.6 | 72.5 | 30.8 |
| 141 | 112.9 | 1.1 | 102.6 | 27.6 |
| 142 | 101.0 | 2.0 | 50.5 | 31.3 |
| 143 | 113.3 | 1.5 | 78.1 | 30.3 |
| 144 | 107.4 | 1.6 | 67.1 | 30.3 |
| 145 | 113.8 | 4.9 | 23.2 | 45.6 |
| 146 | 116.4 | 2.7 | 43.8 | 37.8 |
| 147 | 114.3 | 1.5 | 76.2 | 30.9 |
| 148 | 119.9 | 3.5 | 34.2 | 42.2 |
| 149 | 110.8 | 2.3 | 47.4 | 35.1 |
| 150 | 120.1 | 2.5 | 48.0 | 37.8 |
| 151 | 132.8 | 1.9 | 69.9 | 36.9 |
| 152 | 100.5 | 3.2 | 31.4 | 36.5 |
| 153 | 135.5 | 2.0 | 67.8 | 38.1 |
| 154 | 121.1 | 1.3 | 93.2 | 30.6 |
| 155 | 142.1 | 1.8 | 78.9 | 37.9 |
| 156 | 133.7 | 1.7 | 78.7 | 35.7 |
| 157 | 125.5 | 1.3 | 96.5 | 31.3 |
| 158 | 146.8 | 4.3 | 34.1 | 51.8 |
| 159 | 145.3 | 2.1 | 69.2 | 40.5 |
| 160 | 151.9 | 2.1 | 72.3 | 41.7 |
| 161 | 160.0 | 2.7 | 59.3 | 47.0 |
| 162 | 148.9 | 1.9 | 78.4 | 39.8 |
| 163 | 156.7 | 5.8 | 27.0 | 59.8 |
| 164 | 156.3 | 1.2 | 130.3 | 35.3 |
| 165 | 151.8 | 1.5 | 101.2 | 37.3 |
| 166 | 194.6 | 2.0 | 97.3 | 48.4 |
| Average | 80.9 | 2.3 | 42.6 | 27.3 |
| St Dev | 29.5 | 1.1 | 24.8 | 7.3 |

Atomic Force Microscopy (AFM) showed particles in the form of thin platelets in a narrow size distribution (with approximately 85% of the particles within 30 to 110 nm in the longest dimension). Of the platelets measured: 6% of platelets were from about 31 nm to about 40 nm in diameter; 6% of platelets were from about 41 nm to about 50 nm in diameter; 13.3% of platelets were from about 51 nm to about 60 nm in diameter; 16.3% of platelets were from about 61 nm to about 70 nm in diameter; 14.5% of platelets were from about 71 nm to about 80 nm in diameter; 14.5% of platelets were from about 81 nm to about 90 nm in diameter; 8.4% of platelets were from about 91 nm to about 100 nm in diameter; 5.4% of platelets were from about 101 nm to about 110 nm in diameter; 6.6% of platelets were from about 111 nm to about 120 nm in diameter; 1.2% of platelets were from about 121 nm to about 130 nm in diameter; 1.8% of platelets were from about 131 nm to about 140 nm in diameter; 2.4% of platelets were from about 141 nm to about 150 nm in diameter; 3% of platelets were from about 151 nm to about 160 nm in diameter; and 0.6% of platelets were above 161 nm in diameter.

The AFM also showed particles with a narrow distribution of thicknesses (92% of particles were within 1 nm to 5 nm in thickness). Of the platelets measured: 3% of platelets were from about 0.6 nm to about 1.0 nm in thickness; 21.1% of platelets were from about 1.1 nm to about 1.5 nm in thickness; 17.5% of platelets were from about 1.6 nm to about 2.0 nm in thickness; 28.9% of platelets were from about 2.1 nm to about 2.5 nm in thickness; 13.9% of platelets were from about 2.6 nm to about 3.0 nm in thickness; 5.4% of platelets were from about 3.1 nm to about 3.5 nm in thickness; 3% of platelets were from about 3.6 nm to about 4.0 nm in thickness; 0.6% of platelets were from about 4.1 nm to about 4.5 nm in thickness; 2.4% of platelets were from about 4.6 nm to about 5.0 nm in thickness; and 4.2% of platelets were over 5.1 nm in thickness.

Additionally, the AFM also showed particles with Equivalent Spherical Diameters (ESD) within a narrow size distribution (93% of particles had an ESD within 15 nm to 40 nm). Of the platelets measured: 13.9% of platelets had an ESD from about 11 nm to about 15 nm; 60.8% of platelets had an ESD from about 16 nm to about 20 nm; 19.9% of platelets had an ESD from about 21 nm to about 25 nm; 19.9% of platelets had an ESD from about 31 nm to about 40 nm; 4.2% of platelets had an ESD from about 41 nm to about 50 nm; and 1.2% of platelets had an ESD from about 51 nm to about 60 nm.

Figure 6:
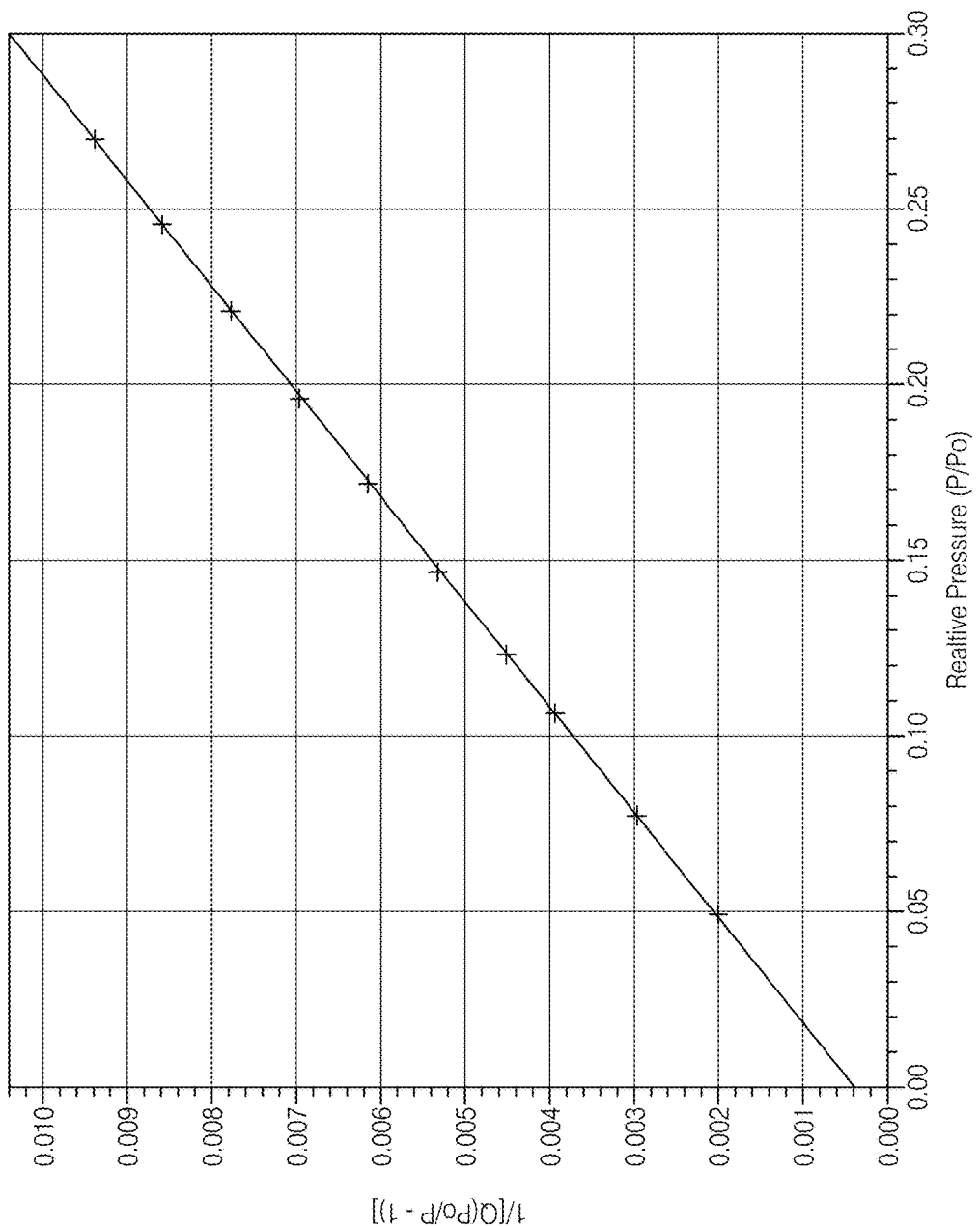
FIG. 6 is a BET surface area plot of $Mg(OH)_2$ nanoparticles within a slurry.
Figure 7:
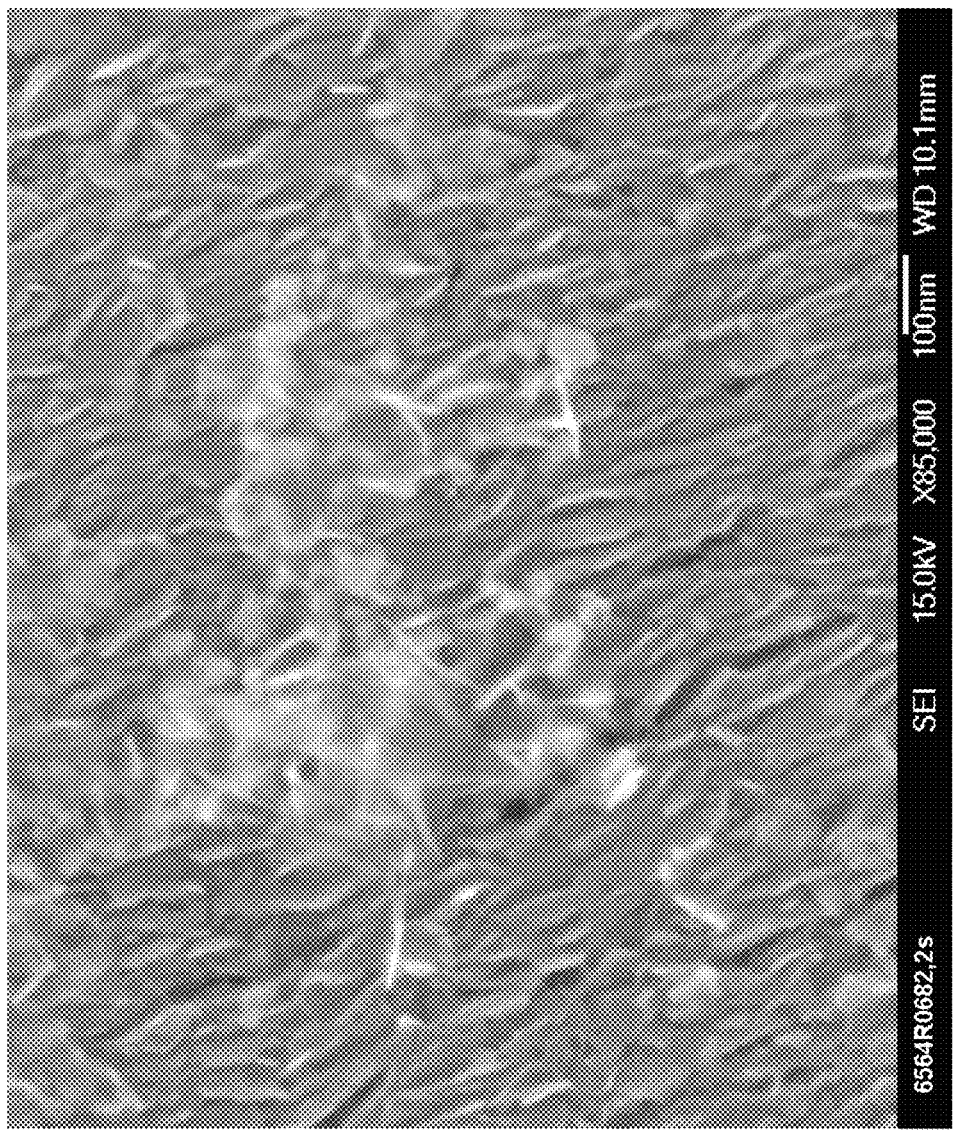
FIGS. 7-10 are electron micrographs of $Mg(OH)_2$ nanoparticles from slurry.
Figure 8:
Figure 9:
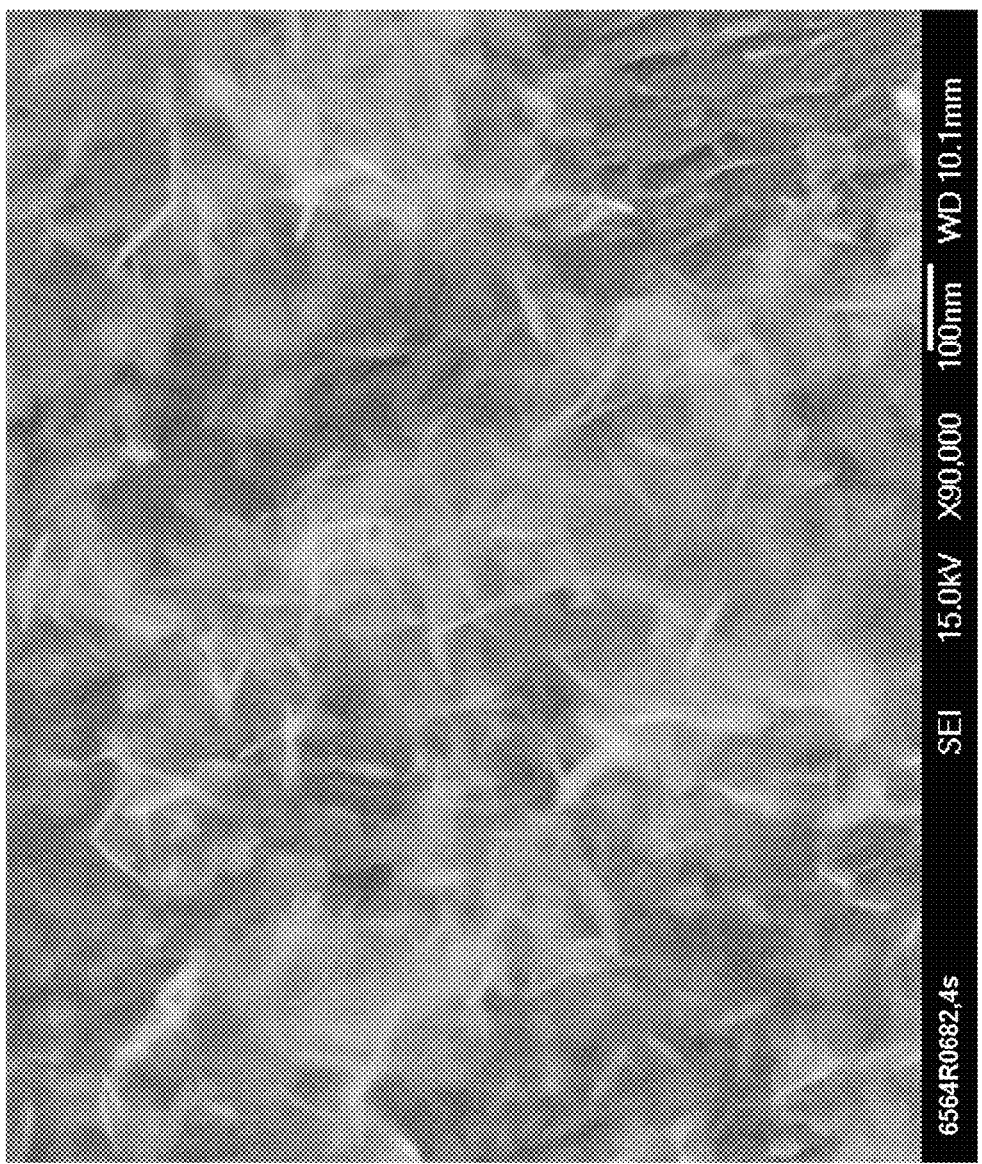
Figure 10:
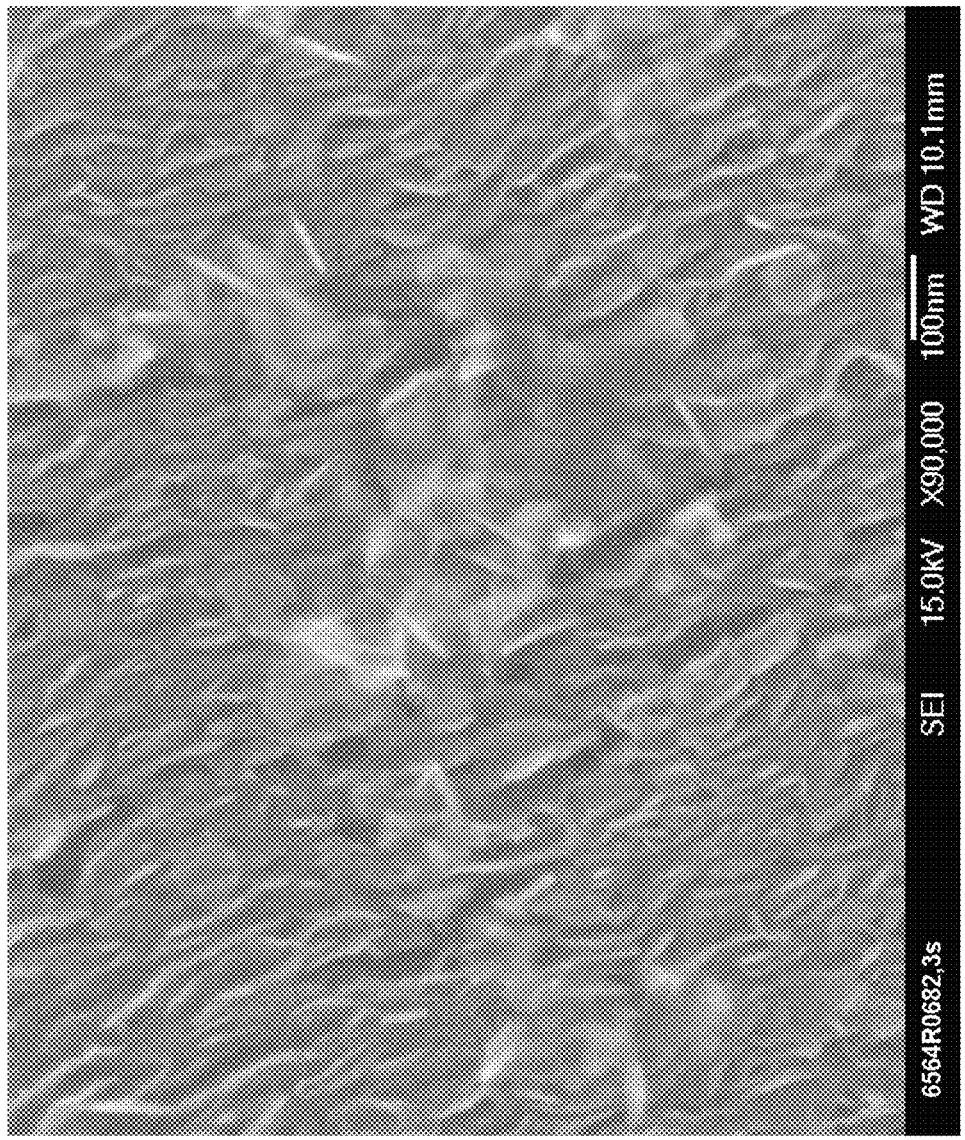

The average BET surface area of this sample was determined to be 128.90 m$^2$/g. The BET surface area calculations are presented in Table 7. FIG. 6 depicts the BET surface area plot. Comparison of the measured specific surface area to a theoretical surface area of approximately 370 m2/g (for platelets 70 nm in diameter by 2.5 nm thick) gives good agreement while suggesting some platelet overlap in the measured sample.

TABLE 7A

BET Surface Area Report

| | |
|---|---|
| BET Surface Area | 128.8966 +/− 0.2764 m$^2$/g |
| Slope | 0.033378 +/− 0.000071 g/cm$^3$ STP |
| Y-Intercept | 0.000395 +/− 0.000014 g/cm$^3$ STP |
| C | 85.538723 |
| Qm | 29.6096 cm$^3$/g STP |
| Correlation Coefficient | 0.9999795 |
| Molecular Cross-Sectional Area | 0.1620 nm$^2$ |

TABLE 7B

Data for BET Surface Area Report

| Relative Pressure (P/P$_0$) | Quantity Absorbed (cm$^2$/g STP) | 1/[Q(P$_0$/P − 1)] |
|---|---|---|
| 0.048580010 | 25.7753 | 0.001981 |
| 0.077168131 | 28.2181 | 0.002963 |
| 0.106361376 | 30.1089 | 0.003953 |
| 0.123372868 | 31.0843 | 0.004528 |
| 0.147493213 | 32.4108 | 0.005338 |
| 0.172082949 | 33.7607 | 0.006157 |
| 0.196808435 | 35.1302 | 0.006975 |
| 0.221686588 | 36.5249 | 0.007798 |
| 0.246587394 | 37.9562 | 0.008623 |
| 0.271375061 | 39.4484 | 0.009441 |
| 0.296179718 | 41.0116 | 0.010261 |

The results of replicate zeta potential measurements are given in Table 8.

TABLE 8

Replicate Zeta Potential Measurements

| | Zeta Potential of Magnesium Hydroxide (mV) |
|---|---|
| | −1.9 |
| | −3.8 |
| | −4.2 |
| | −4.1 |
| | −5.2 |
| | −5.7 |
| | −4.1 |
| | −4.4 |
| | −4.4 |
| Average | −4.2 |
| Std Dev | 1.0 |

The slurry was also tested using scanning electron microscope imaging and analysis by energy dispersive x-ray spectrometry. A portion of the slurry was diluted in isopropanol and a drop mount prepared on a polished carbon planchet. The prepared sample was mounted in a JEOL JSM 6500F field emission scanning electron microscope equipped with a Noran Vantage energy dispersive x-ray analysis system.

Figure 11:
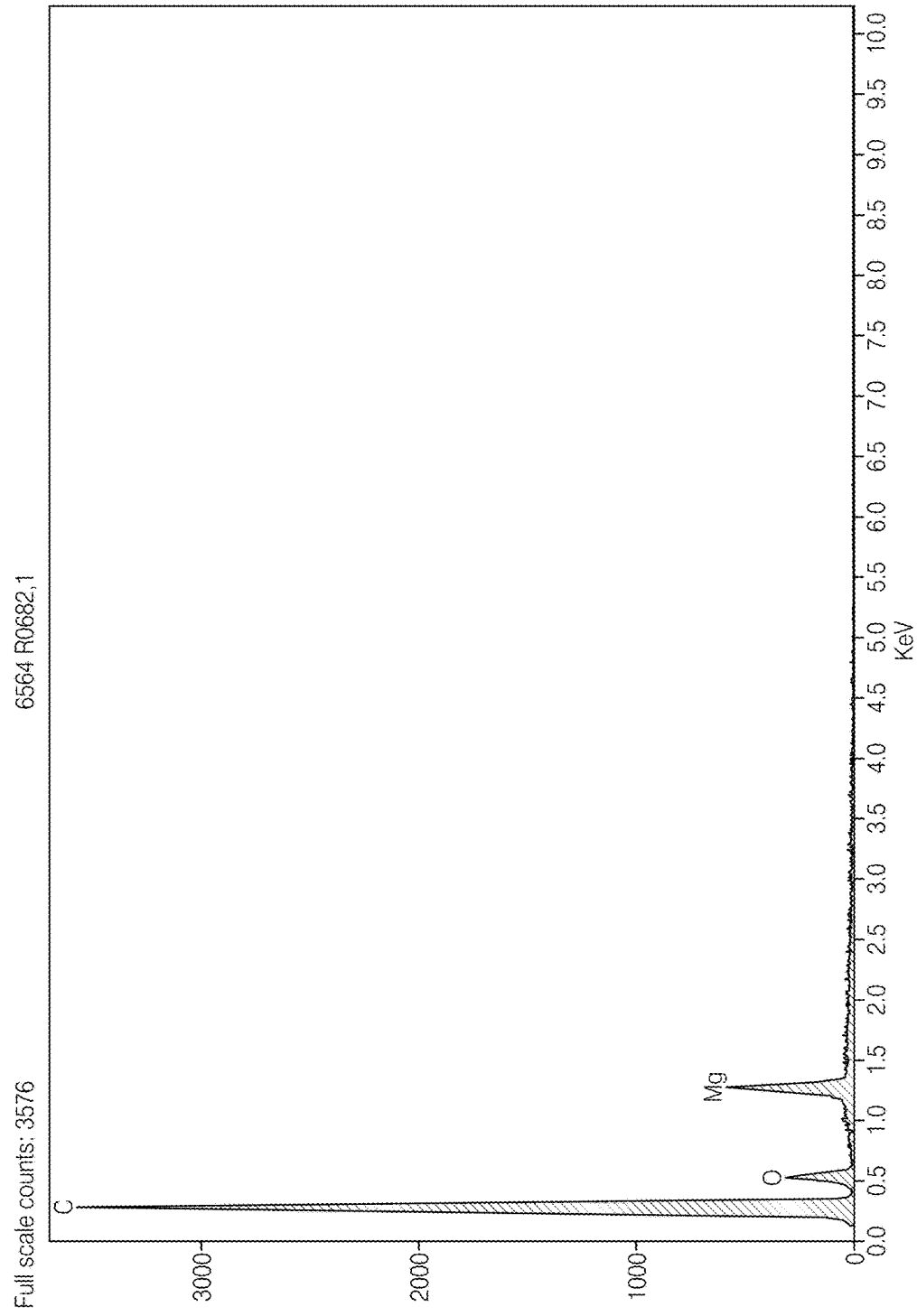
FIG. 11 is an EDS spectrum of $Mg(OH)_2$ nanoparticles from slurry.
Figure 12A:
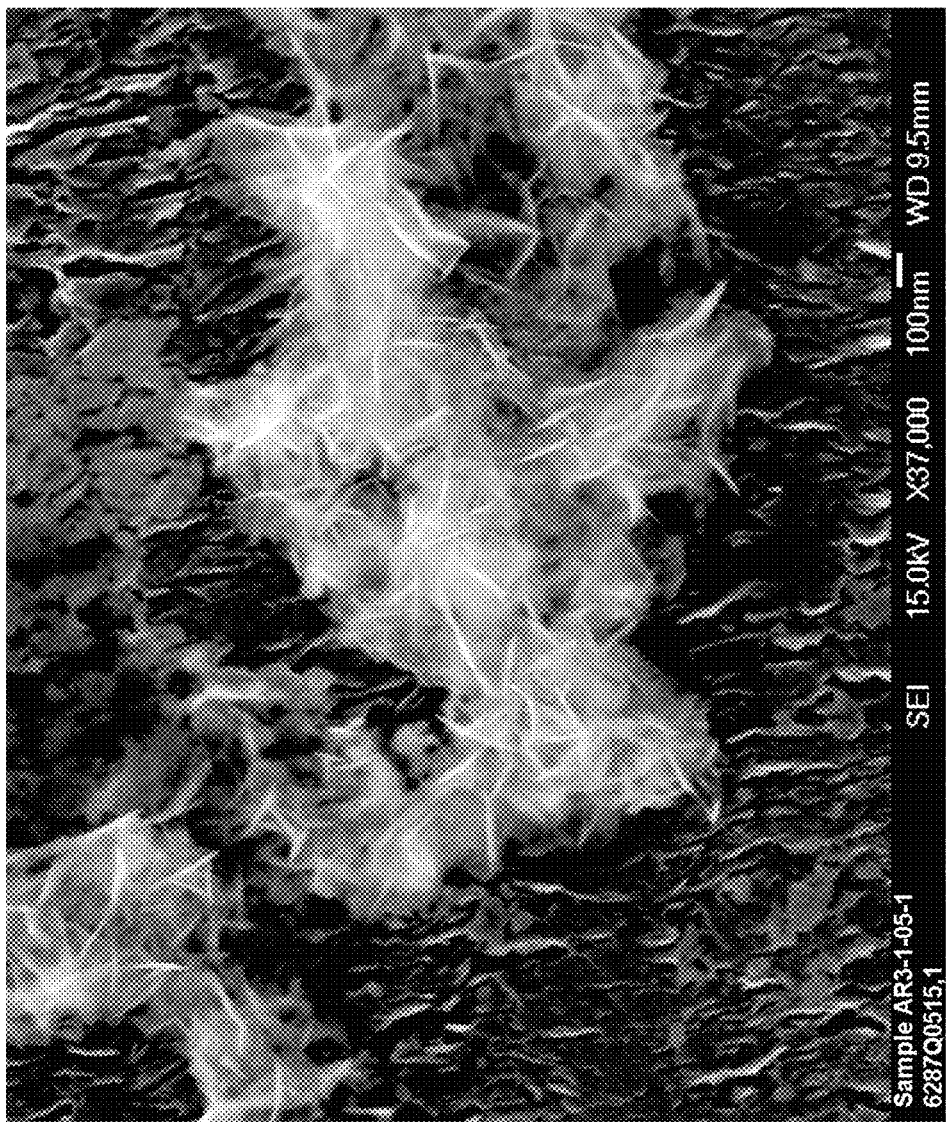
FIGS. 12A-H, 13A-C, and 14A-C are electron micrographs of $Mg(OH)_2$ nanoparticle samples from slurry.
Figure 12B:
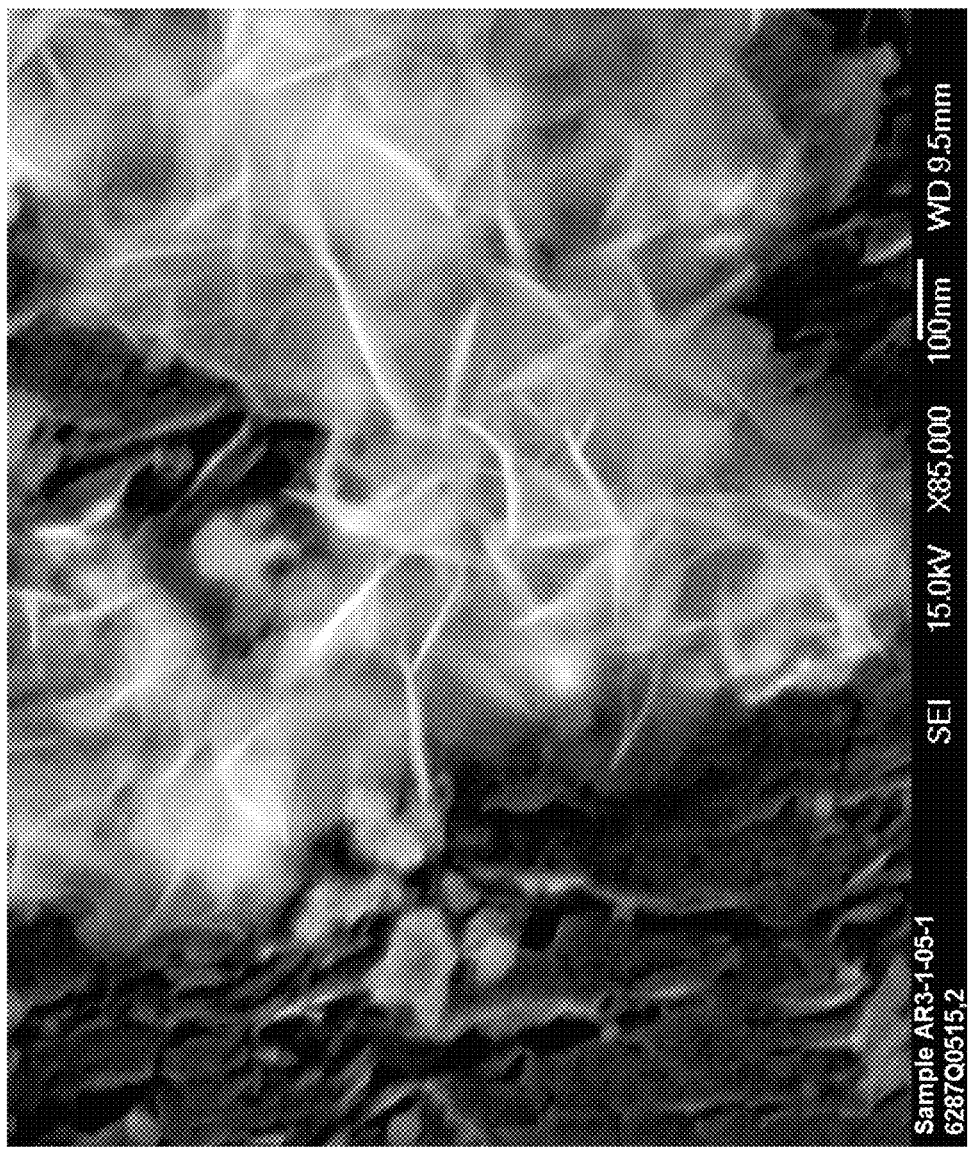
Figure 12C:
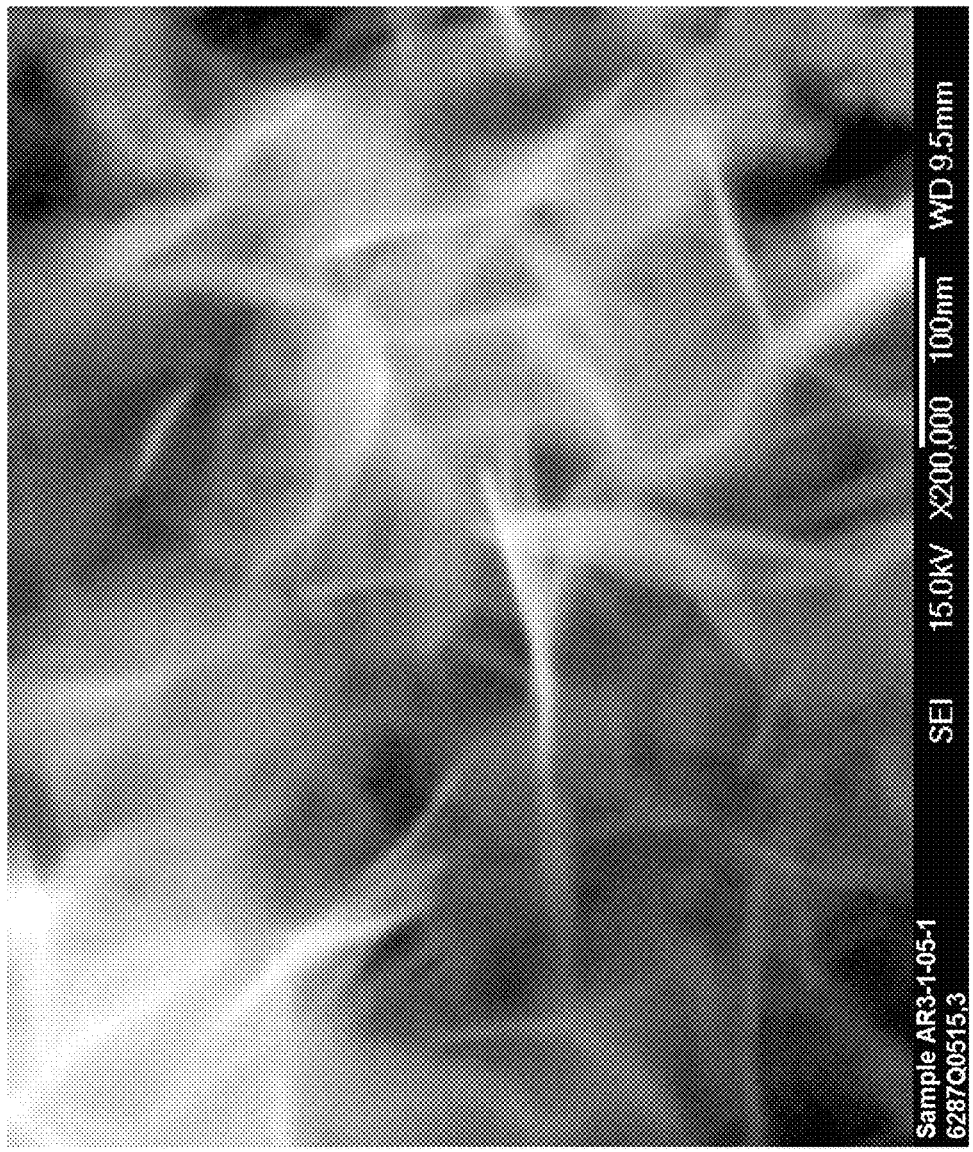
Figure 12D:
Figure 12E:
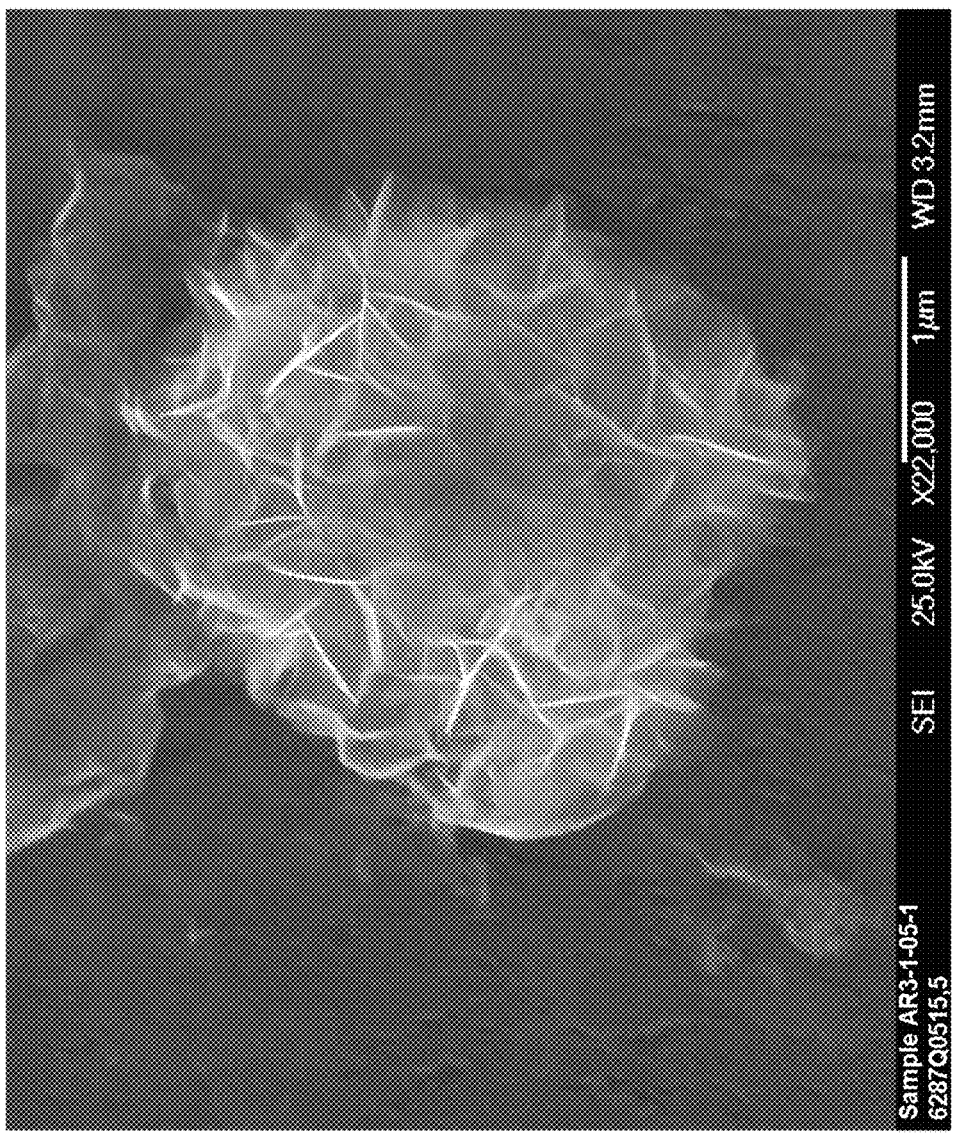
Figure 12F:
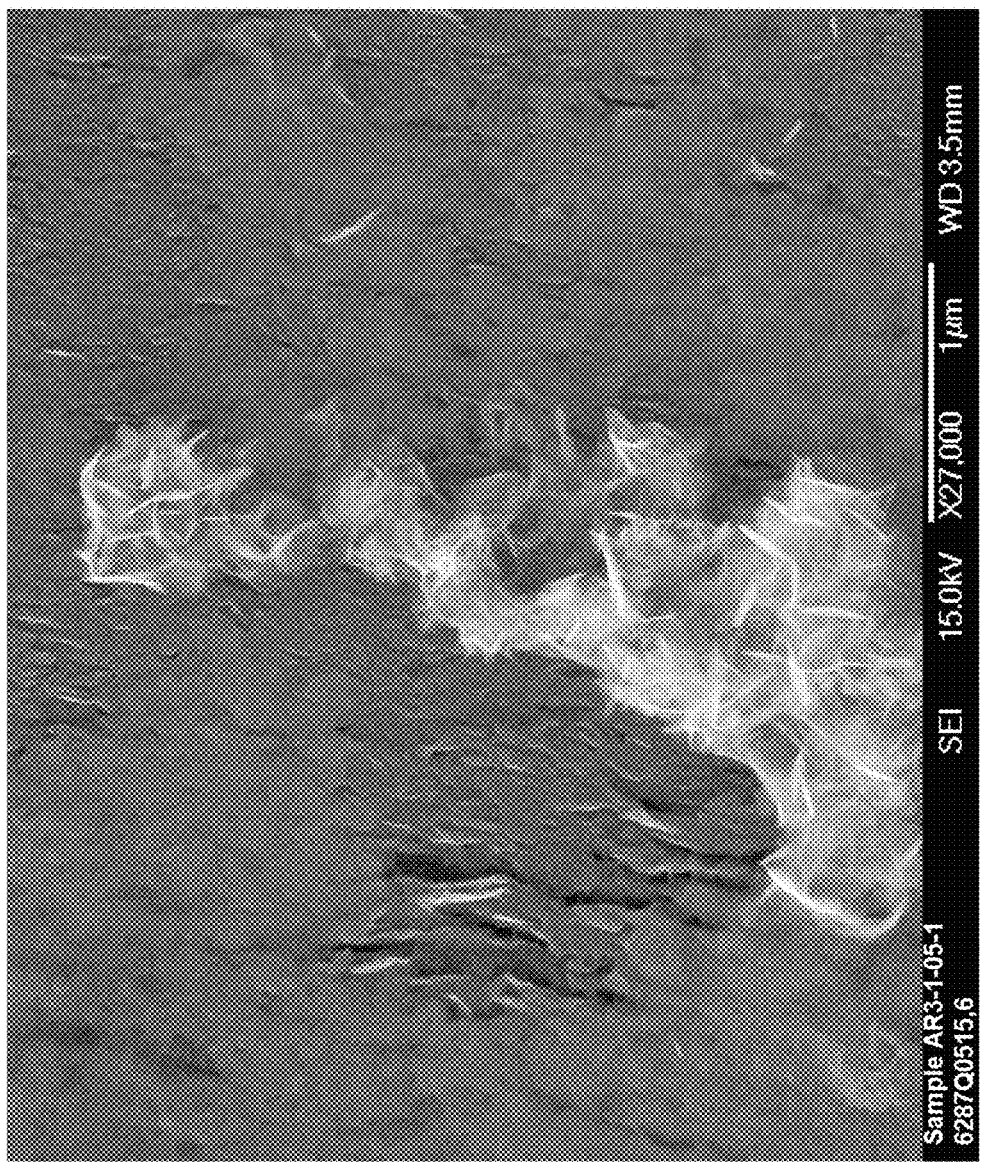
Figure 12G:
Figure 12H:
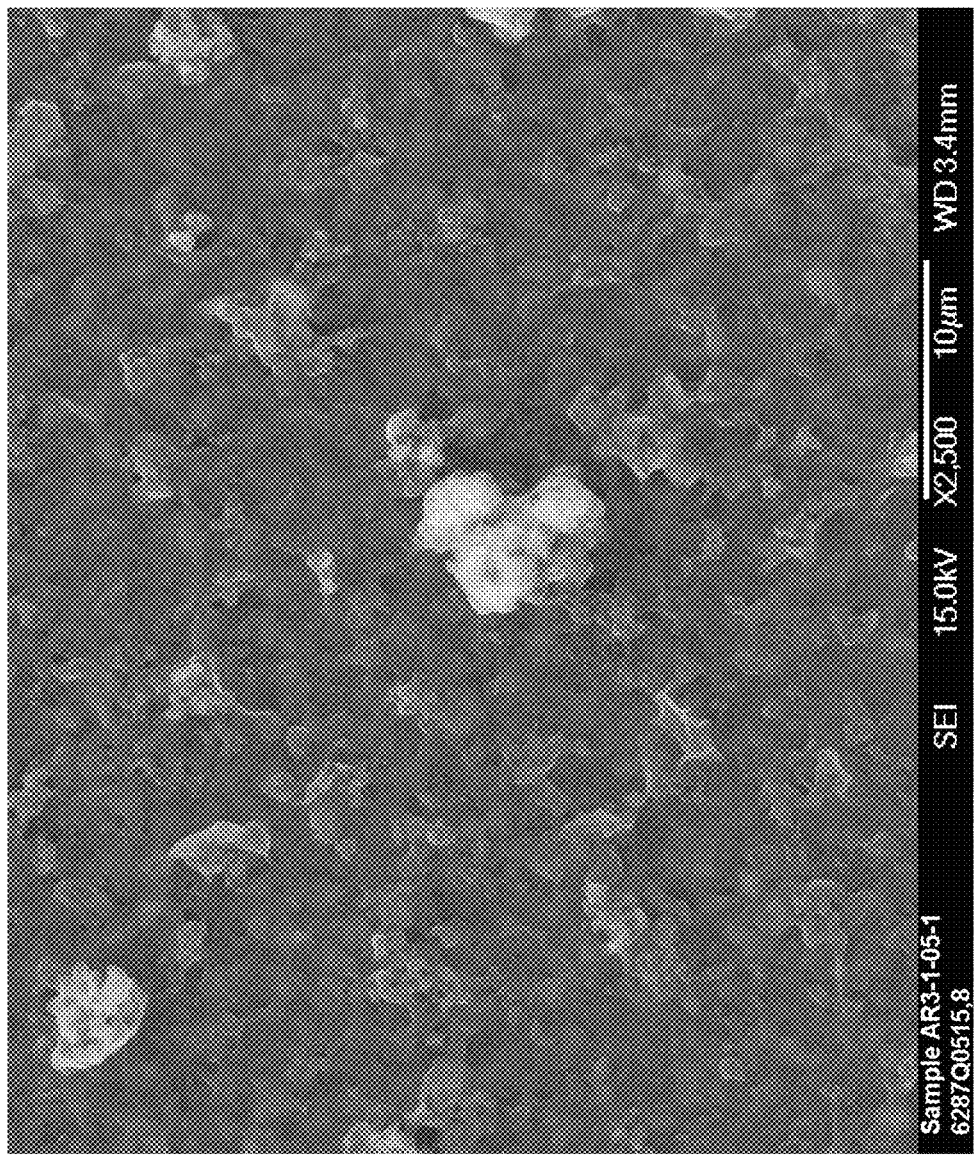

FIGS. 7 through 10 depict secondary electron images of typical particles from the slurry. These particles were in the same size range (50-100 nm) and had the same morphology (thin platelets) as other Mg(OH)$_2$ samples previously examined. FIG. 11 is the EDS spectrum obtained from a portion of this sample, confirming the presence of magnesium (Mg) and oxygen (O), which is consistent with Mg(OH)$_2$, and is a result similar to analyses of previous samples. (The large carbon peak in the spectrum is due to the carbon substrate that supports the sample.)

A test was conducted to determine the effect of the system's flux on shape and size as compared to industrial product. Feed stock composed of 1500 PPM of Mg$^{2+}$ and 19,000 PPM of Cl$^-$ was diluted in an aqueous solution at a pH of 4.1. The feedstock was passed through the electrolyzer at 80° F. (27° C.) and the pH was maintained at 11. The electrolyzer produced Mg(OH)$_2$ that was washed by dilution at a rate of 10 to 1 and de-watered three times. The slurry was collected for analysis and further processing. Samples analyzed from the slurry were labeled Sample A. A portion of the collected slurry was commercially spray dried under heat. The particles collected after this step were collected, analyzed, and labeled Sample B. Sample A and B were compared to an industrial product used in provided by JM Huber, Inc., labeled Control.

A small portion of each sample was dispersed in deionized, particle-free water, and a droplet placed on a polished carbon planchet and allowed to dry. The dried samples were imaged in a JEOL JSM 6500F field emission scanning electron microscope.

Figure 13A:
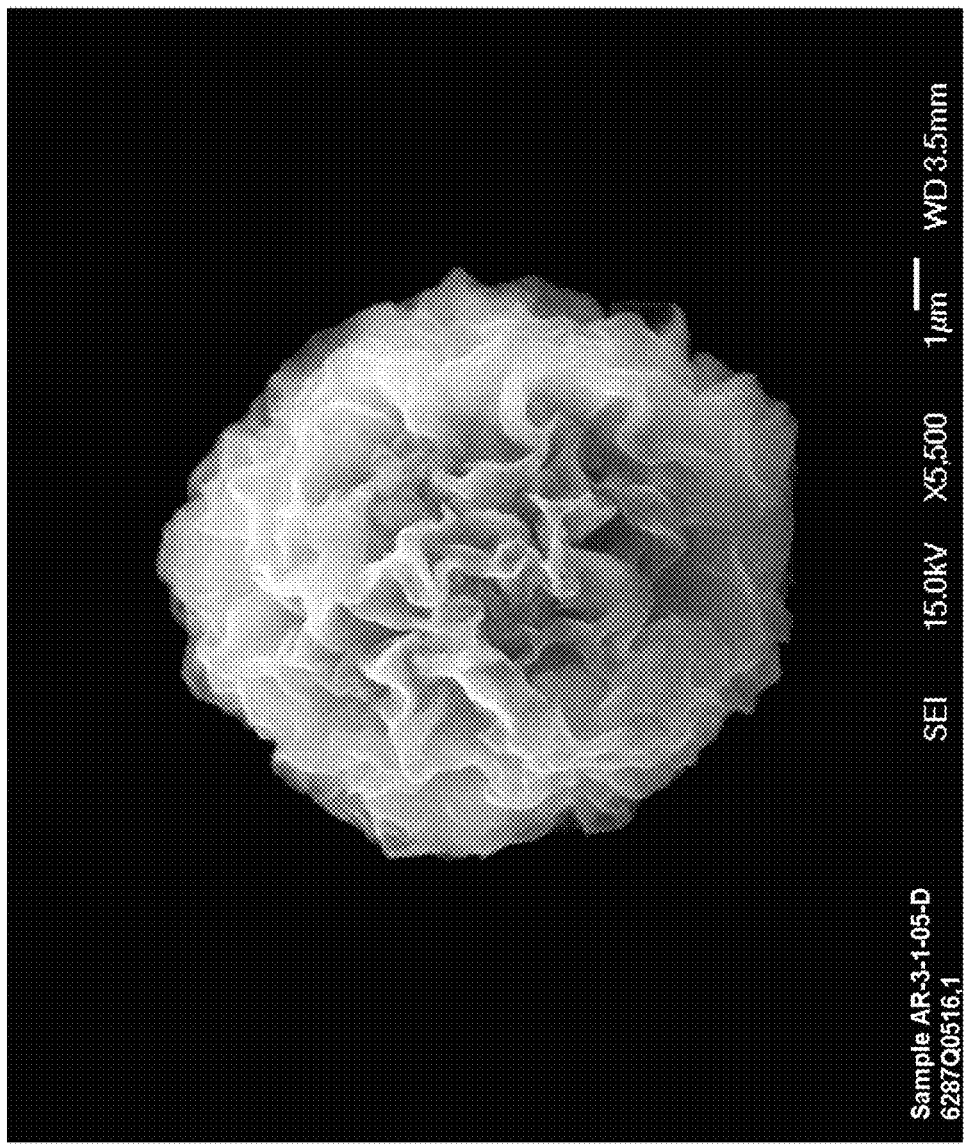
Figure 13B:
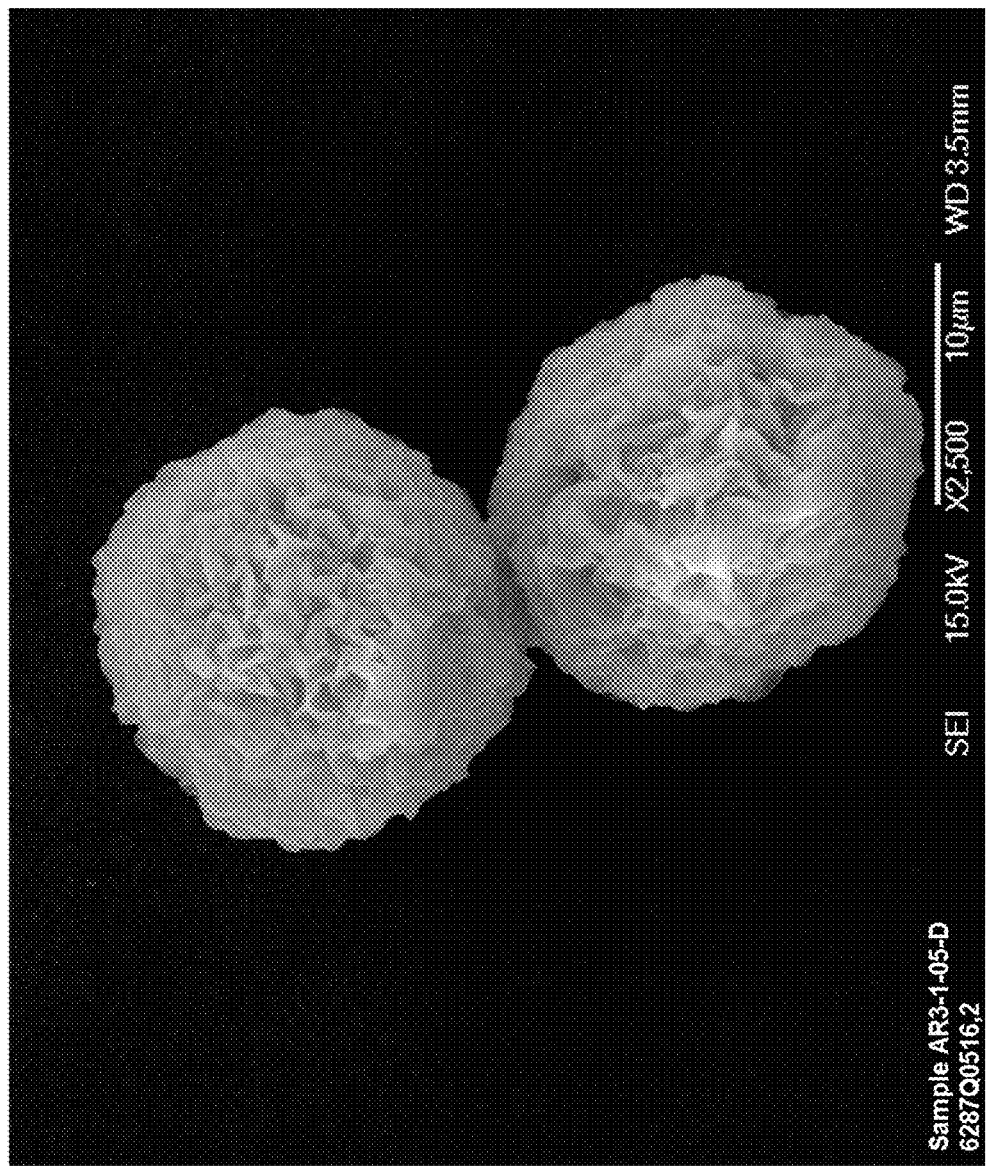
Figure 13C:
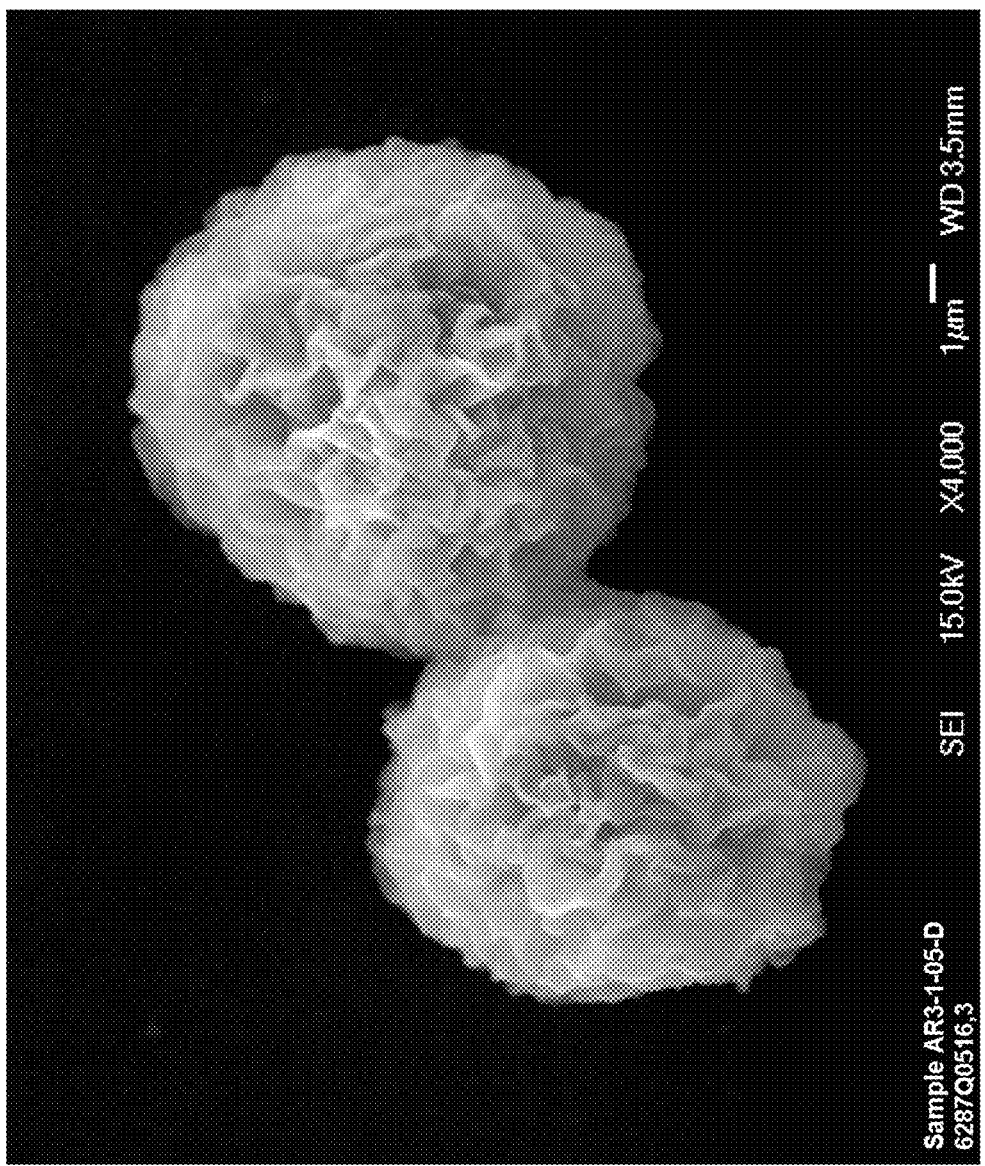
Figure 14A:
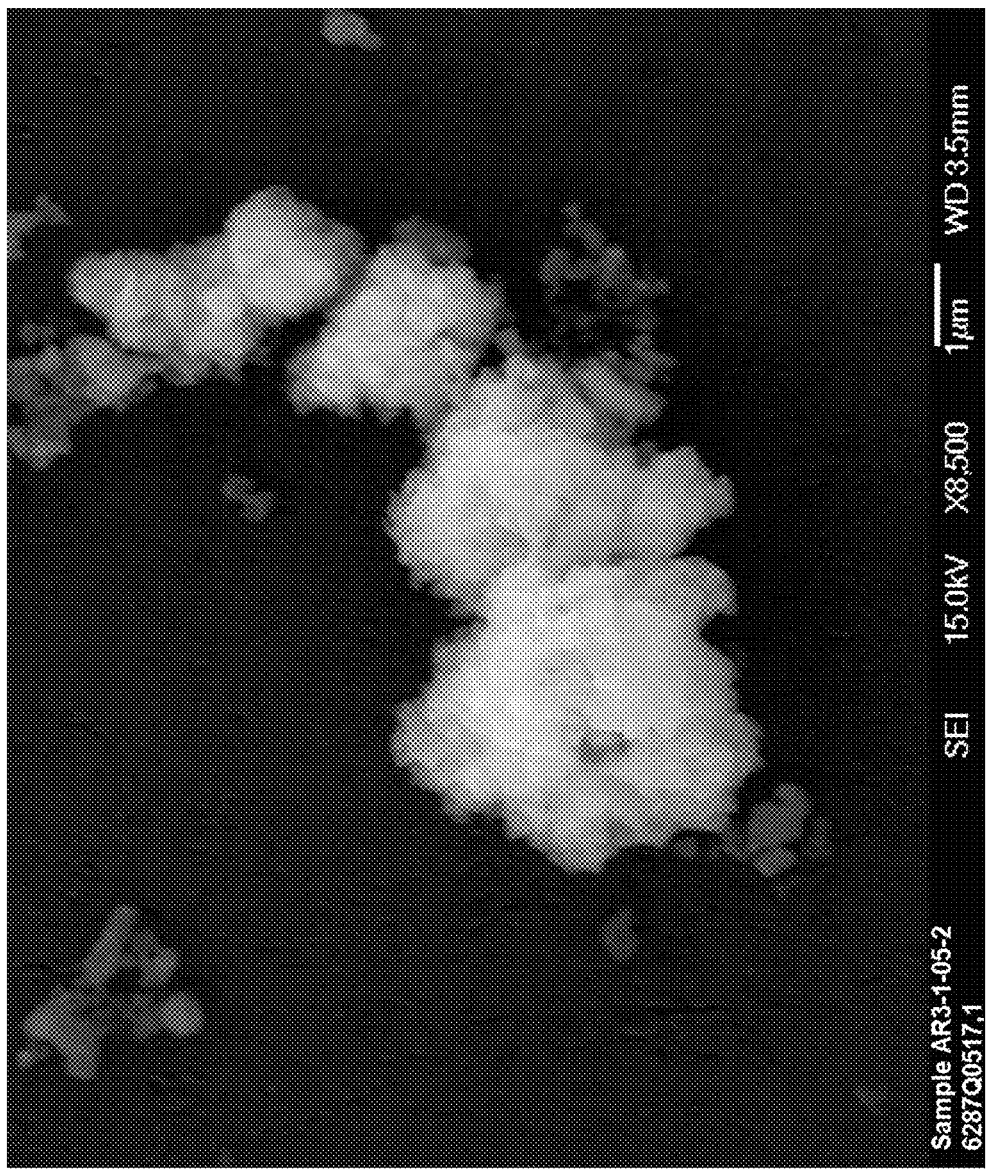
Figure 14B:
Figure 14C:
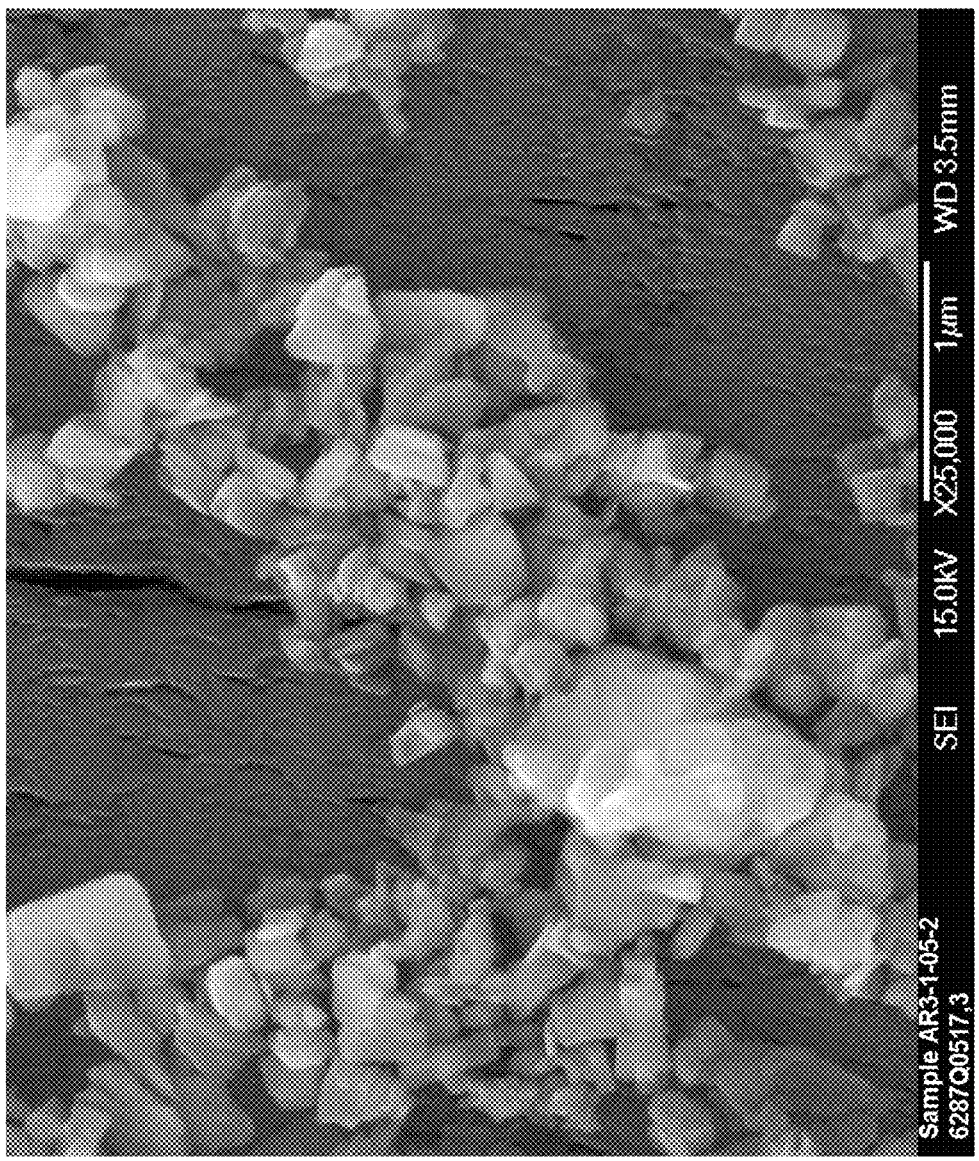

Comparison of the images of Sample A and Control showed very different particle morphologies. FIGS. 12A-H depict micrographs of Sample A. FIGS. 13A-C depict micrograph images of the Control sample. FIGS. 14A-C depict micrographs of Sample B. Comparison of the images of Sample A and the Control sample showed very different particle morphologies between the two samples. Sample A contained principally nanoplatelets with diameters up to a few hundred nanometers and thicknesses of only a few nanometers. In contrast, the Control sample consisted of blocky, roughly equal particles with sizes down to tens of nanometers occurring as conglomerates of micrometer dimensions. Sample B appeared to be formed from aggregates of the nanoplatelets seen in Sample A, gathered and formed into rounded or ball-shaped particles of many micrometers dimension by drying a liquid droplet.

Figure 15:
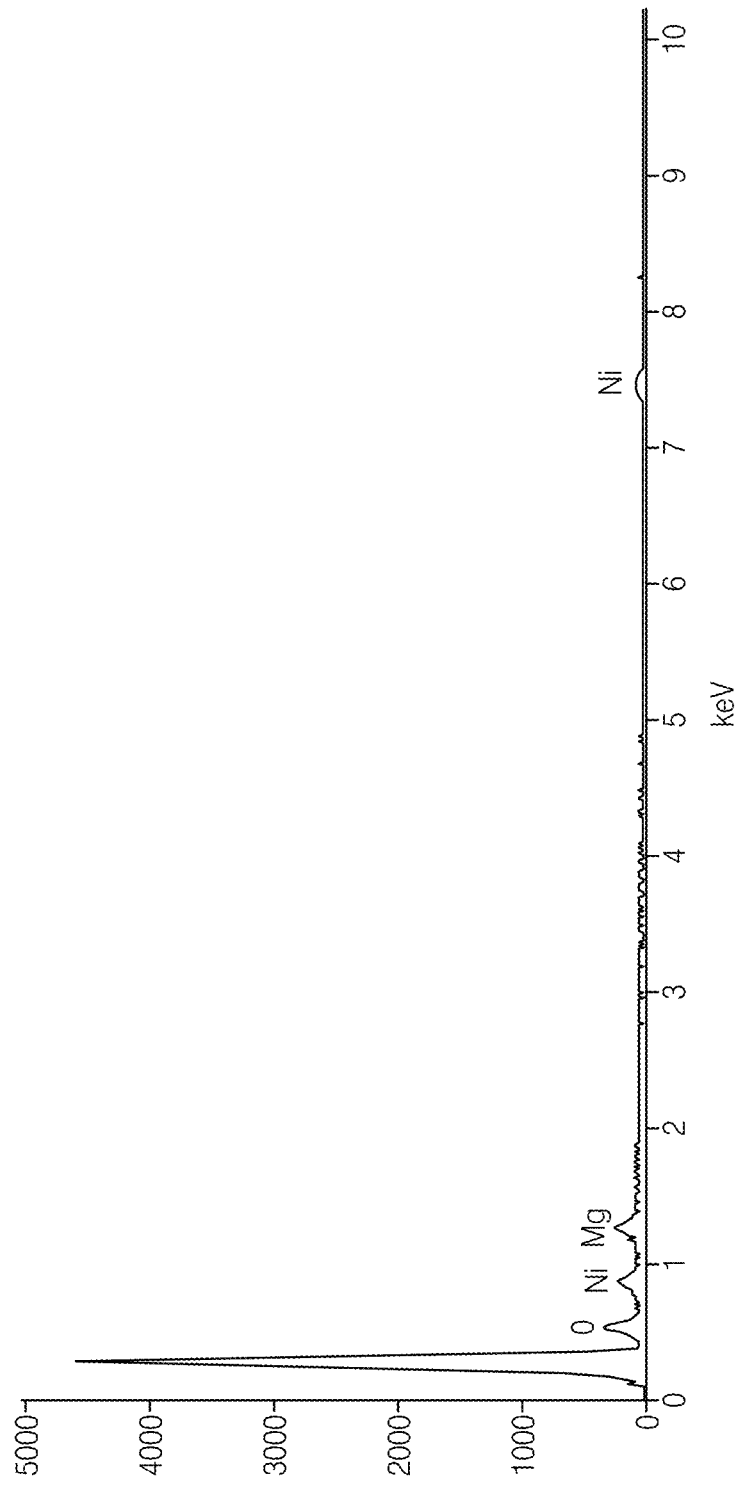
FIG. 15 depicts the dispersive X-ray spectrum obtained from nickel hydroxide nanoparticles doped with magnesium within a slurry.
Figure 16A:
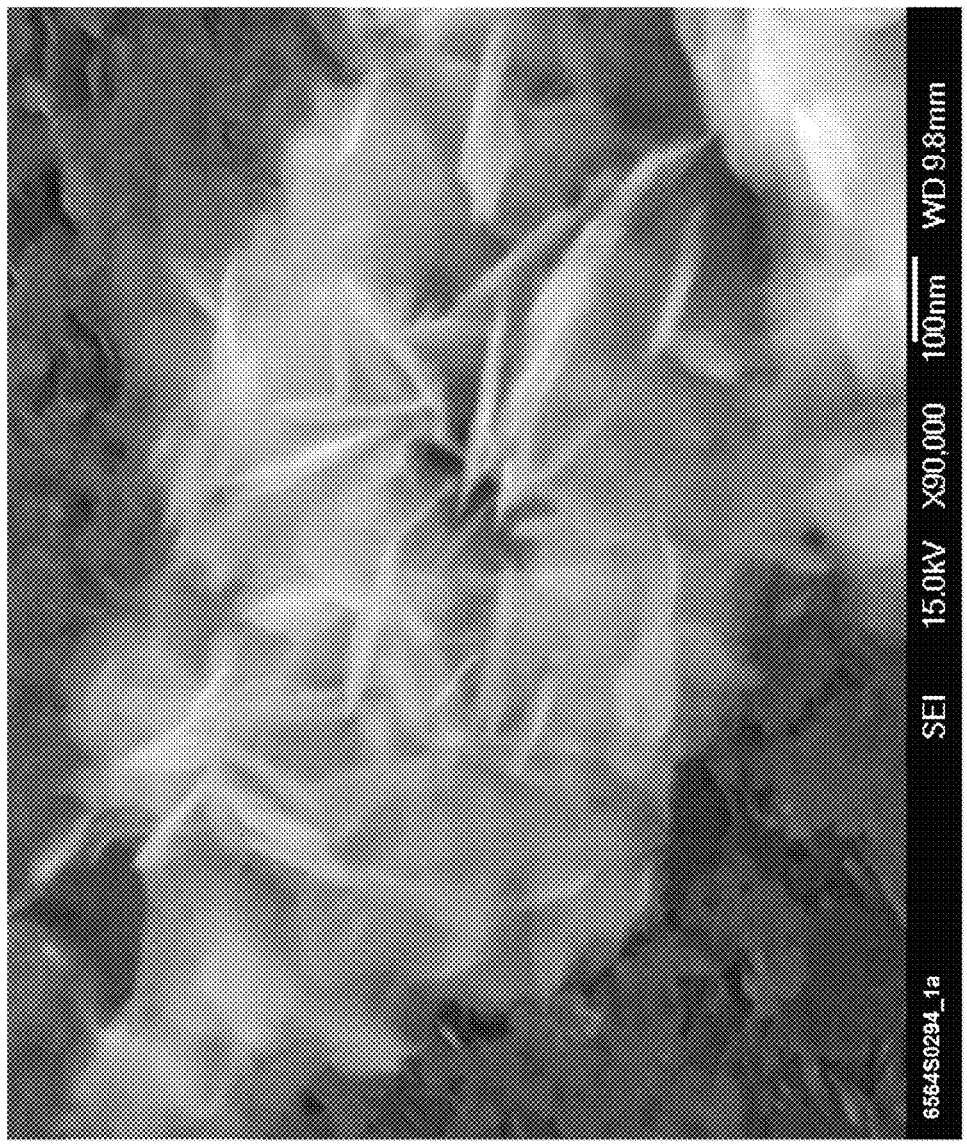
FIGS. 16A-C depict micrograph images of nickel hydroxide nanoparticles doped with magnesium.
Figure 16B:
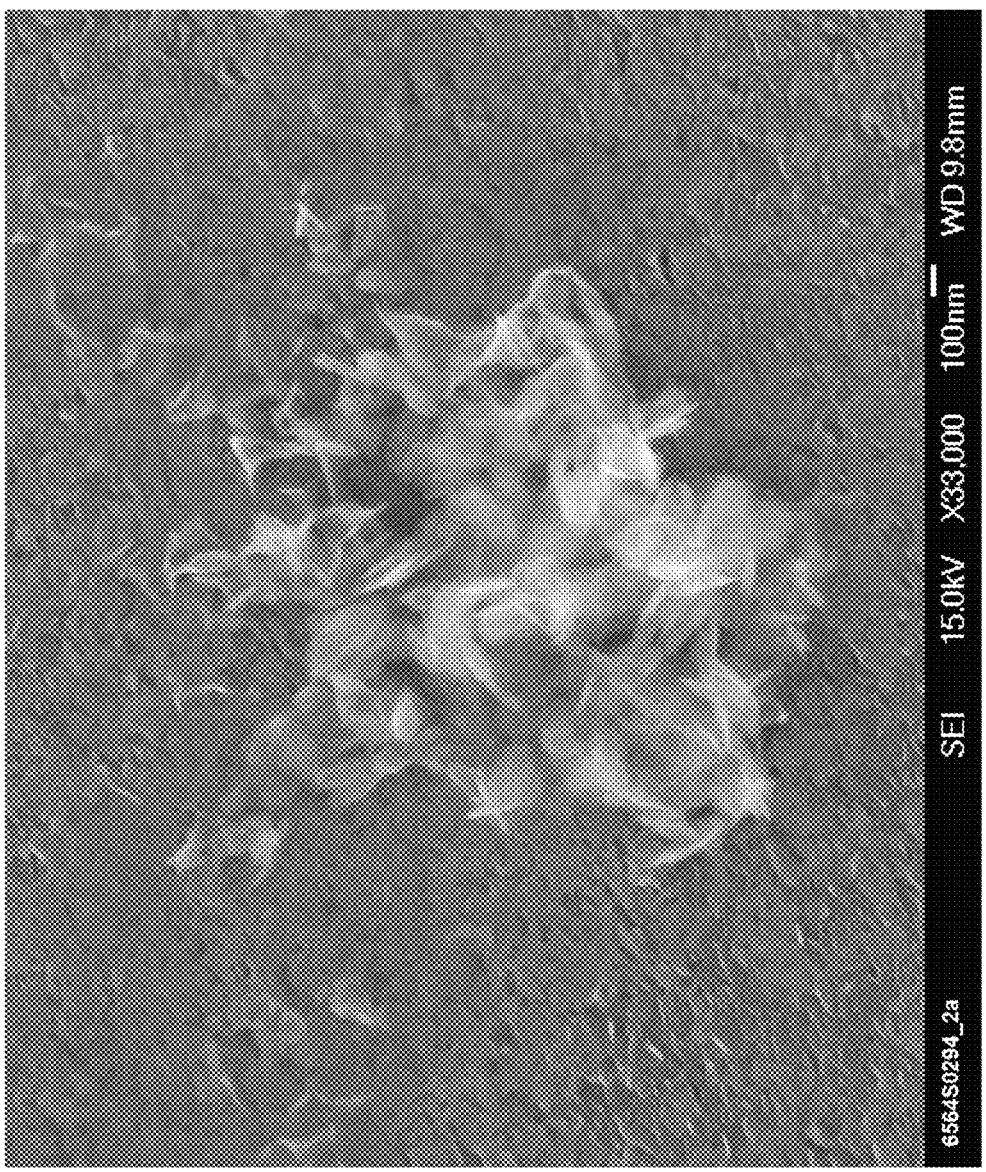
Figure 16C:
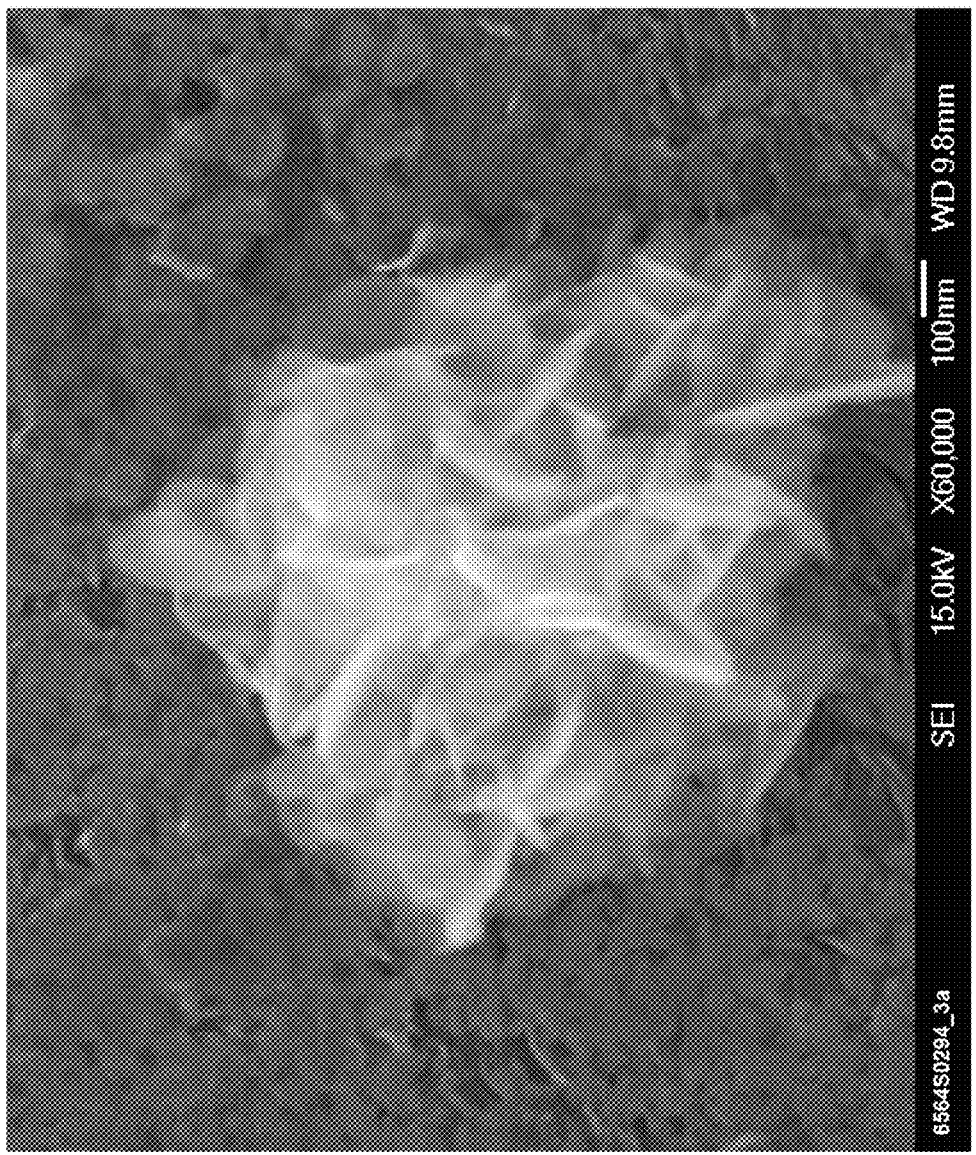

Nickel Hydroxide nanoplatelets doped with magnesium were prepared by the method described above. Particularly, the center compartment of the electrolyzer was filled with RO water containing NaCl at a concentration of 75,000 ppm. The cathode and anode compartments were subsequently filled with RO water containing NaCl at a concentration of 75,000 ppm. The pressure in the center compartment was maintained at a higher level than that of the anode and cathode compartments to keep the selective ion membrane in place. The current in the machine was brought up to 7 volts at 0.75 Amps/Square Inch. The temperature of the contents within the three compartments was maintained at about 110° F. (about 43° C.) at a pH of about 11. Feedstock was formulated with a final concentration of ions at 30,000 ppm, $Ni^{2+}$ ions at 1200 ppm, and $Mg^{2+}$ ions at 300 ppm. The feedstock was fed through the center compartment at a rate of one gallon per minute, resulting in a residence time of 10 minutes. Material was collected in the catch basin and centrifuged. Slurry collected after centrifugation was tested to determine the characteristics of the particles within the slurry. Table 9 depicts the quantitative results for the nickel hydroxide nanoplatelets doped with magnesium. FIG. 15 depicts the dispersive X-ray spectrum obtained from nickel hydroxide nanoparticles doped with magnesium within a slurry. FIG. 16A-C depict micrograph images of nickel hydroxide nanoparticles doped with magnesium.

TABLE 9

Quantitative Results for Nickel Hydroxide Doped with Magnesium

| Element | Weight % | Weight % Error |
|---|---|---|
| O | 35.02 | +/−1.71 |
| Mg | 22.68 | +/−0.81 |
| Ni | 42.3 | +/−3.48 |
| Total | 100.0 | |

Figure 17:
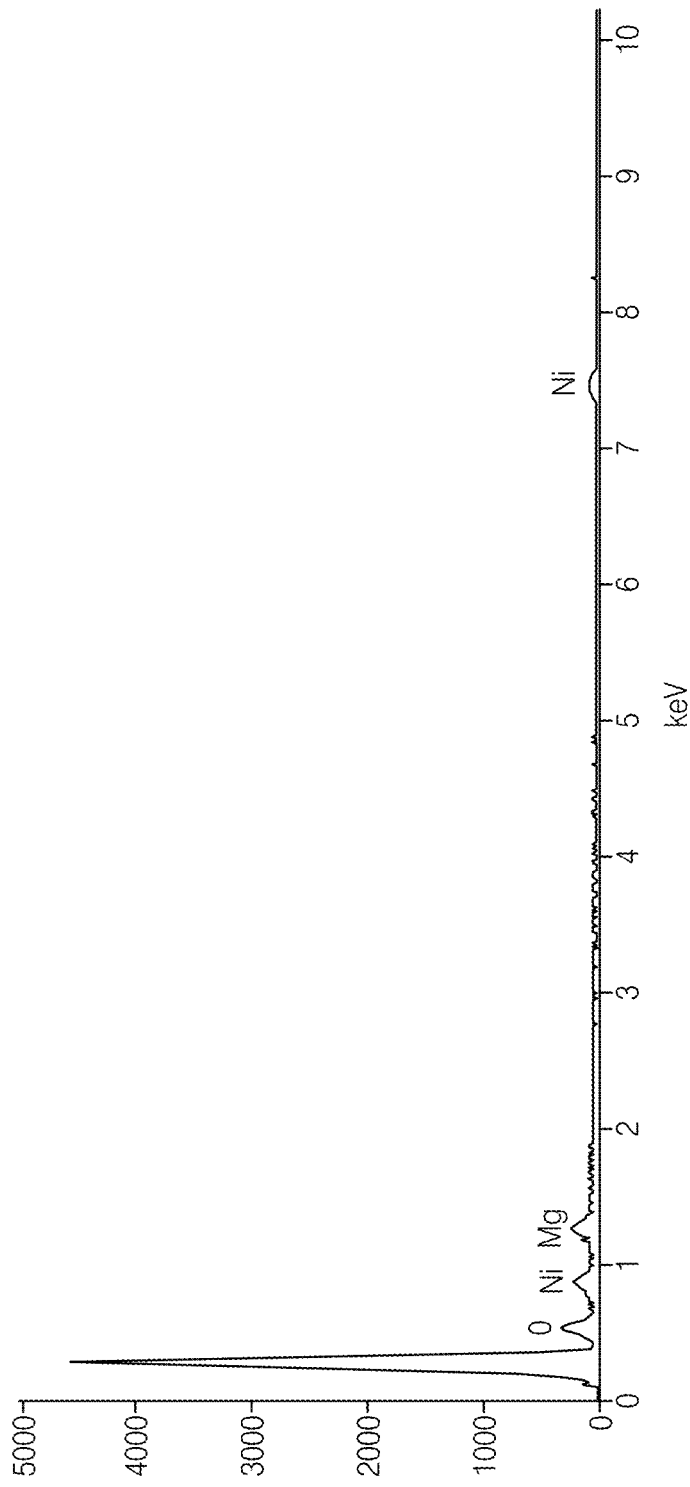
FIG. 17 depicts the dispersive X-ray spectrum obtained from copper hydroxide nanoparticles within a slurry.
Figure 18A:
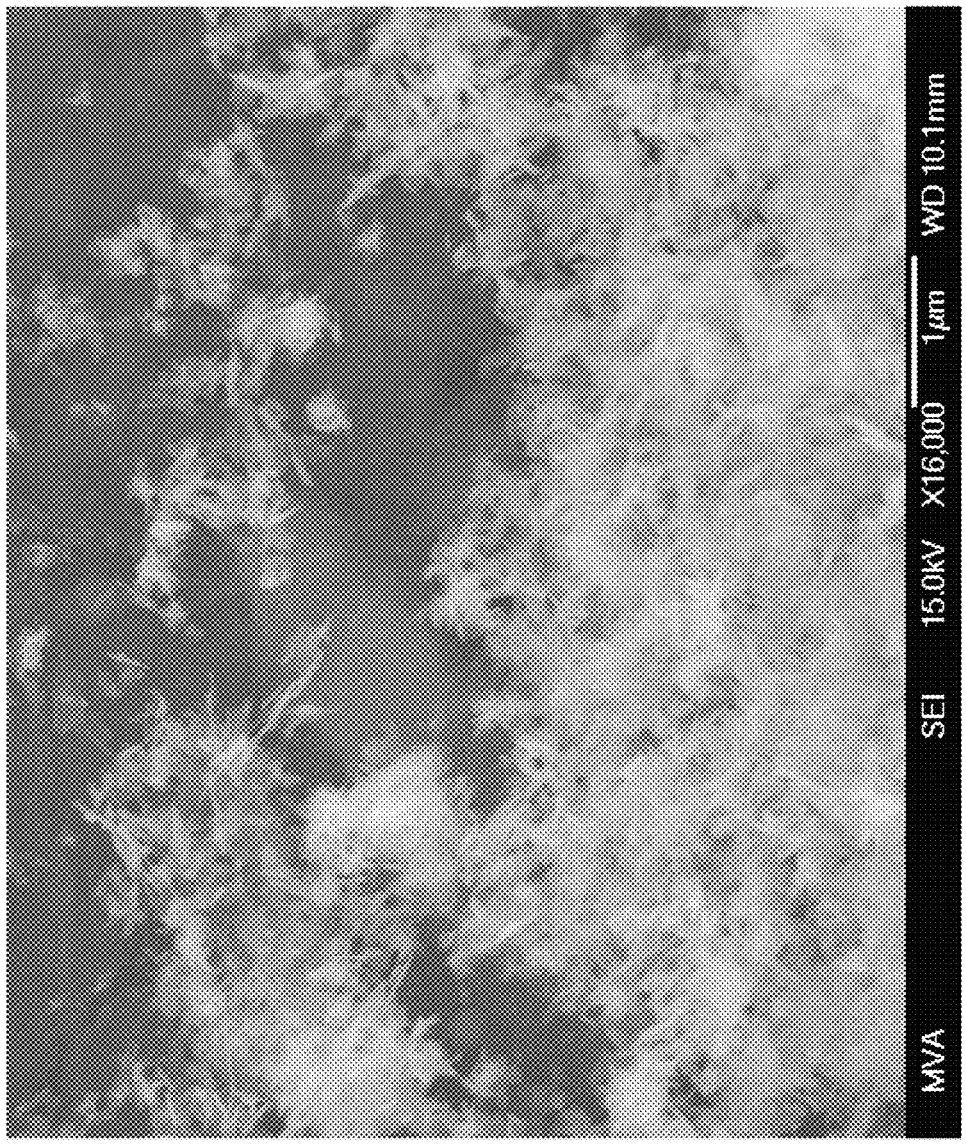
FIG. 18A-B depict micrograph images of copper hydroxide nanoparticles.
Figure 18B:
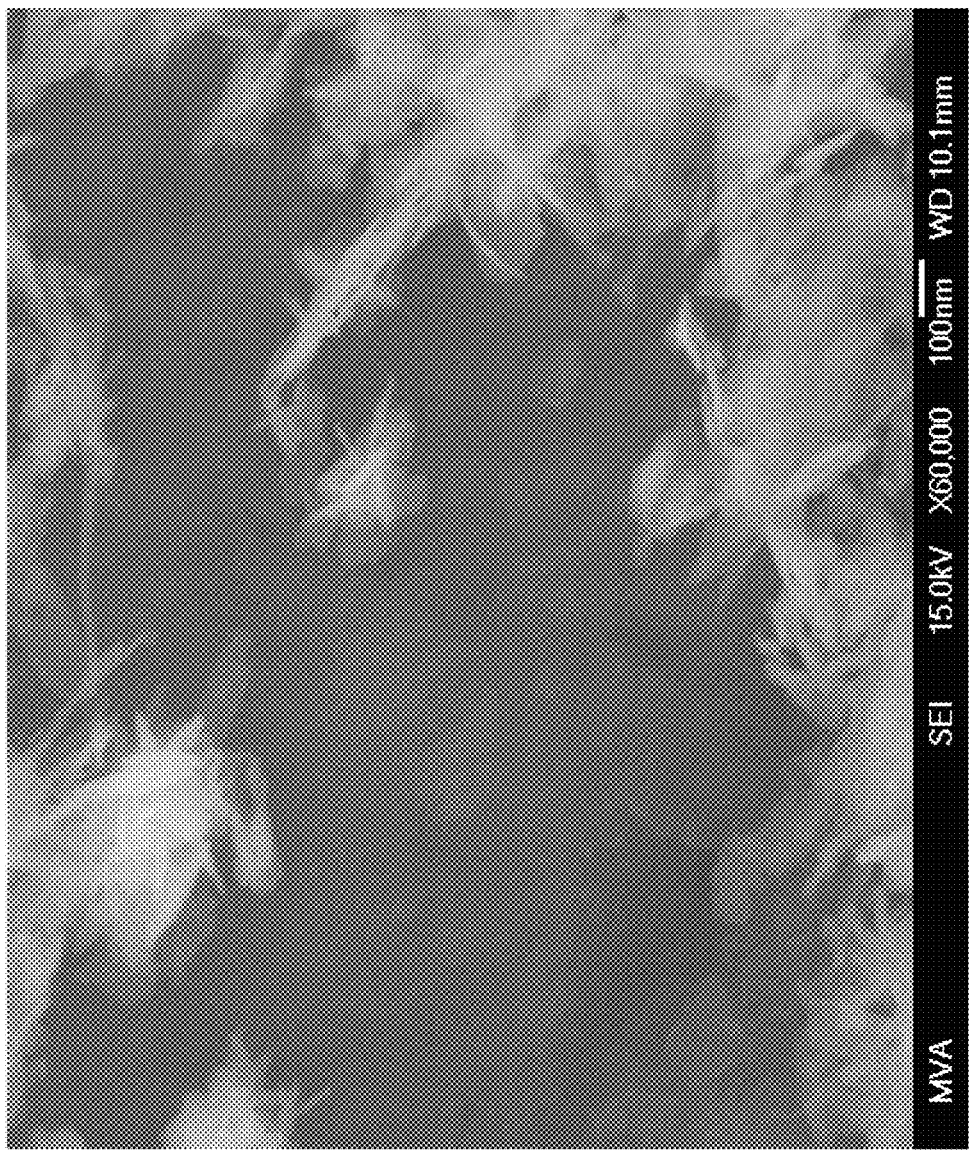

Copper hydroxide nanoplatelets were prepared by the method described above. Particularly, the center compartment of the electrolyzer was filled with RO water containing NaCl at a concentration of 75,000 ppm. The cathode and anode compartments were subsequently filled with RO water containing NaCl at a concentration of 75,000 ppm. The pressure in the center compartment was maintained at a higher level than that of the anode and cathode compartments to keep the selective ion membrane in place. The current in the machine was brought up to 7 volts at 0.75 Amps/Square Inch. The temperature of the contents within the three compartments was maintained at about 110° F. (about 43° C.) at a pH of about 11. Feedstock was formulated with a final concentration of $Cl^-$ ions at 30,000 ppm and $Cu^{2+}$ ions at 1500 ppm. The feedstock was fed through the center compartment at a rate of one gallon per minute, resulting in a residence time of 10 minutes. Material was collected in the catch basin and centrifuged. Slurry collected after centrifugation was tested to determine the characteristics of the particles within the slurry. Table 10 depicts the quantitative results for the copper hydroxide nanoplatelets. FIG. 17 depicts the dispersive X-ray spectrum obtained from copper hydroxide nanoplatelets within a slurry. FIGS. 18A-B depict micrographs of copper hydroxide nanoparticles within a slurry.

TABLE 10

Quantitative Results for Copper Hydroxide

| Element | Net Count | Weight % | Weight % Error |
|---|---|---|---|
| O K | 482 | 13.19 | +/−1.81 |
| Cu K | 1266 | 86.81 | +/−5.90 |
| Cu L | 4057 | — | — |
| Total | | 100.0 | |

Electrolyzer Configurations

In an alternative embodiment, a different electrolyzer configuration is employed. The electrolyzer includes an anode compartment and a cathode compartment as described above, but with a single ion selective membrane separating the two compartments. NaCl is split in the anode chamber to yield chlorine gas and sodium ion, which passes through the membrane. Water is split in the cathode chamber to yield hydrogen gas and hydroxyl ion. A spacer in the cathode compartment separates the ion selective membrane from the cathode, creating a reaction area. Sodium chloride and metal chloride are added to the cathode chamber. Metal ions react with hydroxyl ions in the cathode compartment to yield solid metal hydroxide in the cathode chamber leaving a free chloride which combines with sodium from the anode compartment to yield sodium chloride. As in the previously described method, metal hydroxide platelet size is determined by adjusting selected variables, as described above. The residence time of feedstock flow through the cathode compartment affects size (faster flow rates result in smaller platelet size), and the quality of flux line by the energy passing between the opposing compartments and temperature affect the speed of reaction. As in the previous method, by adjusting these parameters, metal hydroxide platelets of uniform size can be produced. Tight size distributions can be obtained for platelets having an average platelet size of 3.5 microns in the X/Y plane and 100 nm in the Z plane down to particles having an average particle size of 30 nanometers in the X/Y plane and 2.5 nm in the Z plane. Generally, the faster the platelets are harvested, the smaller the resulting platelets. The methods of preferred embodiments can be employed to prepare nanoplatelets over a range of sizes, each having a narrow size distribution. Metal hydroxide nanoplatelets having an average platelet diameter of from about 30 nm or less to about 1000, 1500, 2000, 2500, or 3300, 3500 nm or more can be prepared, for example, from about 40, 50, 60, 70, 80, 90, 100, 110, 120, 130, 140, 150, 160, 170, 180, or 190 nm to about 200, 250, 300, 350, 400, 450, 500, 600, 700, 800, or 900 nm. Particularly preferred are nanoplatelets having an average platelet diameter of about 40, 50, or 60 nm to about 70, 80, 90, 100, 110, or 120 nm.

The metal hydroxide nanoplatelets of preferred embodiments can be converted into metal oxide-containing nanoplatelets or metal oxide-containing nanotubes. In a preferred conversion method for preparing metal oxide-containing nanoplatelets, metal hydroxide nanoplatelets are heated uniformly, for example, in an oven, at a temperature sufficient to dehydrate the metal hydroxide. Any suitable method for heating can be employed, for example convection heating, a radiant heat source, contact heating, or the like. The temperature and exposure time can be adjusted such that different degrees of conversion of metal hydroxide to metal oxide in the nanoplatelets can be achieved (e.g., less than 1% conversion of metal hydroxide or more than 99% conversion of metal hydroxide). Metal oxide containing nanotubes can be prepared by non-uniform heating (e.g., by applying heat to one side of a metal hydroxide nanoplatelet). Non-uniform heating can be conducted by, e.g., use of a heat lamp or a hot plate to apply heat preferentially to one side of a metal hydroxide nanoplatelet. Metal hydroxide on the heated side undergoes conversion to metal oxide at a faster rate than the opposite side, resulting in the formation of stresses in the nanoplatelet that are relieved by curling of the nanoplatelet into a tubular structure. The resulting metal oxide containing nanotubes can be useful in applications similar to those in which metal hydroxide nanoplatelets or metal oxide nanoplatelets are used. Nanotubes of the preferred embodiments have potential applications in electronics, optics and other fields of materials science and the diameter of the nanotube depend upon the base platelet size used for the varying applications.

Decontamination of Chemical and Biological Agents

The metal hydroxides and metal oxides of preferred embodiments are suitable for use in a variety of applications. In a particularly preferred embodiment, the metal hydroxides and metal oxides are useful for decontamination of chemical and biological agents. Chemical and biological weapons pose a serious threat to both civilians and military personnel. Detection and neutralization of chemical and biological agents is of great interest to both. An urgent need exists for developing simple and cost effective techniques that can be used for neutralizing chemical and biological agents. A liquid free process not harmful to humans, the environment or equipment is preferred. Presently, different ways of neutralizing chemical and/or biological-agent contamination exist. All suffer from various disadvantages. Chemical decontamination of chemical and/or biological agents often utilizes some type of hypochlorite solution. Hypochlorites are very corrosive and harmful to skin. Certain materials, particularly electronic and avionic, can suffer serious damage during neutralization by solution-based techniques due to corrosive chemical reactions.

Solution based techniques for decontamination are not suitable for expensive electronic and avionic equipment. Other disadvantages of solution based decontamination include environmental pollution, the transport and storage of corrosive chemicals, and health risks. The problems associated with chemical decontamination can be overcome by using physical decontamination techniques. An example of this is utilization of UV light, combined with a cost effective, inert material exhibiting exceptional adhesion and capable of producing free radicals with high efficiency.

$Mg(OH)_2$ and MgO in the shape of nanoplatelets have unique chemical and physical properties. Nanoplatelets of $Mg(OH)_2$ and MgO offer simple and cost effective ways of neutralizing chemical and/or biological agents. This is especially true for electronic and avionic equipment. The $Mg(OH)_2$ used for this application is preferably in the form of individual crystallites of 30-100 nm in length and width with a thickness of only a few nanometers. The unique structure of the $Mg(OH)_2$ nanoplatelets provides much higher specific surface area than three-dimensional nanoparticles. This higher specific surface area provides great driving force for diffusion, especially at elevated temperatures. Further, the higher specific surface area allows sintering to take place at lower temperatures, over shorter time scales. Additionally, the higher specific surface area of the nanoplatelets also reduces the incipient melting temperature. Even with the higher specific surface area, it is recognized in the art that the density of the final product is unaffected. In addition these nanoplatelets have excellent adhesion properties due to their geometric shape and can be applied to contaminated surfaces in dry form. The nanoplatelets' chemical reactivity is greatly enhanced due to the surface to volume ratio increase. Nanoplatelets have a much higher surface area than nanoparticles. Dehydration at high temperature converts the $Mg(OH)_2$ into MgO. The nanoplatelets of MgO have a porous surface morphology which further increases the surface area of the nanoplatelets.

In addition to the generic effect of high surface area of nanoplatelets as opposed to conventional nanoparticles, the nanoplatelets of $Mg(OH)_2$ are a very strong base and therefore possess antimicrobial properties which can be exploited for neutralizing biowarfare agents. While the high efficiency destructive adsorption of biological materials by oxide nanoparticles has been reported in the literature, nanoplatelets can exhibit a substantial increase in adsorption and reactivity over such conventional nanoparticles.

Nanoplatelets can be used as decontamination agents in passive or active modes. Both modes require dispersion of nanoplatelets onto contaminated surfaces in a dry from using dry spraying/dusting techniques. These nanoplatelets adhere to surfaces by van der Walls forces due to their large surface to volume ratio. Both of these methods do not use any solutions or water for decontamination. The passive mode of decontamination exploits the formation of monolayers of water around nanoparticles due to capillary condensation. Individual nanoplatelets of $Mg(OH)_2$ on a surface form a water meniscus around their surfaces at ordinary humidity, due to capillary condensation. Even in dry conditions, a thin layer of water condenses around nanoparticles. At ordinary humidity, many monolayers of water condense on these surfaces. Even at 10-20% relative humidity a few layers of water form on edges from capillary condensation due to extremely small radius of curvature of the edges. The water meniscus, which forms immediately around the nanoplatelets' surfaces, destroys the chemical and/or biological warfare agents on contact. Due to the highly basic nature of the water meniscus, nanoplatelets of $Mg(OH)_2$ can neutralize harmful chemical and/or biological warfare agents, proteins, biotoxins, and even spores without damaging the surface. The combination of the chemical (strong base water meniscus) and structure (extremely high surface areas, rich morphology defects, with sharp edges, tips and nanocrystallite sizes) results in extremely high chemical reactivity including enhanced reaction kinetics with large capacities. Chemical and/or biological agents contacting the nanoplatelets are chemically destroyed without the use of solutions.

Figure 19:
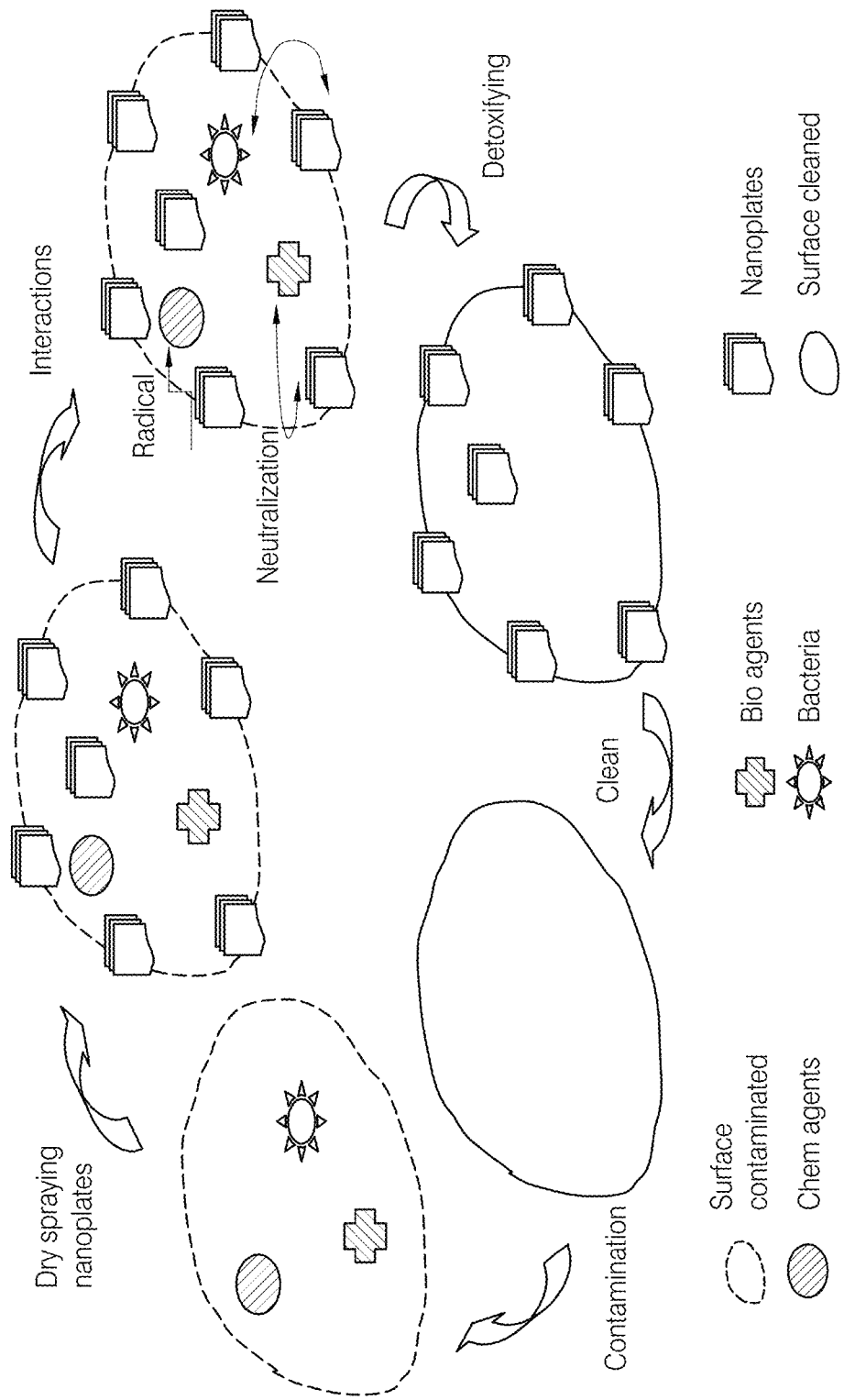
FIG. 19 is a schematic depiction a process of decontaminating chemical and biological agents using magnesium hydroxide.

In the active mode of decontamination, these nanoplatelets can be used to create free radicals to destroy chemical and/or biological agents. These MgO nanoplatelets have wide electronic band gaps. Illumination of nanoplatelets with ultra violet (UV) light results in electron-hole pair formation. The geometrical shape of nanoplatelets results in electronic band bending due to surface defects. The UV created electron-hole pairs are separated from the field and create free radicals. These free radicals destroy chemical and biological material in the vicinity of the nanoplatelets. Due to their shape, the nanoplatelets have better adsorption properties than spherical nanoparticles of the same volume. By controlling the size of the nanoplatelet, it can be tuned to specific UV wavelength for optimization of free radical creation. The efficacy of $Mg(OH)_2$ and MgO as neutralizing agents for chemical and biological agents can be enhanced by modifying their surfaces with halogens. Since these are nanoplatelets rather than spherical particles, the edges are expected to have higher chemical activities. A schematic diagram depicting a decontamination process is provided in FIG. 19.

Selected metal hydroxide nanoplatelets of preferred embodiments offer advantages in decontaminating chemical and/or biological agents, including a large surface to volume ratio and high adhesion properties; easy to disperse as dry powder; ideal for electronic and avionic equipment (can be decontaminated in place); localized neutralization of chemical and/or biological agents on contact; solution free decontamination; passive mode of decontamination exploiting natural humidity; and the magnesium hydroxide nanoplatelets in the active mode of decontamination using UV-generated free radicals; platelet size can be tuned for maximization of free radical creation; both passive and active modes can be carried out simultaneously.

Papermaking

In one particularly preferred embodiment, the metal hydroxides and metal oxides are useful in papermaking. In papermaking, retention is defined in general as the process of keeping fine particles and fiber fines within the web of paper as it is being formed. It is important to have good retention for the efficiency of the papermaking operation. Low retention can lead to many problems, including: poor runnability, increased deposits, sheet defects, higher additive costs, more downtime for washups, and higher sewer losses. Thus, retention aids can improve the overall runnability of the papermaking machine, and allow increases in speed through better drainage. In addition, retention can reduce deposits and sheet breaks caused by high levels of fillers and fines circulating at the wet end, and reduce furnish costs through better use of fillers or other additives.

The demand for retention aids has increased as papermakers seek to make alkaline rather than acid paper, incorporate higher levels of fillers, operate the paper machines at higher speeds, increase the extent of closure of the white water system and increase the use of recycled fibers. An effective retention program can enable the papermaker to optimize sizing efficiency, good opacity, efficiency in the overall machine runnability, and reduce furnish costs through better utilization of fillers or other additives. A good retention program can also help the papermaker achieve desired sheet qualities by optimizing the retention of expensive additives such as titanium dioxide, wet and dry strength additives, and alkaline size.

Conventional types of retention/drainage aids include inorganic salts, natural polymers and synthetic polymers. Examples of the inorganic salts are alum, silicas and bentonite clays. Cationic starch is the most commonly employed retention aid based on natural polymers. The synthetic polymers include structures based on polyacrylamides, polyamines, polyethyleneimine, polyamidoamines, and polyethlene oxide.

Retention and drainage aid programs have evolved from the use of a single flocculant or conventional coagulant to flocculant programs that include the use of anionic nanoparticles based on bentonite clays or silicas. These anionic nanoparticles have been used along with cationic starches, coagulants, and polyacrylamide-based flocculants to achieve higher benchmarks for retention, drainage, and formation. Nanoparticle technologies can improve retention, drainage, and formation. Nanoparticle systems have significant advantages over conventional single and dual polymer retention systems, due to the small, tight flocculant forms which adsorb strongly to the furnish components, leaving the sheet structure open and uniform. Advantages of nanoparticle systems include increased retention and drainage with no sacrifice in formation, and better performance in the presence of high concentrations of interfering substances. The nanoparticle retention system permits the clean-up of the white water loop by effectively retaining the suspended and dissolved solids including fillers with wood fibers.

Nanoparticles used for retention and drainage promotion are characterized by high surface area and negative charge. There are two commercially available nanoparticles in use today: colloidal silica and colloidal bentonite Papermakers utilize colloidal silica worldwide and related products each year to promote dewatering and fine-particle retention on hundreds of paper machines during production of over ten million annual tons of paper and paperboard products. Bentonite is a second type of mineral additive used in combination with cationic polymers for retention and drainage enhancement; and sometimes also for pitch control.

For all nanoparticle systems, the basic mechanism is the same. It involves interactions with all three fundamental mechanisms including coagulation, flocculation, and lastly the formation of the nano floc. This is based upon the three fundamental mechanisms: charge neutralization, bridging, and patching. In a preferred embodiment, low molecular weight high charge polymers can be used in the coagulation mechanism to control the wet end chemistry balance. With flocculation, bridging flocculation is induced, resulting in large flocs that are broken down under applied shear. Nanoplatelets of the preferred embodiments can be used in microflocculation. In a preferred embodiment, anionic nanoplatelets of the preferred embodiments can provide negative sites that can interact with the positively charged flocs to form a highly coagulated system of hare dense, small flocs that readily dewater. Accordingly, nanoplatelets of the preferred embodiment can provide high retention, superior formation and superior drainage when compared to conventional systems.

Fire Retardants

The nanoparticles of the preferred embodiments can be employed to impart fire retardancy to various materials (e.g., polymer-containing paints, fibers, coatings, and the like).

Poly(trimethylene terephthalate), also called poly(propylene terephthalate) (PPT), belongs to the thermoplastic aromatic polyester family, which includes poly(ethylene terephthalate) (PET) and poly(butylenes terephthalate) (PBT). PTT fibers were developed in 1990s and are considered to be important fibers since PTT fibers combine the best properties of polyamide and polyester for unique comfort and stretch. The key advantage is that it combines the desirable physical properties of PET (strength, stiffness and toughness), while retaining basic polyester benefits of dimensional stability, electrical insulation, and chemical resistance. PTT fibers provide a luxurious feel, inherent stain resistance, excellent dyeability, antistatic properties, and easy care. Because of the unique mechanical properties and its lower melting temperature, PTT has better processing ability than other aromatic polyester, such as PET. These advantages make it possible to use PTT as carpets and clothing materials. In carpet applications, PTT's excellent crush resistance, static resistance, colorfastness, and stain resistance making PTT the better choice in many carpet applications.

Although PTT fibers have excellent physical, mechanical and comfort properties, the relatively poor fire retardant ability, particularly under radiant panel test conditions as compared with nylon, limits the application of PTT fibers in carpet application.

Nanoplatelets of preferred embodiments can contribute to improving fire retardancy. Magnesium hydroxide in Nanoplatelets decomposes endothermically when heated to yield magnesium oxide nanoplatelets (MgO), a thermal insulator and water. The water acts to smother the flame by diluting and/or excluding oxygen and flammable gases, and the heat insulating nanoplatelets congregate on and in the surface area of certain polymeric materials containing such nanoplatelets when in contact with the flame, reducing or preventing the availability of potentially flammable decomposition products below the surface area to convert to the gas phase where combustion occurs.

Many other inorganic particles such as $TiO_2$, $Al(OH)_3$, $Mg(OH)_2$, and silicates have been used to improve the fire retardancy of polymers. However, extremely high loading exceeding 30 wt. % of inorganic mineral particles is typically needed to achieve satisfactory anti-flammability. This greatly impedes potential applications in carpet and textile. This obstacle is avoided with nanoplatelets of the preferred embodiments. The increase in barrier properties associated with nanoplatelets of the preferred embodiments obviates the need for such high loading.

As smaller load sizes can achieve a reduction in heat release, the obstacles faced by the larger nanoclays in potential applications such as carpet and textiles are not an issue with the nanoplatelets of the preferred embodiments.

Figure 20:
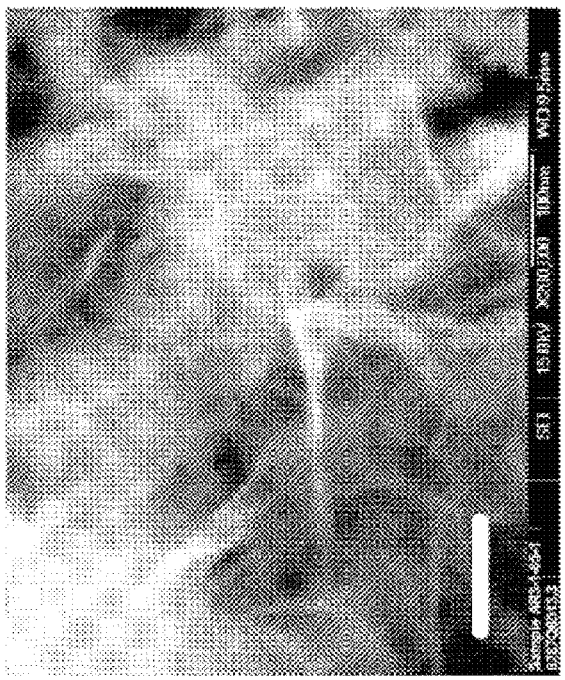
FIG. 20 depicts surface morphology of magnesium hydroxide nanoplatelets.
Figure 20:
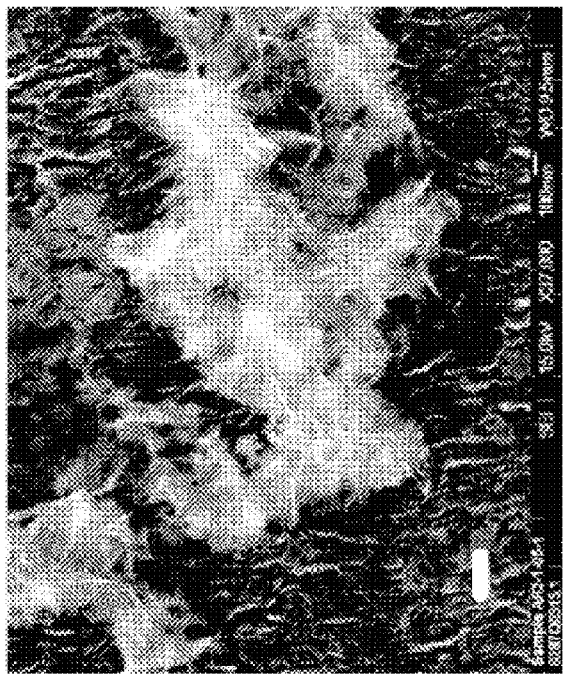

Unlike mechanically reduced nanoparticles, the nanoparticles of the preferred embodiments can be supplied as a suspension of isolated nanoplatelets and as such have potential applications as fire retardants in carpet and textiles. Nanoparticles of any metal potentially have applications as fire retardants in carpet and textiles. In an especially preferred embodiment, the plate thickness is about 1 nm to about 10 nm as shown in FIG. 20. In a preferred embodiment, $Al(OH)_3$ can be used as a fire retardant. In an especially preferred embodiment, $Mg(OH)_2$ nanoplatelets can be used as a fire retardant. Because $Mg(OH)_2$ by itself is an effective fire retardant additive for polymers, the availability of such nanoplatelets can enable potential fire retardant applications with considerably low filler loadings. The nanoparticles of the preferred embodiments can be used to provide remarkably improved fire retardancies when added to various fibers and polymers where improved fire retardancy is desirable Various approaches can be employed to incorporate nanoplatelets of the preferred embodiments into PTT. For example, a master batch of PTT with nanoplatelets of the preferred embodiments can be prepared, and then blended with virgin PTT in the fiber extrusion line. Alternatively, nanoplatelets of the preferred embodiment can be suspended in any fluid suitable for suspension, for example, the nanoplatelets can be suspended in water. Also, direct mixing of polyester emulsion with the nanoplatelet suspension can be used to make a master batch of PTT with nanoplatelets. Alternatively, the nanoplatelet suspension can be mixed with other suitable polymers.

In another preferred embodiment, nanoplatelets of the preferred embodiments are dispersed in a carrier polymer directly from the nanoplatelet water suspension. Surprisingly, nanoplatelets (e.g., $Mg(OH)_2$) can be dispersed in polystyrene latex to form a well dispersed nanocomposite. A carrier polymer, such as polyester, that has strong affinity with PTT can be employed.

In yet another preferred embodiment, dry nanoplatelets are directly blended with PTT in the fiber extrusion line.

Similar approaches can be employed to provide fire retardancy for other polymers that can benefit from fire retardancy, for example polymers such as polyester, aramid fiber (e.g., Twaron), acrylic, nylon, spandex (trade name Lycra), olefin, ingeo, and lurex, and other polymers as are commonly employed in fabricating carpets, drapes, wall coverings, foam cushions, mattresses, carpet padding, blinds, paints, varnishes, floor coverings (e.g., Pergo, formica, linoleum, vinyl), clothing (e.g., infant clothing), and the like.

Improving Materials' Strength

In yet another embodiment, the nanoplatelets of the preferred embodiments can be employed to produce lightweight body armor materials. In other embodiments, nanoplatelets of the preferred embodiments can be used in applications where enhanced strength is useful, for example in aromatic polyamides such as Twaron, Kevlar and Nomex. Nanoplatelets of the preferred embodiments can be added to the polymers using conventional methods typically employed to add solid fillers to polymeric materials.

Nanoplatelets of the preferred embodiments can be used in the construction of an intricate alternatively layered organic/inorganic hybrid composite designed to combine ceramic's hardness and polymer's toughness, to replace or partially replace the current commercially available armor materials.

Armor materials, with light weight and high strength, are in an ever increasing demand in facing the terrorist threat and future battle field requirement. Among those, the SiC and $BN_4$ have been two typical examples, and have been widely used in soldier protection. However, the relative heavy weight and more than one inch's thickness in anti-ballistic protection are still two hurdles to be overcome. Flexible armor materials, e.g., the well known Kevlar and ultrahigh polyethylene materials, in contrary, has problems of supplementing hard matrix in terms of withstanding the ballistic attack, although they both possess excellent comprehensive mechanical properties. Therefore, it has become imperative to develop new generation armors that have comparative hardness and flexuralability with SiC or $BN_4$ but with the specific weight of artificial polymers such as Kevlar.

One way to increase the mechanical strength of a surface is by incorporating hard nanoplatelets materials. Alternating layers of nanoplatelets and soft adhesive material can increase the strength the material many fold. The alternating layers of orientated hard materials and soft materials have large interface area that can absorb and dissipate energy compared to ordinary materials Nanoplatelets of the preferred embodiments can be used to increase the strength of a surface. When the nanoplatelets are magnetic, a single layer of nanoplatelets can be deposited on a surface using spin/dip-coating under a magnetic field. In a preferred embodiment, coating techniques are carried out in a magnetic field for aligning the plates on the surface. The magnetic field orients the plates parallel to the substrate. To produce magnetic nanoparticles, the (hydr)oxides are first converted to the corresponding metal. This can be accomplished by conventional reduction reactions known in the art. For example, Ni nanoplatelets can be prepared through the $Ni^{2+}$ reduction reaction by hydrazine hydrate in a 40 kHz ultrasonic irradiation reaction, as described in Li et al., Nanotechnology 15 (2004) 982-986, herein incorporated by reference in its entirety. The pH value is preferably maintained at 14 using NaOH solution. After the mixed aqueous solution containing $NiCl_2$, preferably a nickel (hydr)oxide, and hydrazine hydrate are put into the ultrasonic bath, the solution color gradually changes from green to grey black. When the solution turns completely black, the reduction reaction is complete Spin coating of polystyrene spheres form well ordered layers on substrates. A thin layer of polymer is deposited on the nanoplatelet layer. Any suitable polymeric material can be used, for example polyethylene, polypropylene, polyvinyl chloride, polyethylene terephthalate, polystyrene and polycarbonate. Subsequent alternating layers of nanoplatelets and polymer are deposited until the required overall thickness is reached.

Magnetic nanoparticles of the preferred embodiment can be incorporated into data-carrying devices, including but not limited to, computer memory devices, hard drives, digital media, and portable memory.

Figure 21:
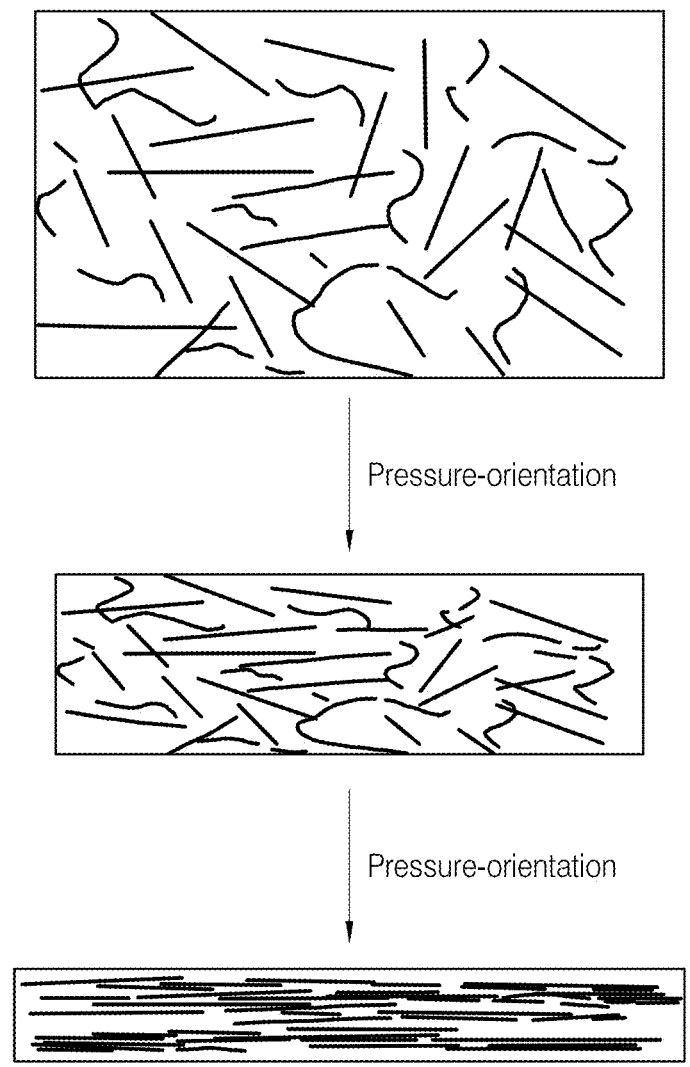
FIG. 21 is a schematic depiction of pressure-assisted orientation of $Mg(OH)_2$ nanoplatelets.

To build a light-weight and high strength material for body armor application, an external pressure can be applied to help the alignment of randomly dispersed nanoplatelets in the presence of polymer bonding agent, as shown in FIG. 21. The different polymers, polymer/nanoplatelet ratio, temperature, pressure, solid contents during compression, and nanoparticles can be tested.

Figure 22:
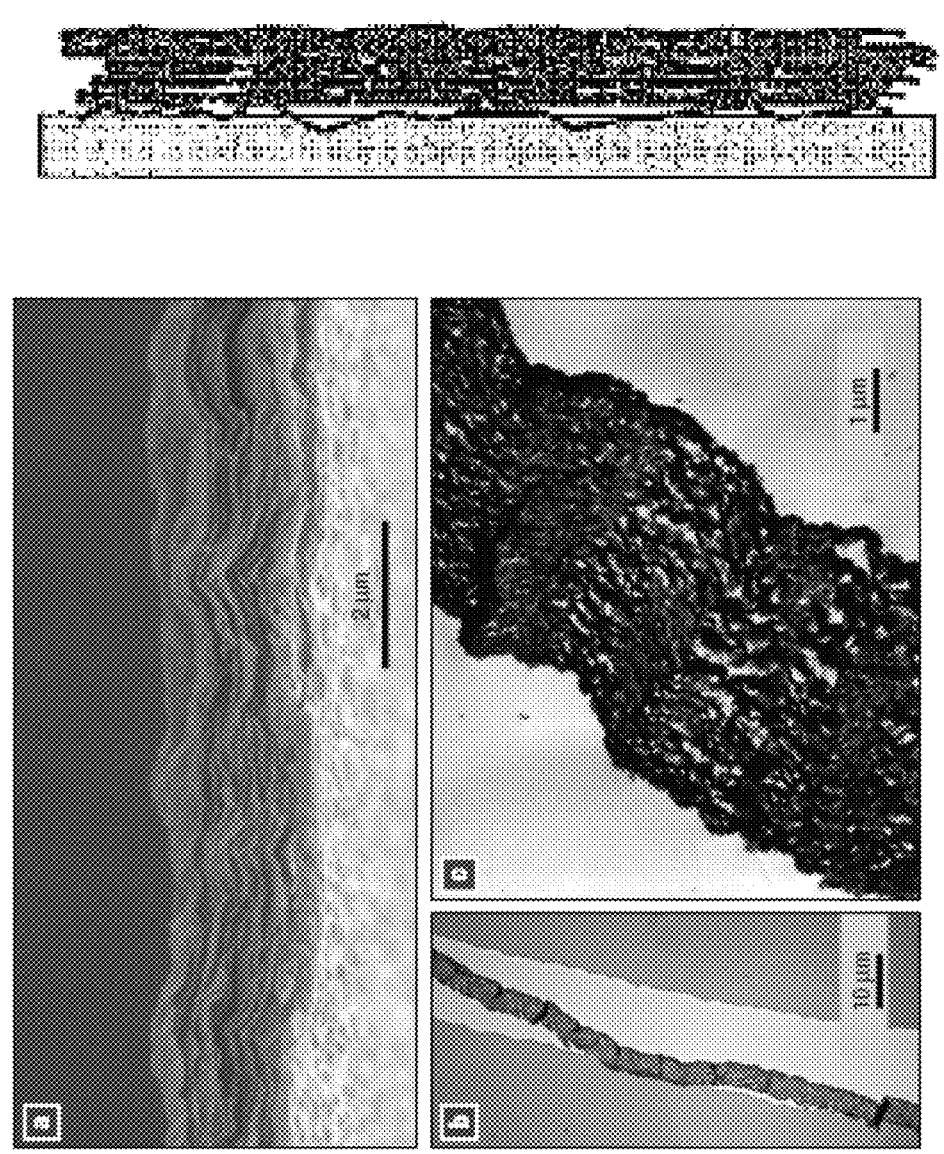
FIG. 22 is a schematic depiction of formation of self-assembled positively and negatively charged thin layers.
Figure 23:
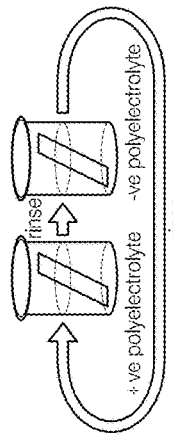
FIG. 23 is a schematic depiction of a layer-by-layer approach to preparing a nacre mimicked nanocomposite.
Figure 23:
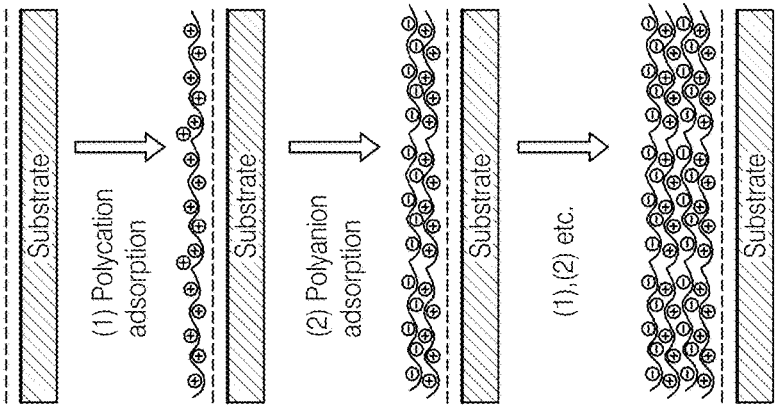
Figure 23:
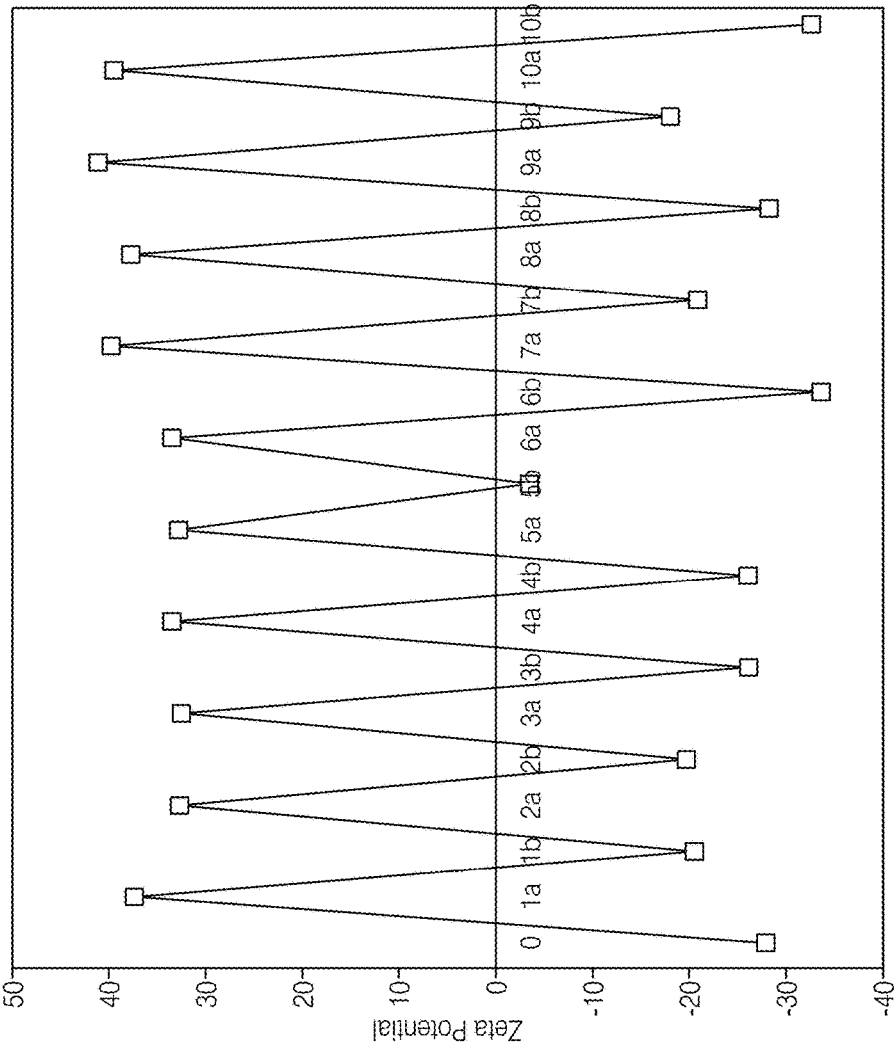
Figure 24:
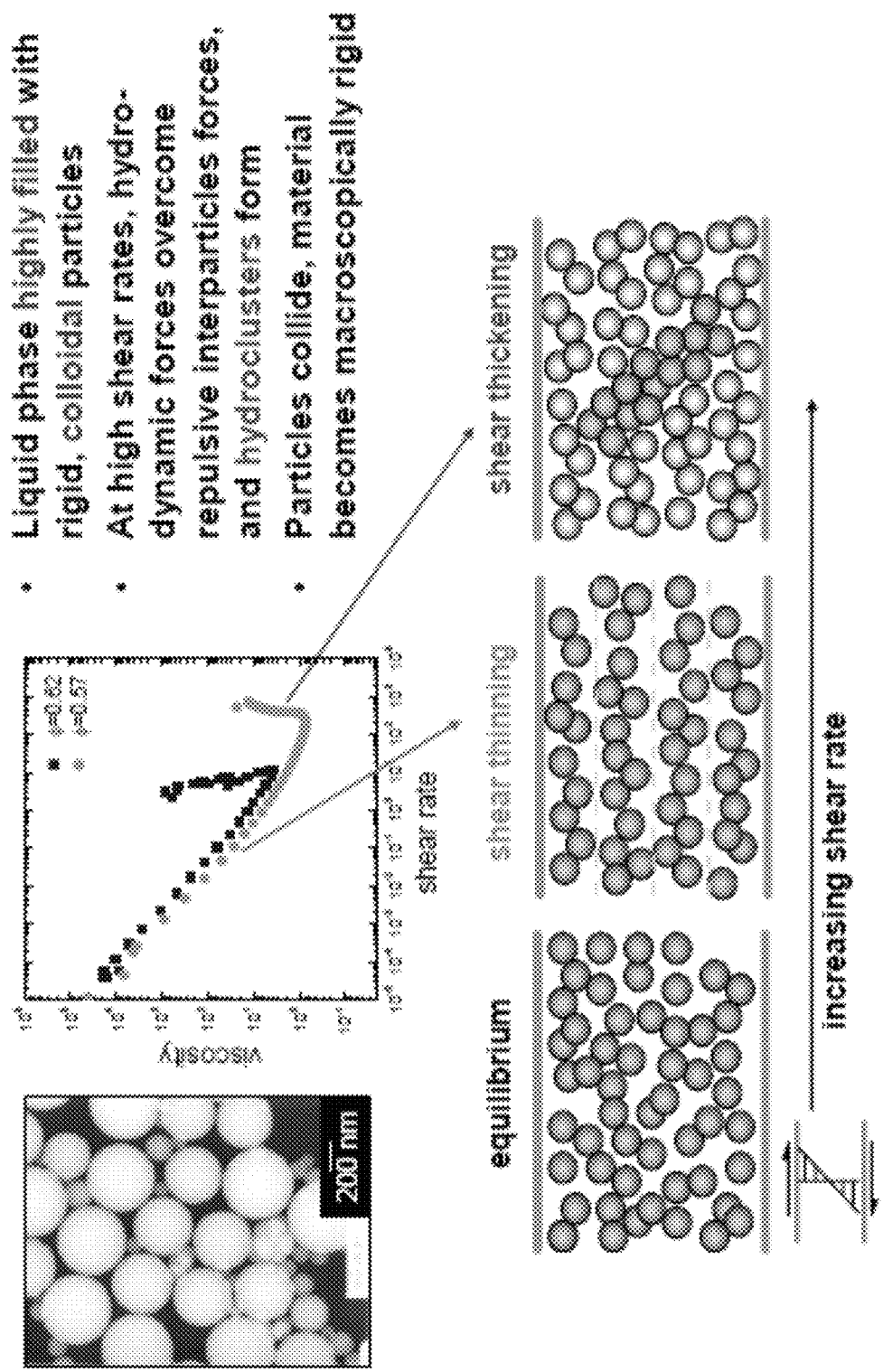
FIG. 24 is a schematic depiction of a shear thickening mechanism for the body armor materials.

To build a light-weight and high strength material for body armor application, positively and negatively charged thin layer (approximately 1.0 µm mimicking the thickness of nature nacre) of nanoplatelet $Mg(OH)_2$ polymer matrix can be constructed following the Langmuir-Blodgett concept, and transferred alternatively one atop another and self-assembled to form the target layered structure, as shown in FIG. 22. An external pressure can optionally be applied To build a light-weight and high strength material for body armor, a multi-layer nature nacre structure can be constructed by a layer-by-layer method using alternatively dipping in oppositely charged nanoplatelet $Mg(OH)_2$/polymer binder solution, as shown in FIG. 23. Along the layer-by-layer dipping process, the surface charge will be changed alternatively, as shown in the plot To build a light-weight and high strength material for body armor, magnesium hydroxide nanoplatelets and polyethylene glycol can be used to make shear thickening fluids to be used in making liquid body armor (FIG. 24).

Plasmonics

The nanoparticles of the preferred embodiments can also be used as a bases for plasmonics. Plasmonics is a technique for transmitting optical signals along miniscule nanoscale structures. Directing light waves at the interface between a nanometal coated dielectric material can induce a resonant interaction between the waves and the mobile electrons at the surface of the metal. The result is the generation of surface plasmons—density waves of electrons that propagate along the interface. Plasmon-carrying nanoplatelets of the preferred embodiment can be incorporated into various devices, including, but not limited to, microscopes, light-emitting diodes (LEDs), as well as chemical and biological sensors. Plasmons of the preferred embodiment can also be incorporated into data-carrying integrated circuits with electrical interconnects.

In one embodiment, the nanoplatelets of the preferred embodiments are incorporated into a plasmonic device through placement in a reducing environment with reducing gas. The top layer of the particular metal hydr(oxide) can be converted to its elemental form encapsulating the underlying hydroxide or oxide material, a dielectric material, of that base nanoplatelet.

Methods and devices that are suitable for use in conjunction with aspects of the preferred embodiments are disclosed in: U.S. Pat. No. 5,264,097, entitled "ELECTRODIALYTIC CONVERSION OF COMPLEXES AND SALTS OF METAL CATIONS," U.S. Pat. No. 3,959,095; entitled "METHODS OF OPERATING A THREE COMPARTMENT ELECTROLYTIC CELL FOR THE PRODUCTION OF ALKALI METAL HYDROXIDES;" U.S. Publication No. 20070022839, entitled "SYNTHESES AND APPLICATIONS OF NANO-SIZED IRON PARTICLES;" U.S. Pat. No. 7,172,747, entitled "METAL OXIDE NANOTUBE AND PROCESS FOR PRODUCTION THEREOF;" U.S. Pat. No. 6,656,339, entitled "METHOD OF FORMING A NANO-SUPPORTED CATALYST ON A SUBSTRATE FOR NANOTUBE GROWTH;" U.S. Pat. No. 5,470,910, entitled "COMPOSITE MATERIALS CONTAINING NANOSCALAR PARTICLES, PROCESS FOR PRODUCING THEM AND THEIR USE FOR OPTICAL COMPONENTS;" U.S. Publication No. 20070098806, entitled "POLYMER-BASED ANTIMICROBIAL AGENTS, METHODS OF MAKING SAID AGENTS, AND PRODUCTS INCORPORATING SAID AGENTS;" U.S. Publication No. 20060216602, entitled "MACROSCOPIC ASSEMBLY OF NANOMETRIC FILAMENTARY STRUCTURES AND METHOD OF PREPARATION THEREOF;" U.S. Publication No. 20060193766, entitled "TITANIA NANOTUBE AND METHOD FOR PRODUCING SAME;" U.S. Publication No. 20060159603, entitled "SEPARATION OF METAL NANOPARTICLES;" Boo et al., *Fracture Behaviour of Nanoplatelet Reinforced Polymer Nanocomposites*, Mat. Sci. and Tech. 22(7) 2006: 829-834; Li et al., *Structure and Magnetic Properties of Cobalt Nanoplatelets*, Mat. Lett. 58 (2004): 2506-2509; Zhou et al., *Preparation and Characterization of Nanoplatelets of Nickel Hydroxide and Nickel Oxide*, Mat. Chem. and Phys. 98(2006): 267-272; Sun et al., *From Layered Double Hydroxide to Spinel Nanostructures: Facile Synthesis and Characterization of Nanoplatelets and Nanorods*, J. Phys. Chem. B. 110 (2006): 13375-13380; Zarate et al., *Novel Route to Synthesize CuO Nanoplatelets*, J. Sol. St. Chem. 180(2007): 1464-1469; Shouzhu et al., *Nanofibers and Nanoplatelets of $MoO_3$ via an Electrospinning Technique*, J. Phys. and Chem. Of Sol. 67(2006): 1869-1872; Hou et al., *High-Yield Preparation of Uniform Cobalt Hydroxide and Oxide Nanoplatelets and Their Characterization*, J. Phys. Chem. B. 109(2005): 19094-19098; and Liu et al., *Facile and Large-Scale Production of ZnO/Zn—Al Layered Double Hydroxide Hierarchical Heterostructures*, J. Phys. Chem B. 110(2006): 21865-21872.

All references cited herein, including but not limited to published and unpublished applications, patents, and literature references, and references in the Appendix, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A nanoplatelet comprising individual crystallites having a platelet diameter of from about 30 nm to about 3500 nm and a thickness of from about 1 nm to about 400 nm, wherein the nanoplatelet is an oxide of a metal selected from the group consisting of scandium, chromium, yttrium, niobium, lutetium, tantalum, tungsten, and mixtures thereof, the nanoplatelet having an aspect ratio of from about 15 to about 70 and having a BET specific surface area of from about 100 m$^2$/g to about 150 m$^2$/g, and an zeta potential of from about +60 mV to about −60 mV.

2. The nanoplatelet of claim 1, having a platelet diameter of from about 40 nm to about 120 nm and a thickness of from about 1 nm to about 4 nm.

3. The nanoplatelet of claim 1, having a zeta potential of from about −4 mV to about −5 mV.

4. The nanoplatelet of claim 1, is in a form of a rolled nanotube.

5. The nanoplatelet of claim 1, wherein the metal is scandium.

6. The nanoplatelet of claim 1, wherein the metal is chromium.

7. The nanoplatelet of claim 1, wherein the metal is yttrium.

8. The nanoplatelet of claim 1, wherein the metal is niobium.

9. The nanoplatelet of claim 1, wherein the metal is lutetium.

10. The nanoplatelet of claim 1, wherein the metal is tantalum.

11. The nanoplatelet of claim 1, wherein the metal is tungsten.

12. The nanoplatelet of claim 1, having a platelet diameter of from about 30 nm to about 1000 nm.

* * * * *